(12) United States Patent
Raether et al.

(10) Patent No.: US 8,961,637 B2
(45) Date of Patent: Feb. 24, 2015

(54) FILTER ELEMENT; COMPONENTS THEREOF; AND METHODS

(75) Inventors: Thomas D. Raether, St. Louis Park, MN (US); Brian Zauner, Lakeville, MN (US)

(73) Assignee: Donaldson Company, Inc., Minneapolis, MN (US)

( * ) Notice: Subject to any disclaimer, the term of this patent is extended or adjusted under 35 U.S.C. 154(b) by 721 days.

(21) Appl. No.: 13/144,458

(22) PCT Filed: Jan. 13, 2010

(86) PCT No.: PCT/US2010/020870
§ 371 (c)(1),
(2), (4) Date: Oct. 3, 2011

(87) PCT Pub. No.: WO2010/083194
PCT Pub. Date: Jul. 22, 2010

(65) Prior Publication Data
US 2012/0011815 A1    Jan. 19, 2012

Related U.S. Application Data

(60) Provisional application No. 61/144,545, filed on Jan. 14, 2009.

(51) Int. Cl.
*B01D 46/00* (2006.01)
*B01D 46/52* (2006.01)

(52) U.S. Cl.
CPC .......... *B01D 46/527* (2013.01); *B01D 46/0005* (2013.01)

USPC .............. 55/378; 55/341.1; 55/357; 55/418; 55/302; 55/498; 55/502; 55/508

(58) Field of Classification Search
CPC .............. B01D 46/0068; B01D 46/04; B01D 46/2408; B01D 46/002; B01D 46/521; B01D 46/2411; B01D 2271/02; F02M 35/024
USPC ........ 55/302, 341.1, 482, 484, 492, 498, 502, 55/505, 467, 497, 357; 95/273
See application file for complete search history.

(56) References Cited

U.S. PATENT DOCUMENTS

| | | | |
|---|---|---|---|
| 4,159,197 A | | 6/1979 | Schuler et al. |
| 4,218,227 A | | 8/1980 | Frey |
| 4,253,856 A | * | 3/1981 | Paucha ............................ 55/374 |
| 4,443,237 A | | 4/1984 | Ulvestad |
| 5,772,883 A | | 6/1998 | Rothman et al. |
| 5,820,646 A | | 10/1998 | Gillingham et al. |
| 5,902,364 A | | 5/1999 | Tokar et al. |
| 5,966,793 A | | 10/1999 | Pyron |
| 6,203,591 B1 | * | 3/2001 | Clements et al. ............ 55/341.1 |
| 6,235,195 B1 | | 5/2001 | Tokar |
| 6,348,085 B1 | | 2/2002 | Tokar et al. |
| 6,350,291 B1 | | 2/2002 | Gieseke et al. |
| 6,368,374 B1 | | 4/2002 | Tokar et al. |
| 6,676,722 B1 | | 1/2004 | Clements et al. |

(Continued)

FOREIGN PATENT DOCUMENTS

| | | |
|---|---|---|
| WO | WO 2009/100119 A1 | 8/2009 |
| WO | WO 2009/108598 A1 | 9/2009 |

*Primary Examiner* — Duane Smith
*Assistant Examiner* — Minh-Chau Pham
(74) *Attorney, Agent, or Firm* — Merchant & Gould P.C.

(57) ABSTRACT

Z-filters capable of cleaning particulate matter from airflow streams. Methods for retrofitting bag house dust collectors.

15 Claims, 60 Drawing Sheets

(56) References Cited

U.S. PATENT DOCUMENTS

| | | |
|---|---|---|
| 7,282,075 B2* | 10/2007 | Sporre et al. ............... 55/302 |
| 7,329,326 B2 | 2/2008 | Wagner et al. |
| 7,338,544 B2* | 3/2008 | Sporre et al. ............... 55/302 |
| 7,632,325 B2 | 12/2009 | Welch et al. |
| 7,905,935 B2 | 3/2011 | Clements |
| 7,967,898 B2* | 6/2011 | Sporre et al. ............... 95/280 |
| 2004/0103626 A1* | 6/2004 | Warth et al. ............... 55/467 |
| 2005/0034436 A1* | 2/2005 | Pipkorn et al. ............... 55/379 |
| 2006/0101998 A1* | 5/2006 | Gieseke et al. ............... 95/273 |
| 2008/0127825 A1 | 6/2008 | Raether |
| 2008/0127826 A1 | 6/2008 | Raether et al. |
| 2008/0127827 A1 | 6/2008 | Raether |
| 2011/0078985 A1* | 4/2011 | Belcher et al. ............... 55/302 |

* cited by examiner

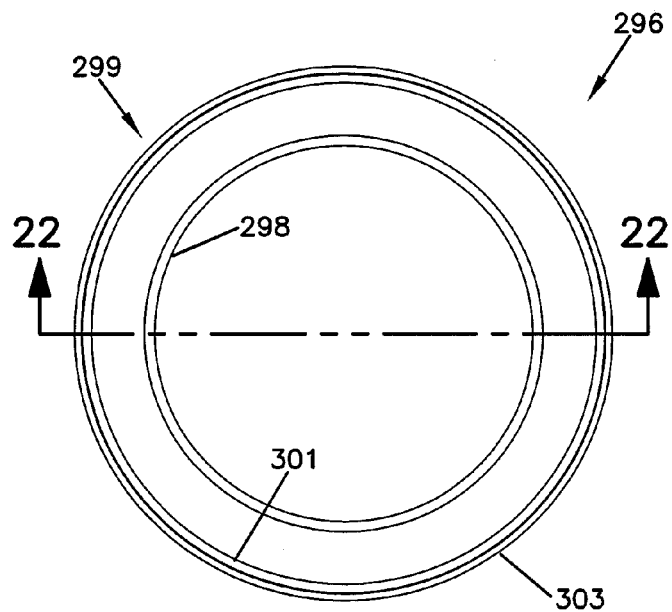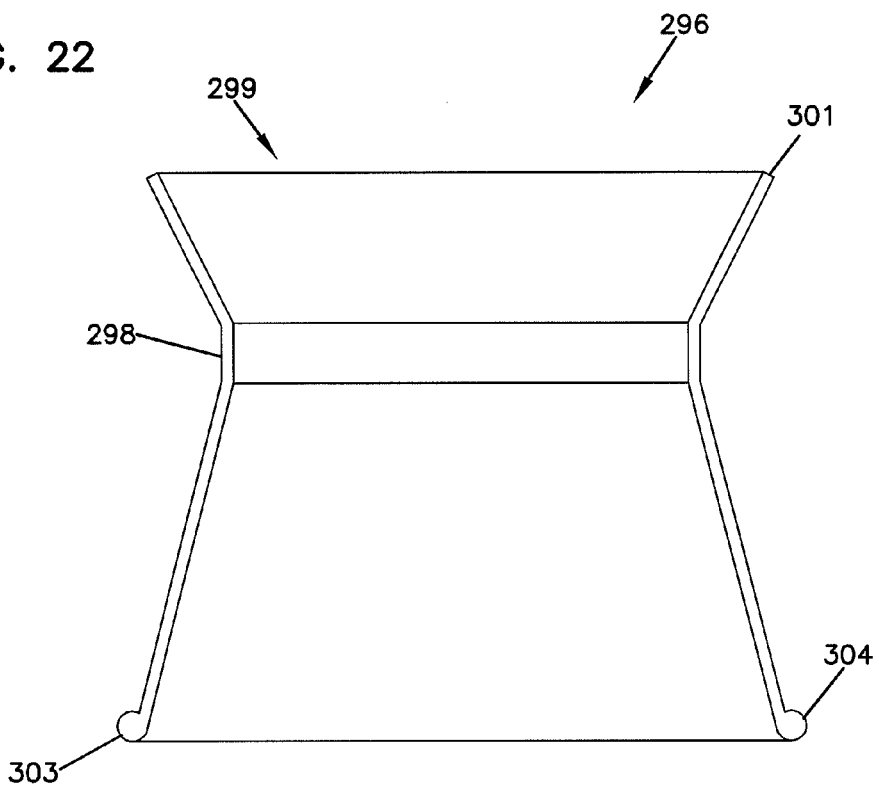

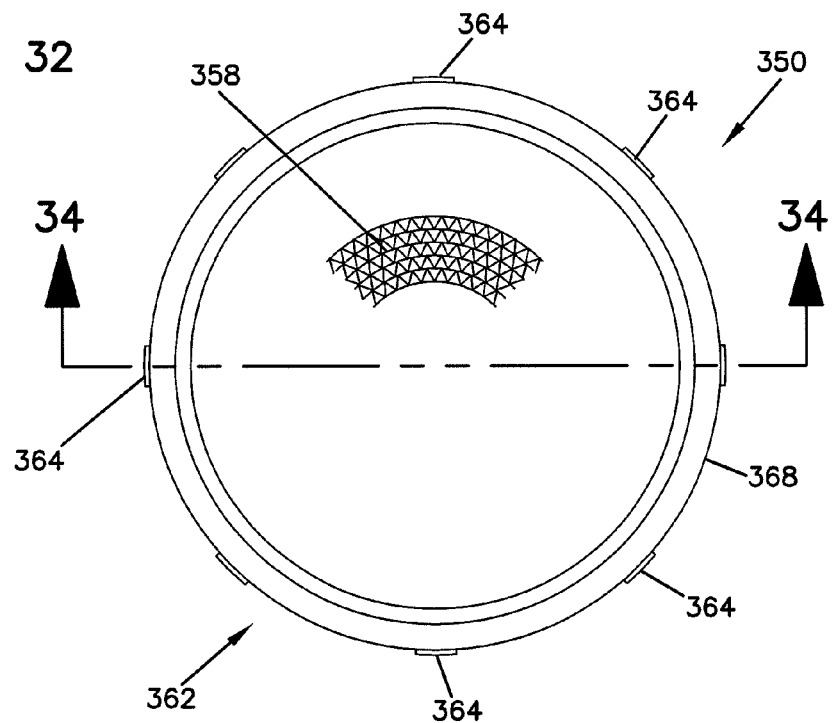
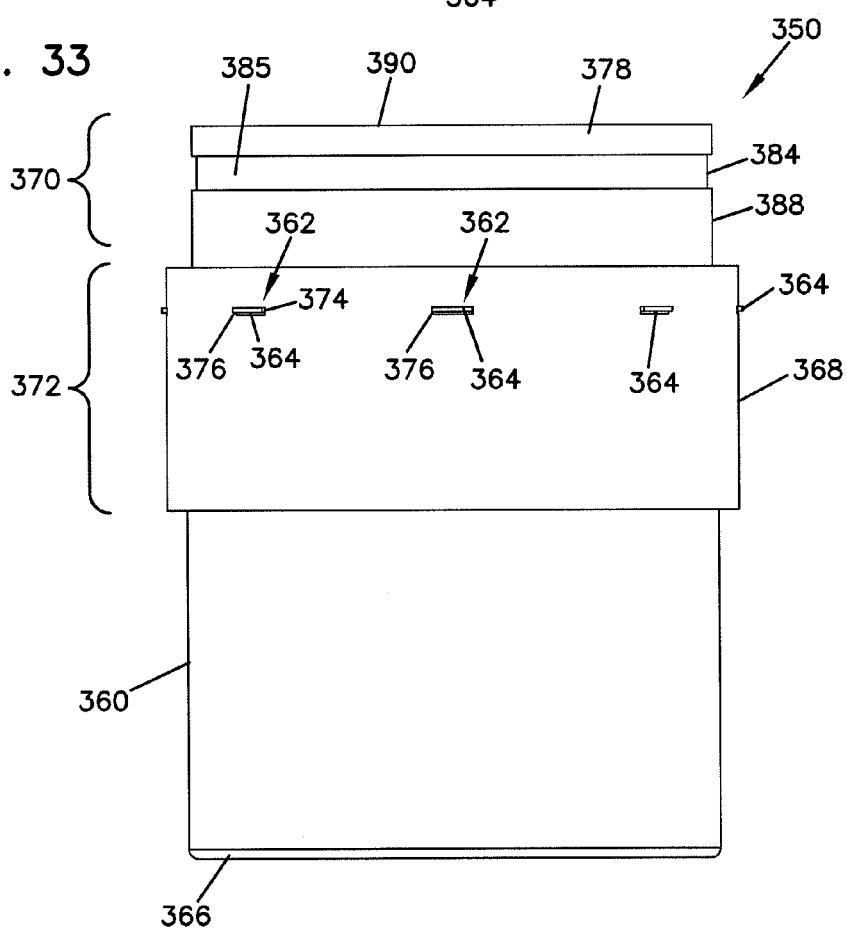

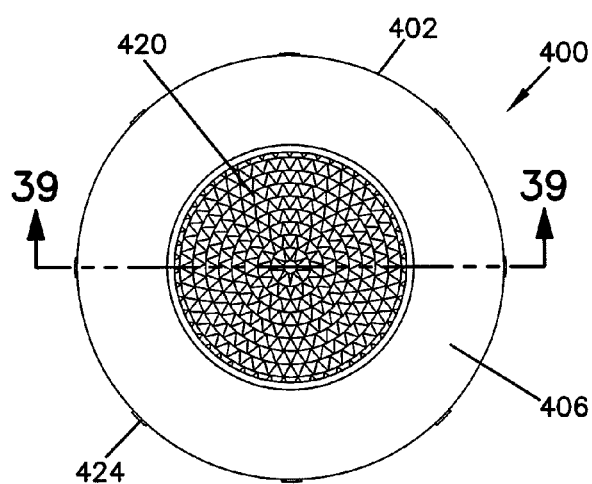
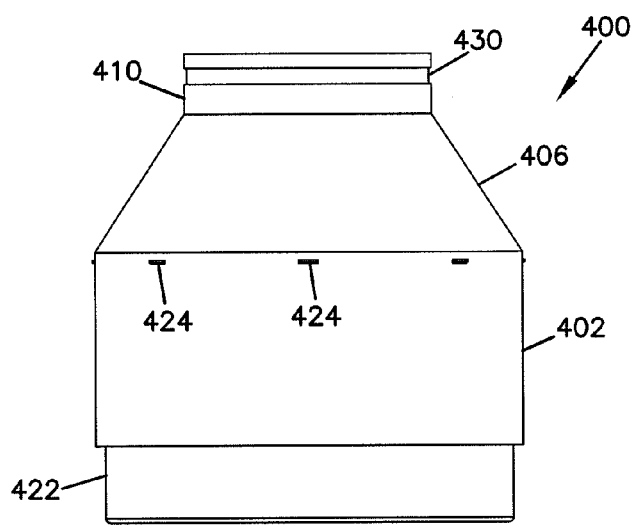
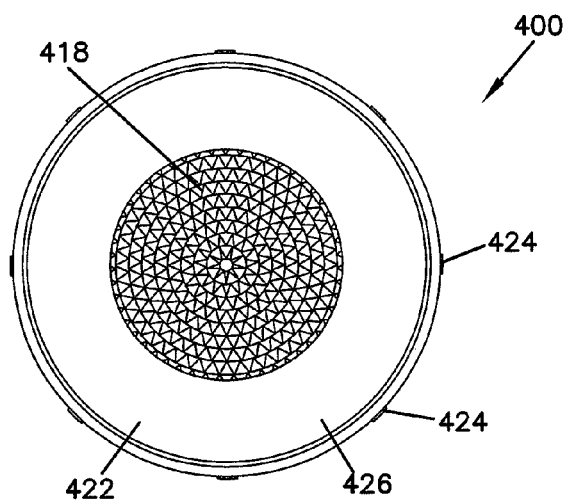

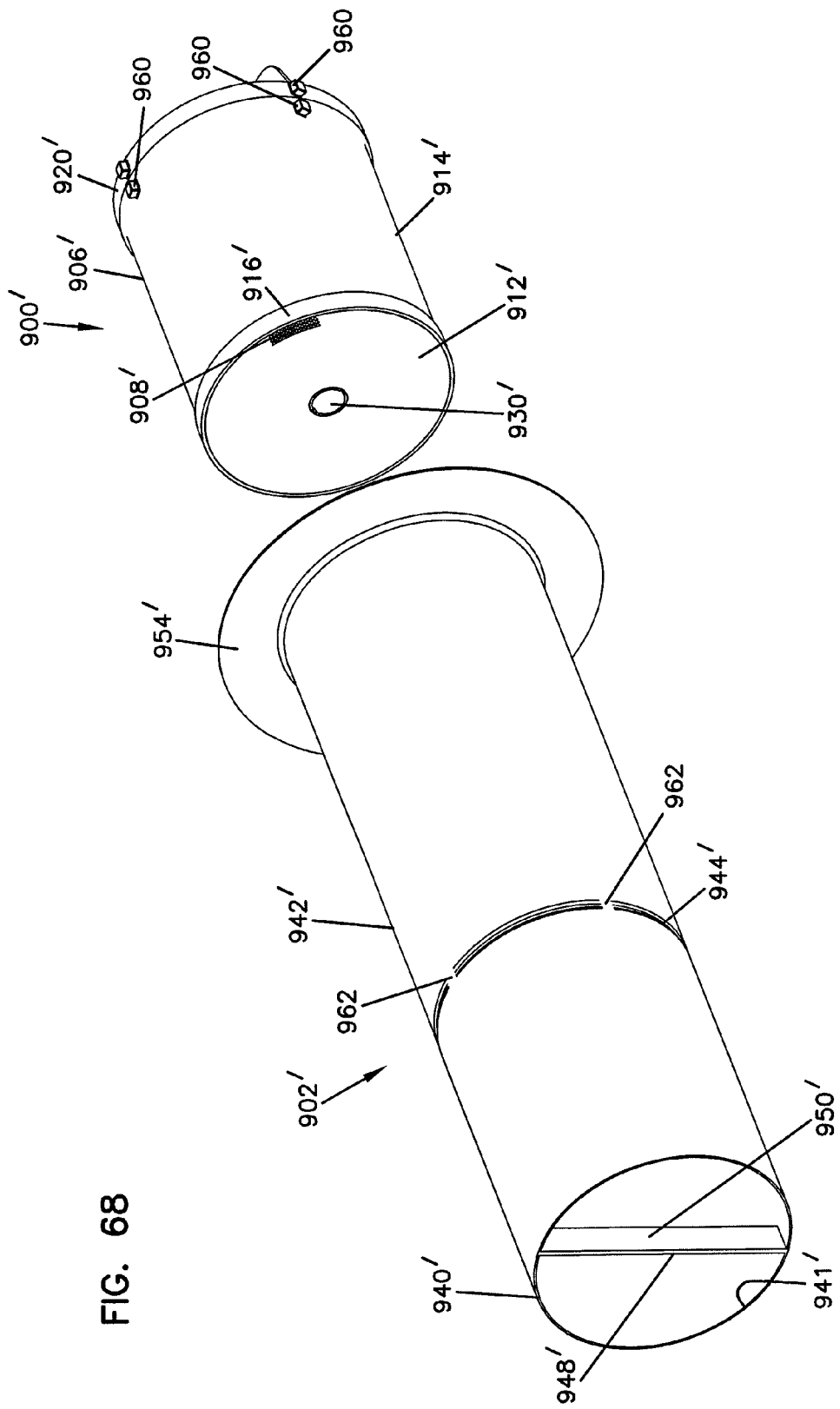

FILTER ELEMENT; COMPONENTS THEREOF; AND METHODS

This application is being filed on 13 Jul. 2011, as a US National Stage of PCT International Patent application No. PCT/US2010/020870, filed 13 Jan. 2010 in the name of Donaldson Company, Inc., a U.S. national corporation, applicant for the designation of all countries except the US, and Thomas D. Raether and Brian Zauner, both citizens of the U.S., applicants for the designation of the US only, which claims benefit of U.S. Provisional patent application Ser. No. 61/144,545, filed Jan. 14, 2009 and which application(s) are incorporated herein by reference. To the extent appropriate, a claim of priority is made to each of the above disclosed applications.

FIELD OF THE DISCLOSURE

The present disclosure concerns filters for cleaning air, for example, for use in dust collectors and other equipment. In particular, this disclosure concerns z-filters and methods for retrofitting dust collectors.

BACKGROUND

Dust collectors are used to clean particulate matter from airflow streams. One embodiment of dust collectors includes bag house filters. Bag house filters include: a housing, a dirty air inlet, a clean air outlet, and a tube sheet having a plurality of apertures. The tube sheet separates the housing between a dirty air side and a clean air side and holds filter bags. The bags are made of a filter media so that as dirty air flows from the dirty air side to the clean air side, the air must flow through the bags and the filter media of the bags prevents particulate matter from reaching the clean air side. Bags can be difficult to handle and have many shortcomings.

Improvements are desirable.

SUMMARY OF THE DISCLOSURE

Z-filters are described that are capable of cleaning particulate matter from airflow streams.

Methods are described for retrofitting bag house dust collectors.

It is noted that not all the specific features described herein need to be incorporated in an arrangement for the arrangement to have some selected advantage according to the present disclosure.

BRIEF DESCRIPTION OF THE DRAWINGS

FIG. 21 is a top plan view of the air flow tube of FIG. 20.

FIG. 22 is a cross-sectional view of the air flow tube of FIG. 20, the cross-section being taken along the line 22-22 of FIG. 21.

FIG. 32 is a top plan view of the filter element of FIG. 31.

FIG. 33 is a front elevational view of the filter element of FIG. 31.

FIG. 36 is a top plan view of the filter element of FIG. 35.

FIG. 37 is a front elevational view of the filter element of FIG. 35.

FIG. 38 is a bottom plan view of the filter element of FIG. 35.

FIG. 68 is an exploded, perspective view of an alternate embodiment of the filter element and filter retainer tube of FIG. 64.

DETAILED DESCRIPTION

I. Z-Filter Media Configurations, Generally

Figure 1:
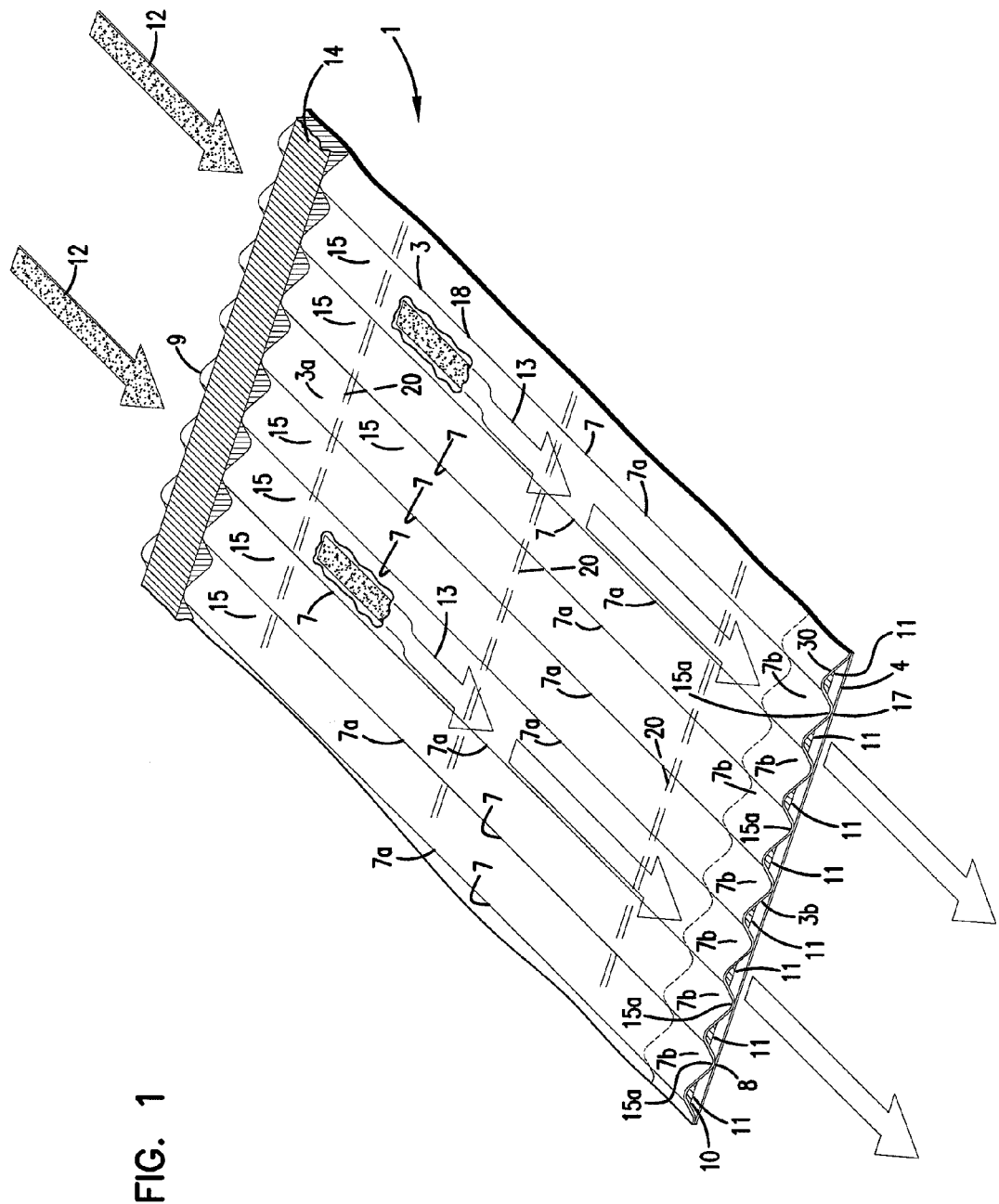
FIG. 1 is a fragmentary, schematic, perspective view of a single facer strip of z-filter media comprising a fluted sheet secured into a facing sheet.

Fluted filter media can be used to provide fluid filter constructions in a variety of manners. One well known manner is as a z-filter construction. The term "z-filter construction" as used herein, is meant to refer to a filter construction in which individual ones of corrugated, folded or otherwise formed filter flutes are used to define sets of longitudinal filter flutes for fluid flow through the media; the fluid flowing along the length of the flutes between opposite inlet and outlet flow ends (or flow faces) of the media. Some examples of z-filter media are provided in U.S. Pat. Nos. 5,820,646; 5,772,883; 5,902,364; 5,792,247; 5,895,574; 6,210,469; 6,190,432; 6,350,296; 6,179,890; 6,235,195; Des. 399,944; Des. 428,128; Des. 396,098; Des. 398,046; and, Des. 437,401; each of these fifteen cited references being incorporated herein by reference.

One type of z-filter media utilizes two specific media components joined together, to form the media construction. The two components are: (1) a fluted (typically corrugated) media sheet; and, (2) a facing media sheet. The facing media sheet is typically non-corrugated, however it can be corrugated, for example perpendicularly to the flute direction as described in U.S. provisional 60/543,804, filed Feb. 11, 2004, incorporated herein by reference.

The fluted (typically corrugated) media sheet and the facing media sheet, together, are used to define media having parallel inlet and outlet flutes; i.e. opposite sides of the fluted sheet operable as inlet and outlet flow regions. In some instances, the fluted sheet and non-fluted sheet are secured together and are then coiled to form a z-filter media construction. Such arrangements are described, for example, in U.S. Pat. Nos. 6,235,195 and 6,179,890, each of which is incorporated herein by reference. In certain other arrangements, some non-coiled sections of fluted media secured to flat media, are stacked on one another, to create a filter construction. An example of this is described in FIG. 11 of U.S. Pat. No. 5,820,646, incorporated herein by reference.

Typically, coiling of the fluted sheet/facing sheet combination around itself, to create a coiled media pack, is conducted with the facing sheet directed outwardly. Some techniques for coiling are described in U.S. provisional application 60/467,521, filed May 2, 2003 and PCT Application US04/07927, filed Mar. 17, 2004, published Sep. 30, 2004 as WO 2004/082795, incorporated herein by reference. The resulting coiled arrangement generally has, as the outer surface of the media pack, a portion of the facing sheet, as a result. In some instances a protective covering can be provided around the media pack.

The term "corrugated" when used herein to refer to structure in media, is meant to refer to a flute structure resulting from passing the media between two corrugation rollers, i.e., into a nip or bite between two rollers, each of which has surface features appropriate to cause a corrugation affect in the resulting media. The term "corrugation" is not meant to refer to flutes that are formed by techniques not involving passage of media into a bite between corrugation rollers. However, the term "corrugated" is meant to apply even if the media is further modified or deformed after corrugation, for example by the folding techniques described in PCT WO 04/007054, published Jan. 22, 2004, incorporated herein by reference.

Corrugated media is a specific form of fluted media. Fluted media is media which has individual flutes (for example formed by corrugating or folding) extending thereacross.

Serviceable filter element or filter cartridge configurations utilizing z-filter media are sometimes referred to as "straight through flow configurations" or by variants thereof. In general, in this context what is meant is that the serviceable filter elements generally have an inlet flow end (or face) and an opposite exit flow end (or face), with flow entering and exiting the filter cartridge in generally the same straight through direction. (The term "straight through flow configuration" disregards, for this definition, any air flow that passes out of the media pack through the outermost wrap of facing media.) The term "serviceable" in this context is meant to refer to a media containing filter cartridge that is periodically removed and replaced from a corresponding air cleaner. In some instances, each of the inlet flow end and outlet flow end will be generally flat or planar, with the two parallel to one another. However, variations from this, for example non-planar faces are possible.

In general, the media pack includes appropriate seal material therein, to ensure there is no unfiltered flow of air through the media pack, in extension from front flow face (an inlet flow face) completely through and outwardly from opposite oval face (outlet flow face).

A straight through flow configuration (especially for a coiled media pack) is, for example, in contrast to serviceable filter cartridges such as cylindrical pleated filter cartridges of the type shown in U.S. Pat. No. 6,039,778, incorporated herein by reference, in which the flow generally makes a turn as its passes through the serviceable cartridge. That is, in a U.S. Pat. No. 6,039,778 filter, the flow enters the cylindrical filter cartridge through a cylindrical side, and then turns to exit through an end face (in forward-flow systems). In a typical reverse-flow system, the flow enters the serviceable cylindrical cartridge through an end face and then turns to exit through a side of the cylindrical filter cartridge. An example of such a reverse-flow system is shown in U.S. Pat. No. 5,613,992, incorporated by reference herein.

The term "z-filter media construction" and variants thereof as used herein, without more, is meant to refer to any or all of: a web of corrugated or otherwise fluted media secured to (facing) media with appropriate sealing to inhibit air flow from one flow face to another without filtering passage through the filter media; and/or, such a media coiled or otherwise constructed or formed into a three dimensional network of flutes; and/or, a filter construction including such media. In many arrangements, the z-filter media construction is configured for the formation of a network of inlet and outlet flutes, inlet flutes being open at a region adjacent an inlet face and being closed at a region adjacent an outlet face; and, outlet flutes being closed adjacent an inlet face and being open adjacent an outlet face. However, alternative z-filter media arrangements are possible, see for example US 2006/0091084 A1, published May 4, 2006, incorporated herein by reference; also comprising flutes extending between opposite flow faces, with a seal arrangement to prevent flow of unfiltered air through the media pack.

In FIG. 1 herein, an example of media 1 useable in z-filter media is shown. The media 1 is formed from a fluted (corrugated) sheet 3 and a facing sheet 4. Herein, a strip of media comprising fluted sheet secured to facing sheet will sometimes be referred to as a single facer strip, or by similar terms.

In general, the corrugated sheet 3, FIG. 1 is of a type generally characterized herein as having a regular, curved, wave pattern of flutes or corrugations 7. The term "wave pattern" in this context, is meant to refer to a flute or corrugated pattern of alternating troughs $7b$ and ridges $7a$. The term "regular" in this context is meant to refer to the fact that the pairs of troughs and ridges ($7b$, $7a$) alternate with generally the same repeating corrugation (or flute) shape and size. (Also, typically in a regular configuration each trough $7b$ is substantially an inverse of each ridge $7a$.) The term "regular" is thus meant to indicate that the corrugation (or flute) pattern comprises troughs and ridges with each pair (comprising an adjacent trough and ridge) repeating, without substantial modification in size and shape of the corrugations along at least 70% of the length of the flutes. The term "substantial" in this context, refers to a modification resulting from a change in the process or form used to create the corrugated or fluted sheet, as opposed to minor variations from the fact that the media sheet 3 is flexible. With respect to the characterization of a repeating pattern, it is not meant that in any given filter construction; an equal number of ridges and troughs are necessarily present. The media 1 could be terminated, for example, between a pair comprising a ridge and a trough, or partially along a pair comprising a ridge and a trough. (For example, in FIG. 1 the media 1 depicted in fragmentary has eight complete ridges $7a$ and seven complete troughs $7b$.) Also, the opposite flute ends (ends of the troughs and ridges) may vary from one another. Such variations in ends are disregarded in these definitions, unless specifically stated. That is, variations in the ends of flutes are intended to be covered by the above definitions.

In the context of the characterization of a "curved" wave pattern of corrugations, the term "curved" is meant to refer to a corrugation pattern that is not the result of a folded or creased shape provided to the media, but rather the apex $7a$ of each ridge and the bottom $7b$ of each trough is formed along a radiused curve. Although alternatives are possible, a typical radius for such z-filter media would be at least 0.25 mm and typically would be not more than 3 mm. (Media that is not curved, by the above definition, can also be useable.)

An additional characteristic of the particular regular, curved, wave pattern depicted in FIG. 1, for the corrugated sheet 3, is that at approximately a midpoint 30 between each trough and each adjacent ridge, along most of the length of the flutes 7, is located a transition region where the curvature inverts. For example, viewing back side or face $3a$, FIG. 1, trough $7b$ is a concave region, and ridge $7a$ is a convex region. Of course when viewed toward front side or face $3b$, trough $7b$ of side $3a$ forms a ridge; and, ridge $7a$ of face $3a$, forms a trough. (In some instances, region 30 can be a straight segment, instead of a point, with curvature inverting at ends of the segment 30.)

A characteristic of the particular regular, curved, wave pattern corrugated sheet 3 shown in FIG. 1, is that the individual corrugations are generally straight. By "straight" in this context, it is meant that through at least 70% (typically at least 80%) of the length between edges 8 and 9, the ridges $7a$ and troughs $7b$ do not change substantially in cross-section. The term "straight" in reference to corrugation pattern shown in FIG. 1, in part distinguishes the pattern from the tapered flutes of corrugated media described in FIG. 1 of WO 97/40918 and PCT Publication WO 03/47722, published Jun. 12, 2003, incorporated herein by reference. The tapered flutes of FIG. 1 of WO 97/40918, for example, would be a curved wave pattern, but not a "regular" pattern, or a pattern of straight flutes, as the terms are used herein.

Referring to the present FIG. 1 and as referenced above, the media 1 has first and second opposite edges 8 and 9. When the media 1 is coiled and formed into a media pack, in general edge 9 will form an inlet end for the media pack and edge 8 an outlet end, although an opposite orientation is possible.

In the example shown, adjacent edge 8 is provided sealant, in this instance in the form of a sealant bead 10, sealing the corrugated (fluted) sheet 3 and the facing sheet 4 together. Bead 10 will sometimes be referred to as a "single facer" bead, since it is a bead between the corrugated sheet 3 and facing sheet 4, which forms the single facer or media strip 1. Sealant bead 10 seals closed individual flutes 11 adjacent edge 8, to passage of air therefrom.

In the example shown, adjacent edge 9, is provided sealant, in this instance in the form of a seal bead 14. Seal bead 14 generally closes flutes 15 to passage of unfiltered fluid therein, adjacent edge 9. Bead 14 would typically be applied as the media 1 is coiled about itself, with the corrugated sheet 3 directed to the inside. Thus, bead 14 will form a seal between a back side 17 of facing sheet 4, and side 18 of the corrugated sheet 3. The bead 14 will sometimes be referred to as a "winding bead" since it is typically applied, as the strip 1 is coiled into a coiled media pack. If the media 1 is cut in strips and stacked, instead of coiled, bead 14 would be a "stacking bead."

Referring to FIG. 1, once the media 1 is incorporated into a media pack, for example by coiling or stacking, it can be operated as follows. First, air in the direction of arrows 12, would enter open flutes 11 adjacent end 9. Due to the closure at end 8, by bead 10, the air would pass through the media shown by arrows 13. It could then exit the media pack, by passage through open ends 15a of the flutes 15, adjacent end 8 of the media pack. Of course operation could be conducted with air flow in the opposite direction.

In more general terms, z-filter media comprises fluted filter media secured to facing filter media, and configured in a media pack of flutes extending between first and second opposite flow faces. A sealant arrangement is provided within the media pack, to ensure that air entering flutes at a first upstream edge cannot exit the media pack from a downstream edge, without filtering passage through the media.

For the particular arrangement shown herein in FIG. 1, the parallel corrugations 7a, 7b are generally straight completely across the media, from edge 8 to edge 9. Straight flutes or corrugations can be deformed or folded at selected locations, especially at ends. Modifications at flute ends for closure are generally disregarded in the above definitions of "regular," "curved" and "wave pattern."

Z-filter constructions which do not utilize straight, regular curved wave pattern corrugation (flute) shapes are known. For example in Yamada et al. U.S. Pat. No. 5,562,825 corrugation patterns which utilize somewhat semicircular (in cross section) inlet flutes adjacent narrow V-shaped (with curved sides) exit flutes are shown (see FIGS. 1 and 3, of U.S. Pat. No. 5,562,825). In Matsumoto, et al. U.S. Pat. No. 5,049,326 circular (in cross-section) or tubular flutes defined by one sheet having half tubes attached to another sheet having half tubes, with flat regions between the resulting parallel, straight, flutes are shown, see FIG. 2 of Matsumoto '326. In Ishii, et al. U.S. Pat. No. 4,925,561 (FIG. 1) flutes folded to have a rectangular cross section are shown, in which the flutes taper along their lengths. In WO 97/40918 (FIG. 1), flutes or parallel corrugations which have a curved, wave patterns (from adjacent curved convex and concave troughs) but which taper along their lengths (and thus are not straight) are shown. Also, in WO 97/40918 flutes which have curved wave patterns, but with different sized ridges and troughs, are shown.

In general, the filter media is a relatively flexible material, typically a non-woven fibrous material (of cellulose fibers, synthetic fibers or both) often including a resin therein, sometimes treated with additional materials. Thus, it can be conformed or configured into the various corrugated patterns, without unacceptable media damage. Also, it can be readily coiled or otherwise configured for use, again without unacceptable media damage. Of course, it must be of a nature such that it will maintain the required corrugated configuration, during use.

In the corrugation process, an inelastic deformation is caused to the media. This prevents the media from returning to its original shape. However, once the tension is released the flute or corrugations will tend to spring back, recovering only a portion of the stretch and bending that has occurred. The facing sheet is sometimes tacked to the fluted sheet, to inhibit this spring back in the corrugated sheet.

Also, typically, the media contains a resin. During the corrugation process, the media can be heated to above the glass transition point of the resin. When the resin then cools, it will help to maintain the fluted shapes.

The media of the corrugated sheet 3 facing sheet 4 or both, can be provided with a fine fiber material on one or both sides thereof, for example in accord with U.S. Pat. No. 6,673,136, incorporated herein by reference.

An issue with respect to z-filter constructions relates to closing of the individual flute ends. Typically a sealant or adhesive is provided, to accomplish the closure. As is apparent from the discussion above, in typical z-filter media especially those which use straight flutes as opposed to tapered flutes, large sealant surface areas (and volume) at both the upstream end and the downstream end are needed. High quality seals at these locations are critical to proper operation of the media structure that results. The high sealant volume and area, creates issues with respect to this.

Still referring to FIG. 1, at 20 tack beads are shown positioned between the corrugated sheet 3 and facing sheet 4, securing the two together. The tack beads can be for example, discontinuous lines of adhesive. The tack beads can also be points in which the media sheets are welded together.

From the above, it will be apparent that the corrugated sheet 3 is typically not secured continuously to the facing sheet, along the troughs or ridges where the two adjoin. Thus, air can flow between adjacent inlet flutes, and alternately between the adjacent outlet flutes, without passage through the media. However air which has entered in inlet flute cannot exit from an outlet flute, without passing through at least one sheet of media, with filtering.

Figure 2:
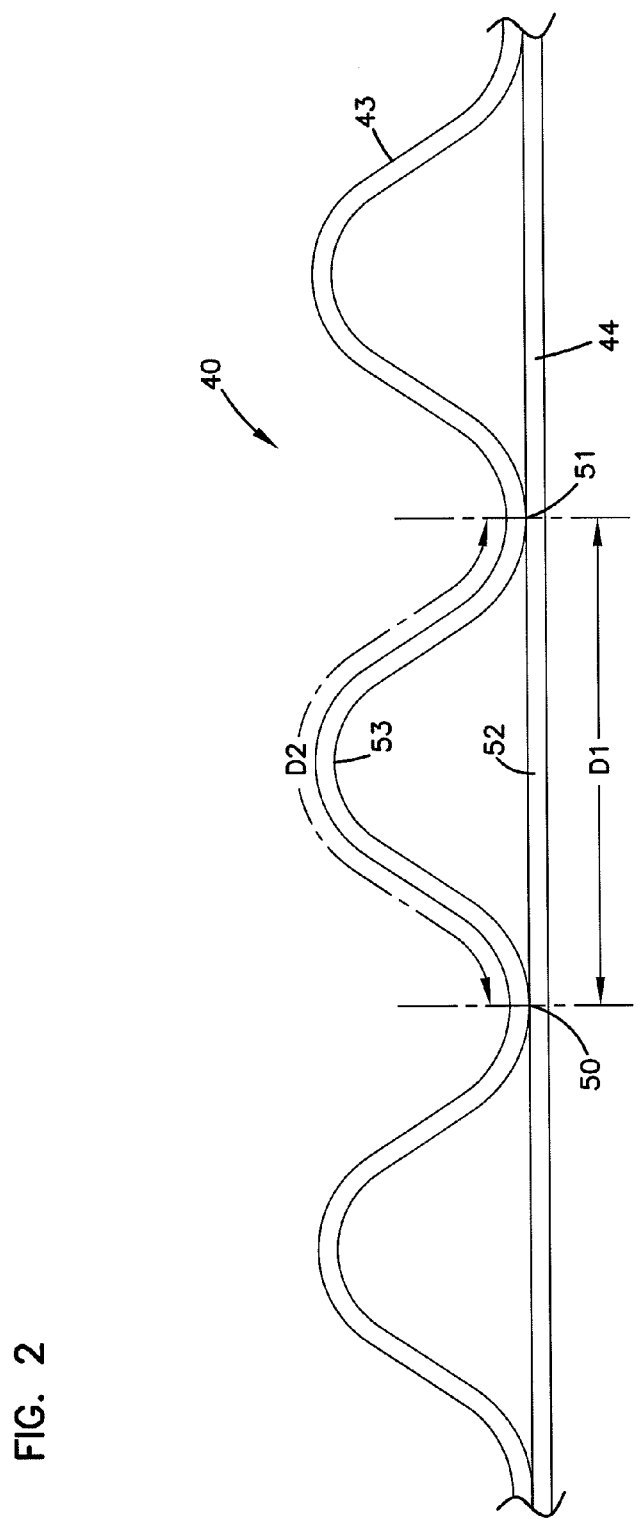
FIG. 2 is an enlarged, schematic, fragmentary view of a single facer sheet comprising fluted media secured to facing media.

Attention is now directed to FIG. 2, in which a z-filter media construction 40 utilizing a fluted (in this instance regular, curved, wave pattern corrugated) sheet 43, and a non-corrugated flat, facing, sheet 44, is depicted. The distance D1, between points 50 and 51, defines the extension of flat media 44 in region 52 underneath a given corrugated flute 53. The length D2 of the arch-shaped media for the corrugated flute 53, over the same distance D1 is of course larger than D1, due to the shape of the corrugated flute 53. For a typical regular shaped media used in fluted filter applications, the linear length D2 of the media 53 between points 50 and 51 will generally be at least 1.2 times D1. Typically, D2 would be within a range of 1.2-2.0, inclusive. One particularly convenient arrangement for air filters has a configuration in which D2 is about 1.25-1.35×D1. Such media has, for example, been used commercially in Donaldson Powercore™ Z-filter arrangements. Herein the ratio D2/D1 will sometimes be characterized as the flute/flat ratio or media draw for the corrugated media.

Figure 3:
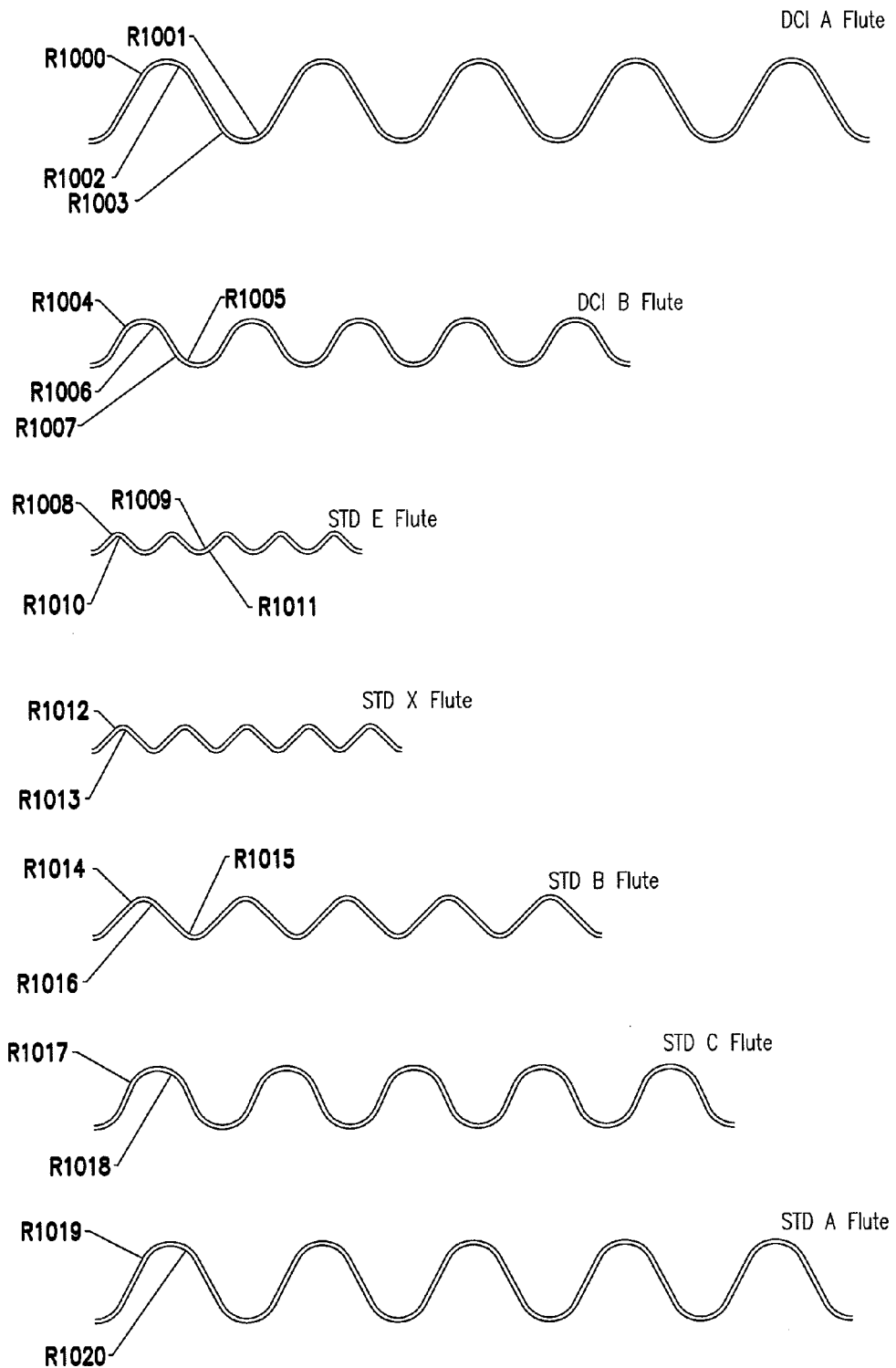
FIG. 3 is a schematic view of various selected flute shapes.

In the corrugated cardboard industry, various standard flutes have been defined. For example the standard E flute, standard X flute, standard B flute, standard C flute and standard A flute. FIG. 3, attached, in combination with Table A below provides definitions of these flutes.

Donaldson Company, Inc., (DCI) the assignee of the present disclosure, has used variations of the standard A and standard B flutes, in a variety of z-filter arrangements. These flutes are also defined in Table A and FIG. 3.

TABLE A (Flute definitions for FIG. 3)

| | |
|---|---|
| DCI A Flute: | Flute/flat = 1.52:1; The Radii (R) are as follows: R1000 = .0675 inch (1.715 mm); R1001 = .0581 inch (1.476 mm); R1002 = .0575 inch (1.461 mm); R1003 = .0681 inch (1.730 mm); |
| DCI B Flute: | Flute/flat = 1.32:1; The Radii (R) are as follows: R1004 = .0600 inch (1.524 mm); R1005 = .0520 inch (1.321 mm); R1006 = .0500 inch (1.270 mm); R1007 = .0620 inch (1.575 mm); |
| Std. E Flute: | Flute/flat = 1.24:1; The Radii (R) are as follows: R1008 = .0200 inch (.508 mm); R1009 = .0300 inch (.762 mm); R1010 = .0100 inch (.254 mm); R1011 = .0400 inch (1.016 mm); |
| Std. X Flute: | Flute/flat = 1.29:1; The Radii (R) are as follows: R1012 = .0250 inch (.635 mm); R1013 = .0150 inch (.381 mm); |
| Std. B Flute: | Flute/flat = 1.29:1; The Radii (R) are as follows: R1014 = .0410 inch (1.041 mm); R1015 = .0310 inch (.7874 mm); R1016 = .0310 inch (.7874 mm); |
| Std. C Flute: | Flute/flat = 1.46:1; The Radii (R) are as follows: R1017 = .0720 inch (1.829 mm); R1018 = .0620 inch (1.575 mm); |
| Std. A Flute: | Flute/flat = 1.53:1; The Radii (R) are as follows: R1019 = .0720 inch (1.829 mm); R1020 = .0620 inch (1.575 mm). |

Of course other, standard, flutes definitions from the corrugated box industry are known.

In general, standard flute configurations from the corrugated box industry can be used to define corrugation shapes or approximate corrugation shapes for corrugated media. Comparisons above between the DCI A flute and DCI B flute, and the corrugation industry standard A and standard B flutes, indicate some convenient variations. Other flute shapes, including ones with straight sides or side portions, are possible.

II. Manufacture of Coiled Media Configurations Using Fluted Media, Generally

Figure 4:
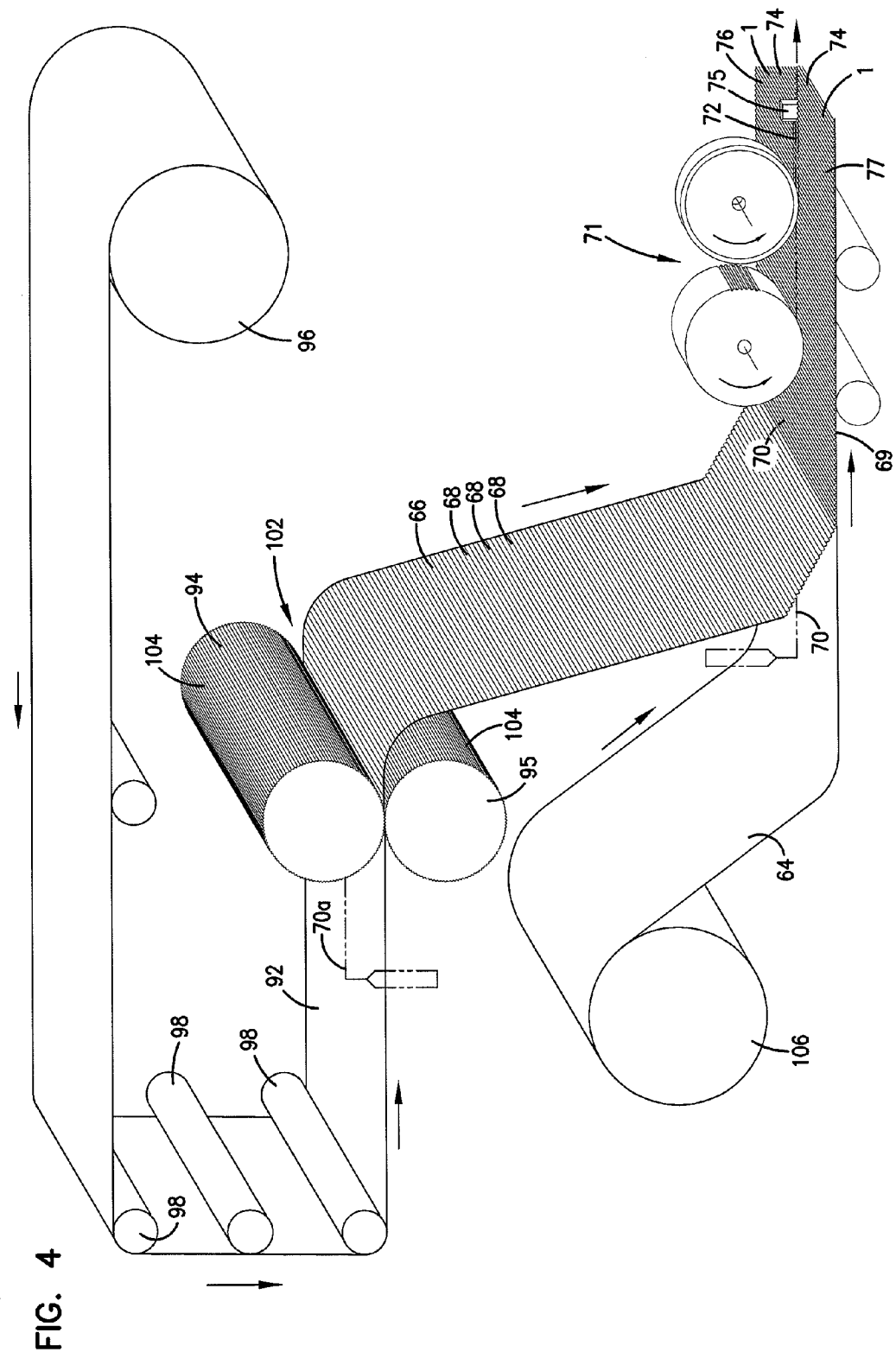
FIG. 4 is a schematic view of a process for making single facer media according to the present disclosure.

In FIG. 4, one example of a manufacturing process for making a media strip (single facer) corresponding to strip 1, FIG. 1 is shown. In general, facing sheet 64 and the fluted (corrugated) sheet 66 having flutes 68 are brought together to form a media web 69, with an adhesive bead located therebetween at 70. The adhesive bead 70 will form a single facer bead 10, FIG. 1. An optional darting process occurs at station 71 to form center darted section 72 located mid-web. The z-filter media or Z-media strip 74 can be cut or slit at 75 along the bead 70 to create two pieces 76, 77 of z-filter media 74, each of which has an edge with a strip of sealant (single facer bead) extending between the corrugating and facing sheet. Of course, if the optional darting process is used, the edge with a strip of sealant (single facer bead) would also have a set of flutes darted at this location.

Techniques for conducting a process as characterized with respect to FIG. 4 are described in PCT WO 04/007054, published Jan. 22, 2004 incorporated herein by reference.

Still in reference to FIG. 4, before the z-filter media 74 is put through the darting station 71 and eventually slit at 75, it must be formed. In the schematic shown in FIG. 4, this is done by passing a sheet of media 92 through a pair of corrugation rollers 94, 95. In the schematic shown in FIG. 4, the sheet of media 92 is unrolled from a roll 96, wound around tension rollers 98, and then passed through a nip or bite 102 between the corrugation rollers 94, 95. The corrugation rollers 94, 95 have teeth 104 that will give the general desired shape of the corrugations after the flat sheet 92 passes through the nip 102. After passing through the nip 102, the sheet 92 becomes corrugated across the machine direction and is referenced at 66 as the corrugated sheet. The corrugated sheet 66 is then secured to facing sheet 64. (The corrugation process may involve heating the media, in some instances.)

Still in reference to FIG. 4, the process also shows the facing sheet 64 being routed to the darting process station 71. The facing sheet 64 is depicted as being stored on a roll 106 and then directed to the corrugated sheet 66 to form the Z-media 74. The corrugated sheet 66 and the facing sheet 64 would typically be secured together by adhesive or by other means (for example by sonic welding).

Referring to FIG. 4, an adhesive line 70 is shown used to secure corrugated sheet 66 and facing sheet 64 together, as the sealant bead. Alternatively, the sealant bead for forming the facing bead could be applied as shown as 70a. If the sealant is applied at 70a, it may be desirable to put a gap in the corrugation roller 95, and possibly in both corrugation rollers 94, 95, to accommodate the bead 70a.

Of course the equipment of FIG. 4 can be modified to provide for the tack beads 20, if desired.

The type of corrugation provided to the corrugated media is a matter of choice, and will be dictated by the corrugation or corrugation teeth of the corrugation rollers 94, 95. One useful corrugation pattern will be a regular curved wave pattern corrugation, of straight flutes, as defined herein above. A typical regular curved wave pattern used, would be one in which the distance D2, as defined above, in a corrugated pattern is at least 1.2 times the distance D1 as defined above. In example applications, typically D2=1.25–1.35×D1, although alternatives are possible. In some instances the techniques may be applied with curved wave patterns that are not "regular," including, for example, ones that do not use straight flutes. Also, variations from the curved wave patterns shown, are possible.

Figure 5:
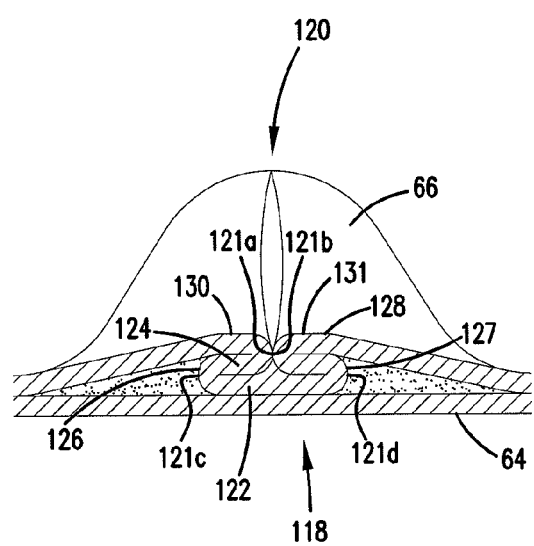
FIG. 5 is schematic, cross-sectional view of an example darted flute.

As described, the process shown in FIG. 4 can be used to create the center darted section 72. FIG. 5 shows, in cross-section, one of the flutes 68 after darting and slitting.

A fold arrangement 118 can be seen to form a darted flute 120 with four creases 121a, 121b, 121c, 121d. The fold arrangement 118 includes a flat first layer or portion 122 that is secured to the facing sheet 64. A second layer or portion 124 is shown pressed against the first layer or portion 122. The second layer or portion 124 is preferably formed from folding opposite outer ends 126, 127 of the first layer or portion 122.

Still referring to FIG. 5, two of the folds or creases 121a, 121b will generally be referred to herein as "upper, inwardly directed" folds or creases. The term "upper" in this context is meant to indicate that the creases lie on an upper portion of the entire fold 120, when the fold 120 is viewed in the orientation of FIG. 5. The term "inwardly directed" is meant to refer to the fact that the fold line or crease line of each crease 121a, 121b, is directed toward the other.

In FIG. 5, creases 121c, 121d, will generally be referred to herein as "lower, outwardly directed" creases. The term "lower" in this context refers to the fact that the creases 121c, 121d are not located on the top as are creases 121a, 121b, in the orientation of FIG. 5. The term "outwardly directed" is meant to indicate that the fold lines of the creases 121c, 121d are directed away from one another.

The terms "upper" and "lower" as used in this context are meant specifically to refer to the fold 120, when viewed from the orientation of FIG. 5. That is, they are not meant to be otherwise indicative of direction when the fold 120 is oriented in an actual product for use.

Based upon these characterizations and review of FIG. 5, it can be seen that a regular fold arrangement 118 according to FIG. 5 in this disclosure is one which includes at least two "upper, inwardly directed, creases." These inwardly directed creases are unique and help provide an overall arrangement in which the folding does not cause a significant encroachment on adjacent flutes.

A third layer or portion 128 can also be seen pressed against the second layer or portion 124. The third layer or portion 128 is formed by folding from opposite inner ends 130, 131 of the third layer 128.

Another way of viewing the fold arrangement 118 is in reference to the geometry of alternating ridges and troughs of the corrugated sheet 66. The first layer or portion 122 is formed from an inverted ridge. The second layer or portion 124 corresponds to a double peak (after inverting the ridge) that is folded toward, and in preferred arrangements, folded against the inverted ridge.

Techniques for providing the optional dart described in connection with FIG. 5, in a preferred manner, are described in PCT WO 04/007054, incorporated herein by reference. Techniques for coiling the media, with application of the winding bead, are described in PCT application U.S. Ser. No. 04/07927, filed Mar. 17, 2004 and incorporated herein by reference.

Alternate approaches to darting the fluted ends closed are possible. Such approaches can involve, for example, darting which is not centered in each flute, and rolling or folding over the various flutes. In general, darting involves folding or otherwise manipulating media adjacent to fluted end, to accomplish a compressed, closed, state.

Techniques described herein are particularly well adapted for use in media packs that result from a step of coiling a single sheet comprising a corrugated sheet/facing sheet combination, i.e., a "single facer" strip.

Coiled media pack arrangements can be provided with a variety of peripheral perimeter definitions. In this context the term "peripheral, perimeter definition" and variants thereof, is meant to refer to the outside perimeter shape defined, looking at either the inlet end or the outlet end of the media pack. Typical shapes are circular as described in PCT WO 04/007054 and PCT application U.S. Ser. No. 04/07927. Other useable shapes are obround, some examples of obround being oval shape. In general oval shapes have opposite curved ends attached by a pair of opposite sides. In some oval shapes, the opposite sides are also curved. In other oval shapes, sometimes called racetrack shapes, the opposite sides are generally straight. Racetrack shapes are described for example in PCT WO 04/007054 and PCT application U.S. Ser. No. 04/07927, each of which is incorporated herein by reference.

Another way of describing the peripheral or perimeter shape is by defining the perimeter resulting from taking a cross-section through the media pack in a direction orthogonal to the winding access of the coil.

Opposite flow ends or flow faces of the media pack can be provided with a variety of different definitions. In many arrangements, the ends are generally flat and perpendicular to one another. In other arrangements, the end faces include tapered, coiled, stepped portions which can either be defined to project axially outwardly from an axial end of the side wall of the media pack; or, to project axially inwardly from an end of the side wall of the media pack.

The flute seals (for example from the single facer bead, winding bead or stacking bead) can be formed from a variety of materials. In various ones of the cited and incorporated references, hot melt or polyurethane seals are described as possible for various applications.

Figure 6:
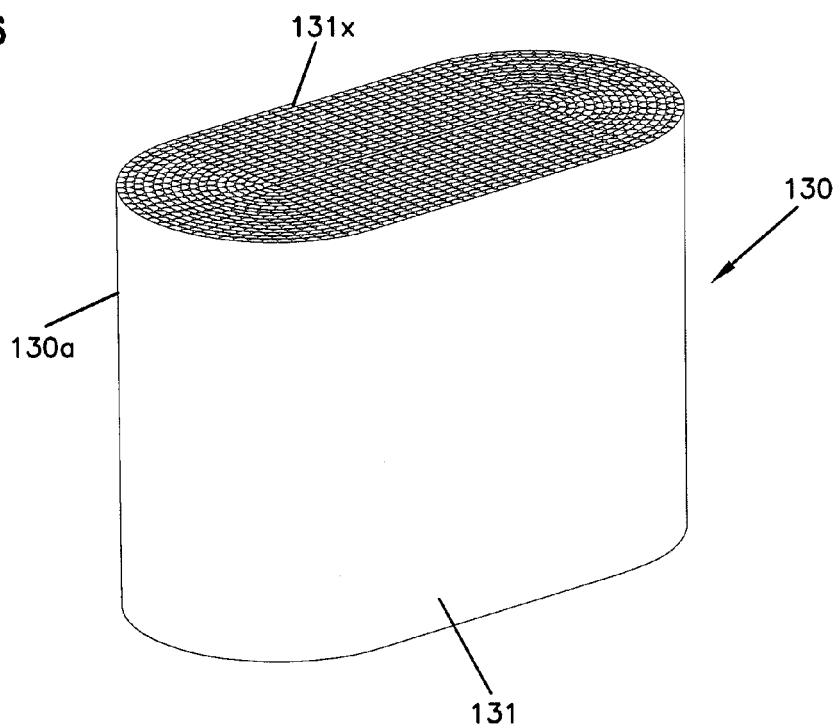
FIG. 6 is schematic, perspective view of a coiled media construction comprising a coiled sheet of single facer material.

Reference numeral 130, FIG. 6, generally indicates a coiled media pack 130. The coiled media pack 130 comprises a single strip 130a of single facer material comprising a fluted sheet secured to facing sheet coiled around a center. Typically, the coiling is with facing sheeting directed outwardly. As previously described, in general a single facer bead and winding bead would be used, to provide flute seals within the media.

The particular coiled media pack 130 depicted comprises an oval media pack 131. It is noted that the principles described herein, however, can be applied starting with the media pack having a circular configuration.

III. The Embodiments of FIGS. 7-51

Figure 7:
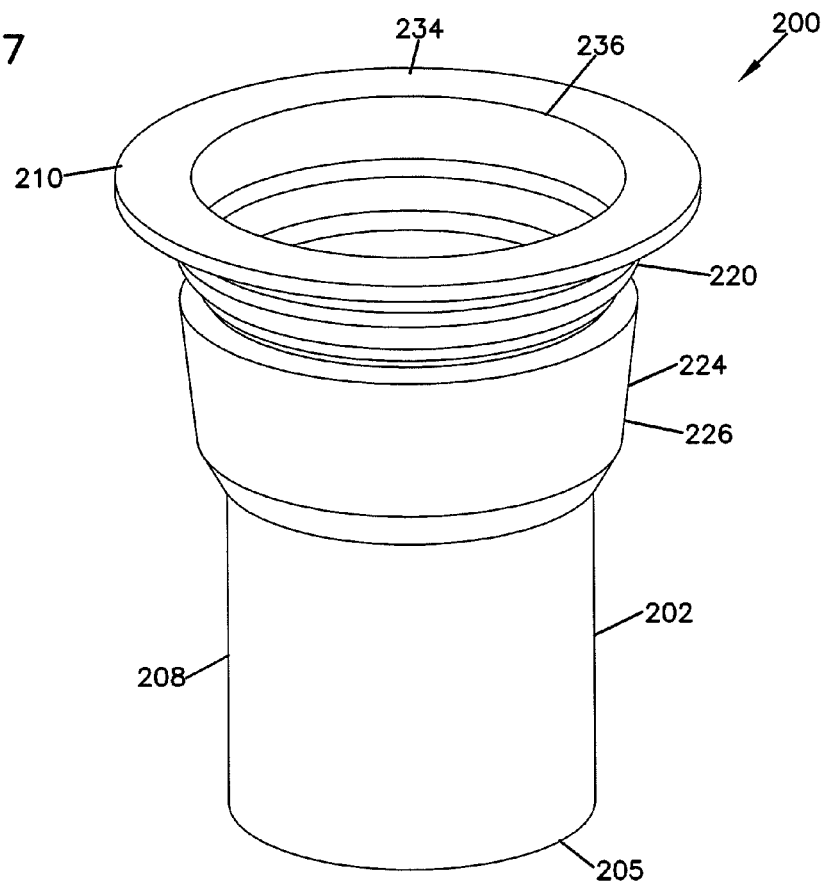
FIG. 7 is a perspective view of a first embodiment of a filter element constructed according to principles of this disclosure.
Figure 9:
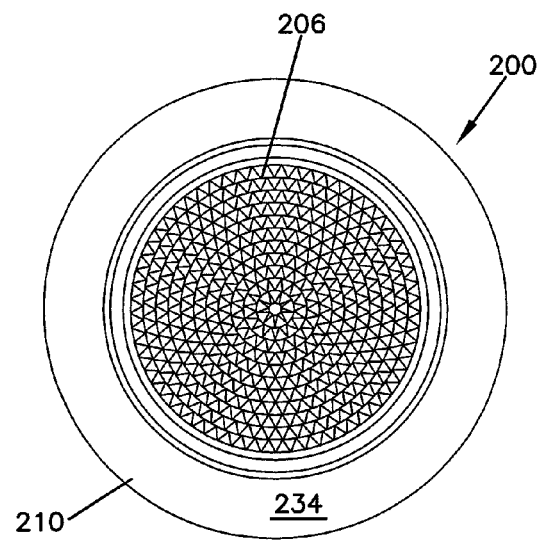
FIG. 9 is a top plan view of the filter element of FIG. 7.
Figure 8:
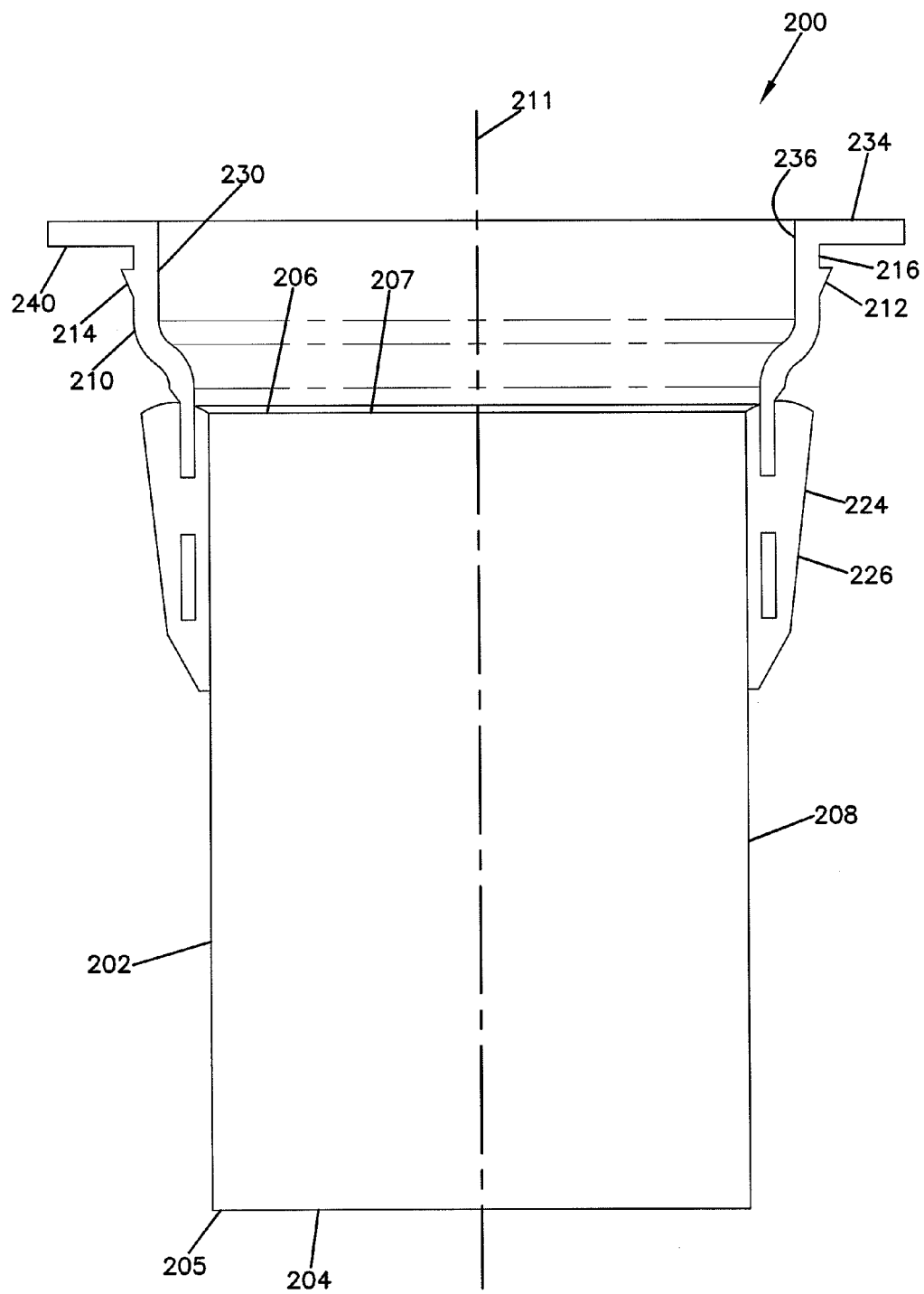
FIG. 8 is a cross-sectional view of the filter element of FIG. 7, the cross-section being taken along the line 8-8 of FIG. 9.

A first embodiment of a filter element constructed according to principles of this disclosure is illustrated in FIGS. 7-9 at 200. The filter element 200 includes a media pack 202. The media pack 202 is preferably Z-media, as characterized above. Specifically, the media pack 202 includes a first flow face 204 at a first end 205 of the media pack 202. The media pack 202 also includes a second flow face 206 at a second end 207 of the media pack 202. In the embodiment shown, the first flow face 204 and the second flow face 206 are parallel, but it is contemplated that in other embodiments, the first and second flow faces 204, 206 need not be parallel.

The media pack 202 includes fluted media with a plurality of flutes extending between the first flow face 204 and the second flow face 206. Selected ones of the flutes are open at the first flow face 204 and closed adjacent to the second flow face 206, while selected ones of the flutes are closed adjacent to the first flow face 204 and open at the second flow face 206. In the embodiment shown, the media pack 202 defines an outer peripheral surface 208.

In accordance with principles of this disclosure, the filter element 202 includes a hoop or a ring. In the embodiment shown, a ring 210 is secured to the media pack 202. In the specific embodiment shown, the ring 210 is secured to the outer peripheral surface 208 of the media pack 202.

In the embodiment shown, the ring 210 extends axially from the media pack 202. By the term "axially", it is meant along a longitudinal axis 211 such that there is a free end of the ring 210 that is spaced axially away from the media pack 202.

In accordance with principles of this disclosure, the ring 210 includes structure constructed and arranged to allow the media pack 202 to engage or connect with a tube sheet. The tube sheet 238 (FIG. 13) can be part of a dust collector, as shown in FIG. 13A', for example. In the embodiment shown in FIG. 8, the ring 210 has a ramp 212 which helps the ring 210 connect with the tube sheet 238. The ramp 212 includes a sloping surface 214. In this embodiment, the ring 210 further includes a recess 216. In this embodiment, the recess 216 is adjacent to the ramp 212.

Figure 10:
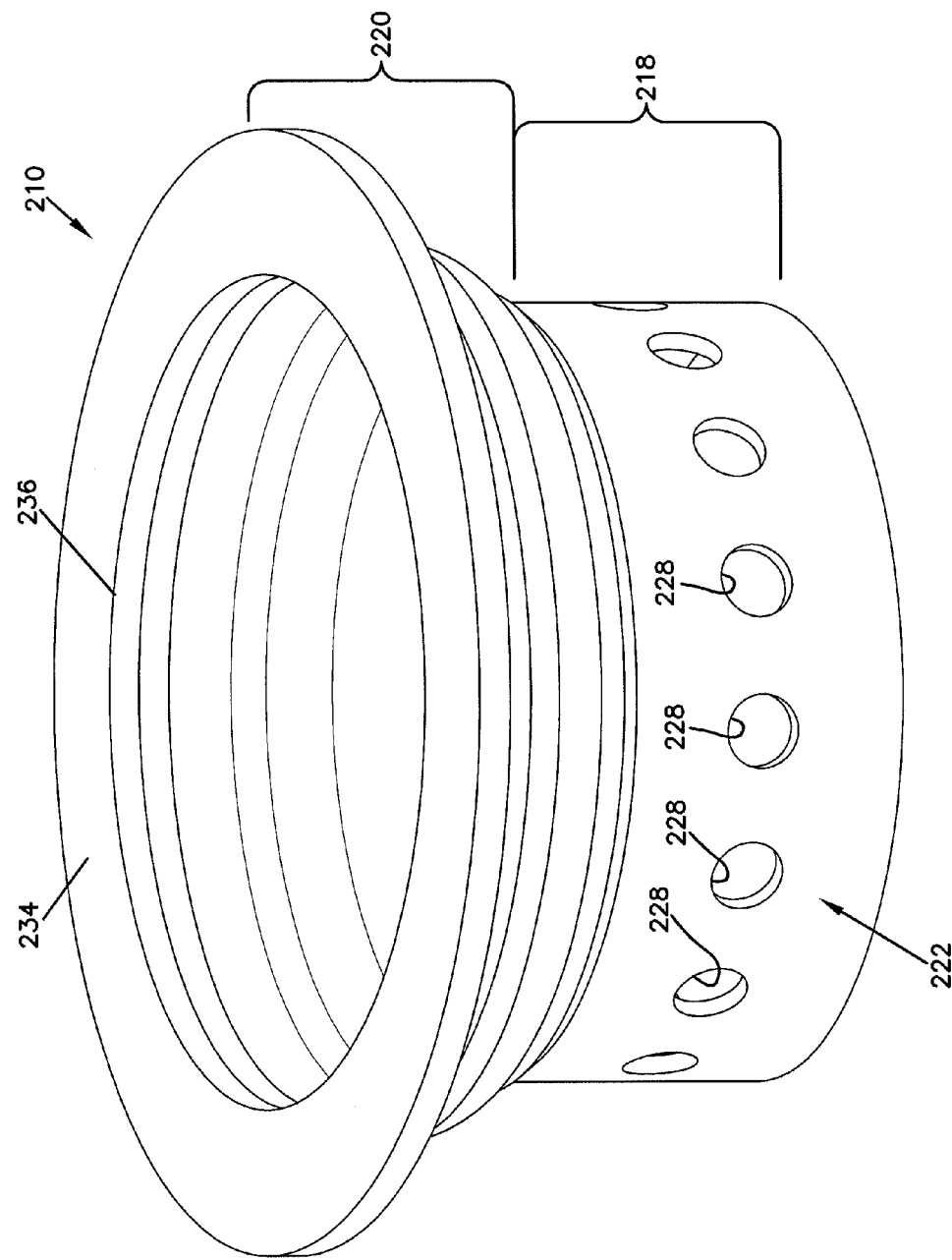
FIG. 10 is a perspective view of a ring used in the element of FIG. 7.
Figure 11:
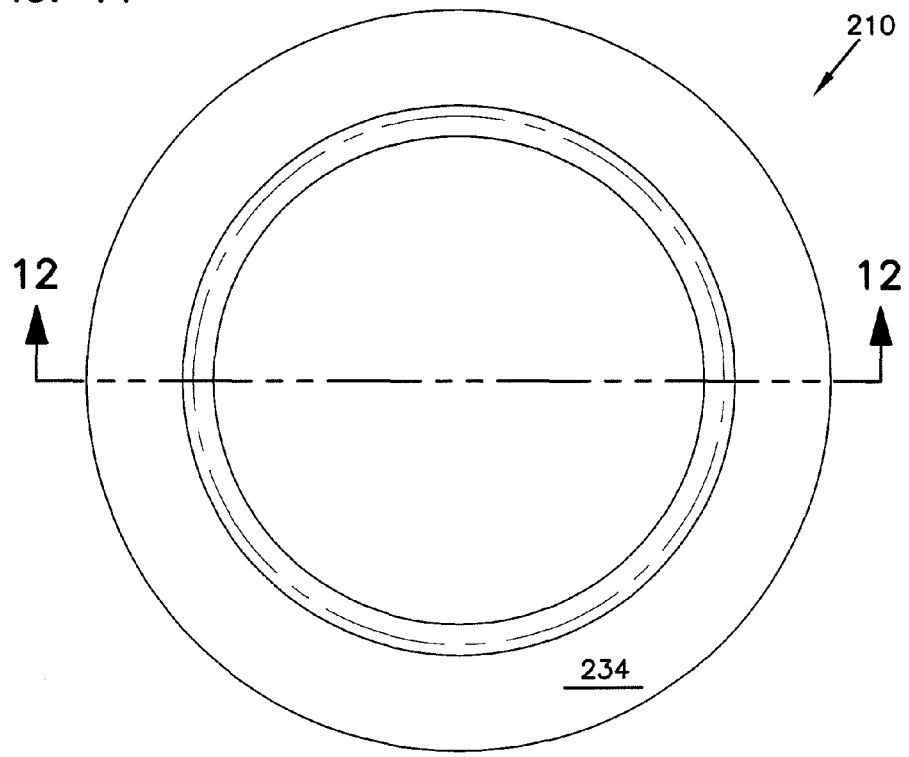
FIG. 11 is a top plan view of the ring of FIG. 10.
Figure 12:
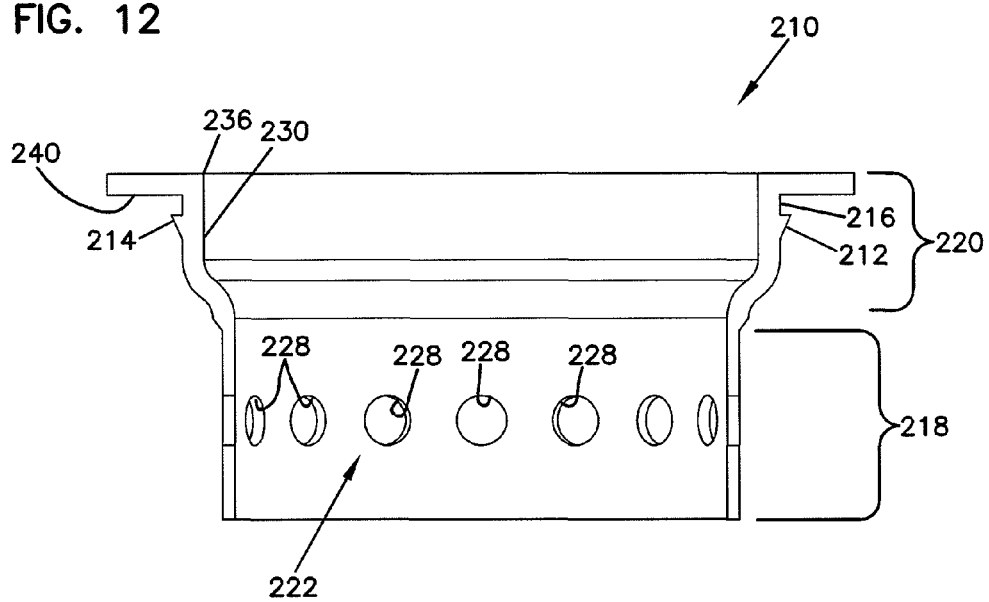
FIG. 12 is a schematic, cross-sectional view of the ring of FIG. 10, the cross-section being taken along the line 12-12 of FIG. 11.

One embodiment of the ring 210 is illustrated in FIGS. 10-12. In reference to FIGS. 8 and 10-12, it can be appreciated that the ring 210 depicted has an element securing portion 218 and a tube sheet engaging portion 220. In this embodiment, the tube sheet engaging portion 220 defines the ramp 212 and recess 216. The element securing portion 218, in this embodiment, is a portion of the ring that is adjacent to the outer peripheral surface 208.

A variety of ways can be used to secure the element securing portion 218 and the media pack 202. In the embodiment shown, the element securing portion 218 defines an aperture arrangement 222 therethrough. The aperture arrangement 222 allows for material such as urethane, plastisol, silicone, epoxy, or other materials to flow into the aperture arrangement 222 during a molding process and cure. Once it cures, the ring 210 is secured to the media pack 202.

FIG. 8 shows urethane 224 forming a band 226 around the outer peripheral surface 208 of the media pack 202. The urethane 224 can be seen flowing into the aperture arrangement 222.

In the embodiment shown, the aperture arrangement 222 includes a plurality of apertures 228 evenly spaced around the circumference of the ring 210. This embodiment shows the apertures 228 as circular. Of course, a variety of shapes and arrangements can be used in order to allow the urethane or other material to flow within the ring 210 and secure the ring 210 to the media pack 202.

In the embodiment shown, the media pack 202 is cylindrical in shape, having a circular cross-section. It should be understood, of course, that a variety of shapes can be used for the media pack 202, including oval, oblong, obround, racetrack, and square with rounded corners (scround). In this embodiment, the ring 210 will generally have the same cross-sectional shape as the cross-sectional shape of the media pack 202. In the embodiment of FIGS. 7-12, the ring 210 has a generally circular cross-section. As can be seen, however, the cross-section is not a uniform circular shape. In this embodiment, the tube sheet engaging portion 220 defines an inside dimension (for example, diameter) larger than an outside dimension (for example, diameter) of the element securing portion 218 and of the media pack 202.

In the embodiment shown in FIGS. 7-12, the tube sheet engaging portion 220 includes a wall 230. In the embodiment shown, the wall 230 is generally parallel to a longitudinal axis 211 extending through the media pack 202. Preferably, the ramp 212 projects from the wall 230. In the embodiment shown, the sloping surface 214 of the ramp 212 slopes radially outwardly and away from the media pack 202.

The ring 210, in this embodiment, further includes a flange 234. The flange 234 depicted is perpendicular to the wall 230 and extends radially outwardly from the wall 230. The flange 234 defines an end rim 236 of the ring 210. The recess 216 is defined between the flange 234 and the ramp 212.

Figure 13:
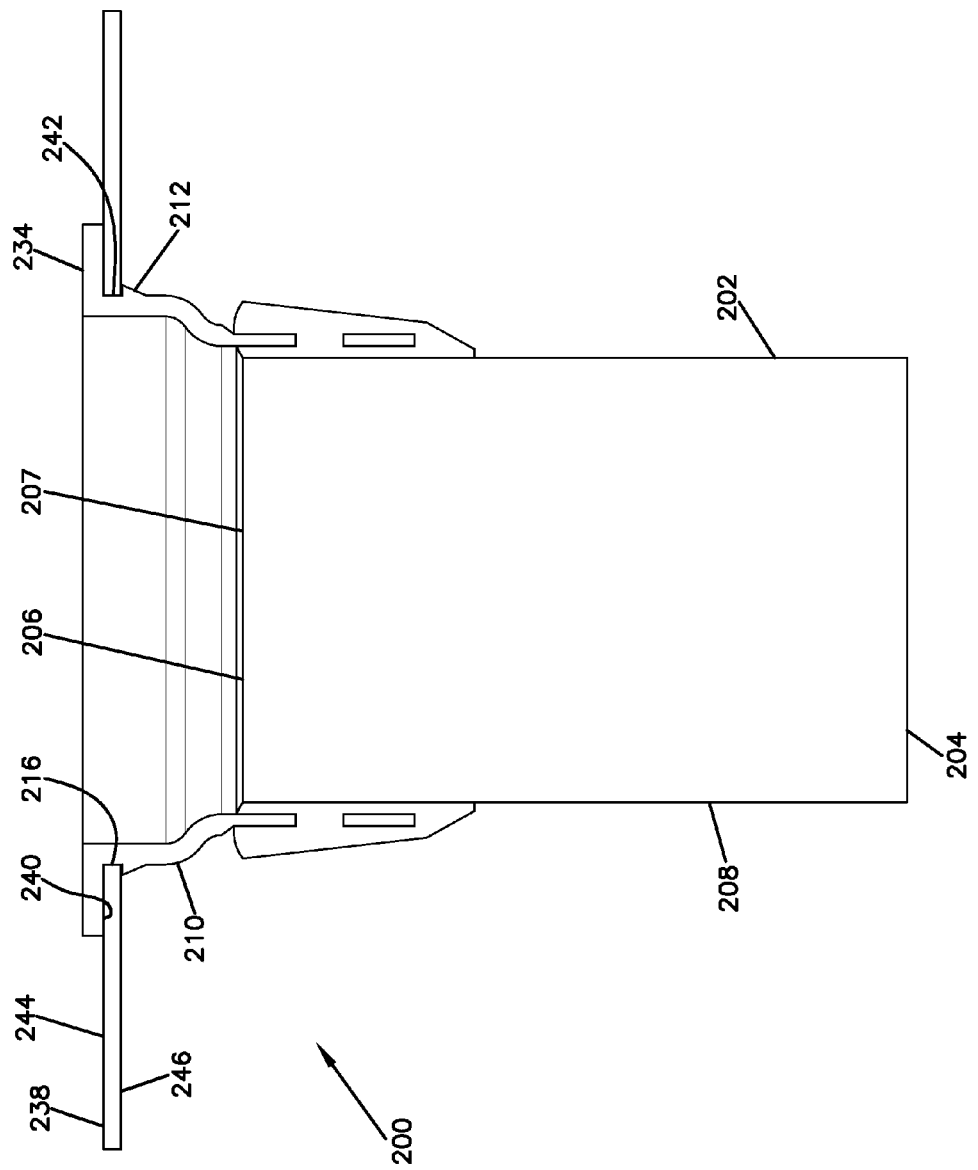
FIG. 13 is a cross-sectional view of the filter element of FIG. 7 installed in an aperture of a tube sheet.
Figure 13A:
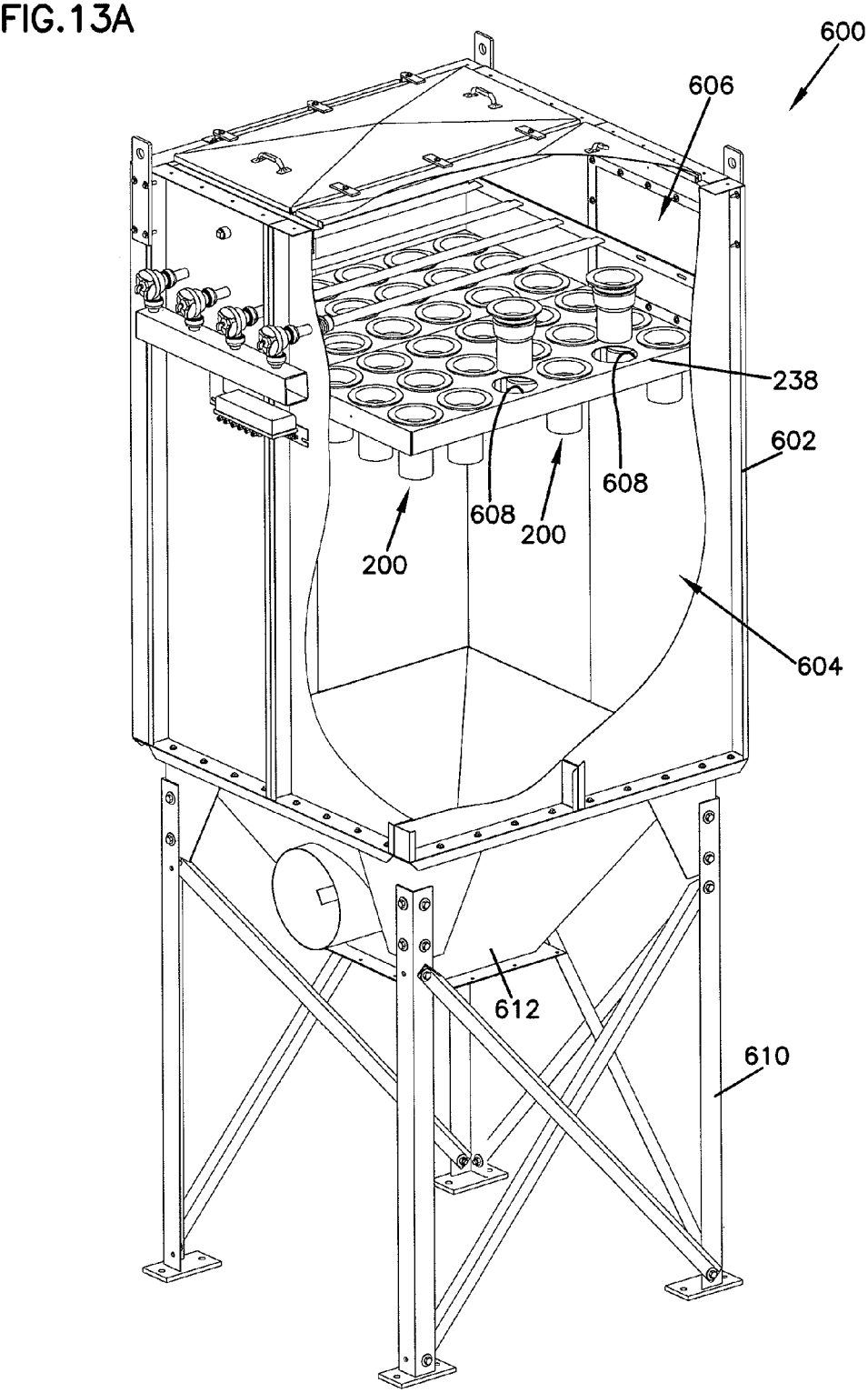
FIG. 13A is a perspective view of the filter elements of FIG. 7-13 installed in a dust collector.

FIG. 13 shows the filter element 200 operably oriented in place with a tube sheet 238. As can be seen, the flange 234 has an axial surface 240 (FIG. 8) that is engaged flat against the tube sheet 238. The recess 216 receives a rim 242 of the tube sheet 238. That is, the tube sheet 238 will define a plurality of holes or apertures, each having a rim 242. In this embodiment, the recess 216 receives the rim 242. The ramp 212 is on a side of the tube sheet 238 opposite of the side where the flange 234 engages against the tube sheet 238.

In some embodiments, there can be a gasket on the axial surface 240 of the flange 234. In this embodiment, just the physical contact between the ring 210 and the tube sheet 238 is sufficient to form a seal to prevent air flow from bypassing the media pack 202.

To install the filter element 200 into the tube sheet 238, the filter element 200 is oriented so that the media pack 202 is inserted through the aperture of the tube sheet 238 from a side 244 of the tube sheet 238. In many implementations, the side 244 of the tube sheet 238 will be a clean air side. The outermost dimension of the media pack 202 will be smaller than the dimension of the aperture of the tube sheet 238. Therefore, the media pack 202 passes easily through the aperture of the tube sheet 238. The ring 210 is made of a somewhat flexible material such that it can deflect. The ring 210 is sized such that the ramp 212 will engage the rim 242 of the tube sheet 238. As the ring 210 engages the tube sheet 238 along the ramp 212, the ring 210 will deflect radially inwardly. This deflection occurs until the rim 242 of the tube sheet 238 passes over the edge of the ramp 212 and is received by the recess 216. As this point, the ring 210 deflects back and into a sealed and engaged position with the tube sheet 238.

In operation, air to be filtered must flow through the media pack 202 in order to go from the dirty air flow side 246 of the tube sheet 238 to the clean air side 244. The seal between the ring 210 and the tube sheet 238 prevents air from bypassing the media pack 202. The media pack 202 removes particulate material from the air.

FIG. 13A shows a dust collector 600. The dust collector 600 includes a housing 602, a dirty air volume 604 and a clean air volume 606. The tube sheet 238 can be seen separating the dirty air volume 604 and the clean air volume 606. Not depicted in the embodiment of FIG. 13A is the clean air outlet. That portion has been removed so that the internal components are visible. Installed in apertures 608 in the tube sheet 238 are a plurality of filter elements 200. That is, for each aperture 608, a corresponding filter element 200 is installed therewithin. FIG. 13A also shows the dust collector housing 602 supported by legs or supports 610, and a dust collection hopper 612 located underneath the dirty air volume 604.

Figure 13B:
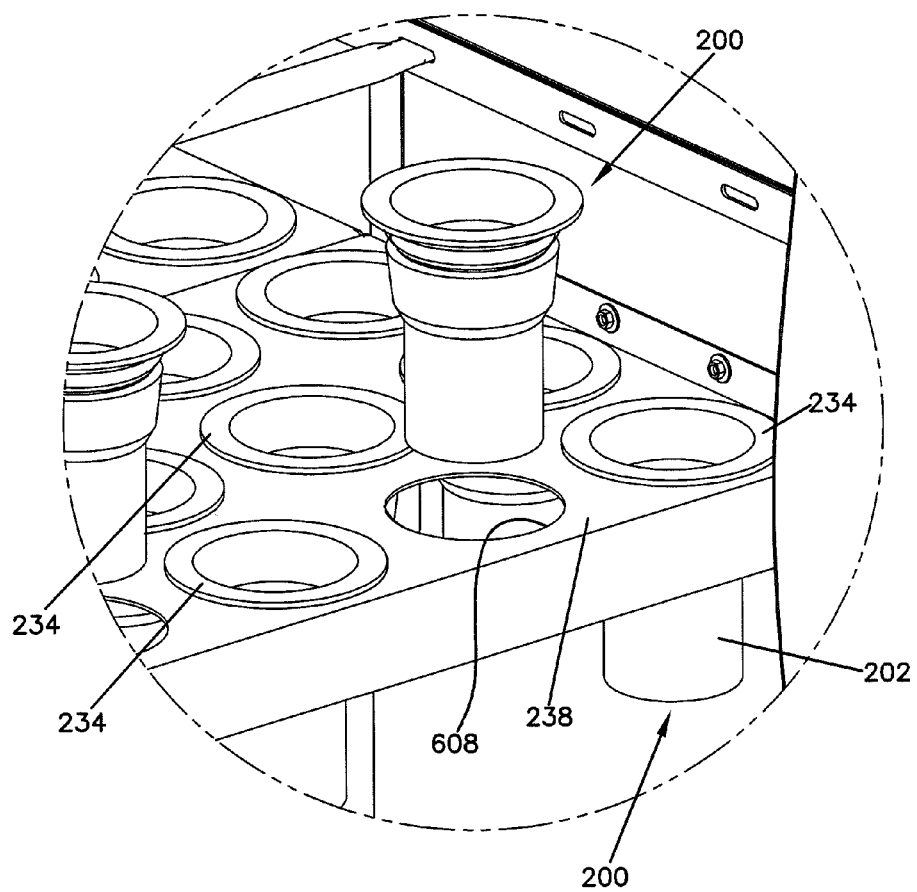
FIG. 13B is an enlarged perspective view of a portion of the dust collector of FIG. 13A showing one of the filter elements being installed in the dust collector.

FIG. 13B is an enlarged view of a portion of the filter elements 200 installed in the dust collector 606 of FIG. 13A. In operation, air to be filtered flows into the dust collector housing 602 and into the dirty air chamber 604. From there, the air flows through the media pack 202, which removes dirt and other particulate from the air. From there, the air emerges from the filter element 200 into the clean air volume 606. The air then exits the dust collector 600 through a clean air outlet.

Figure 14:
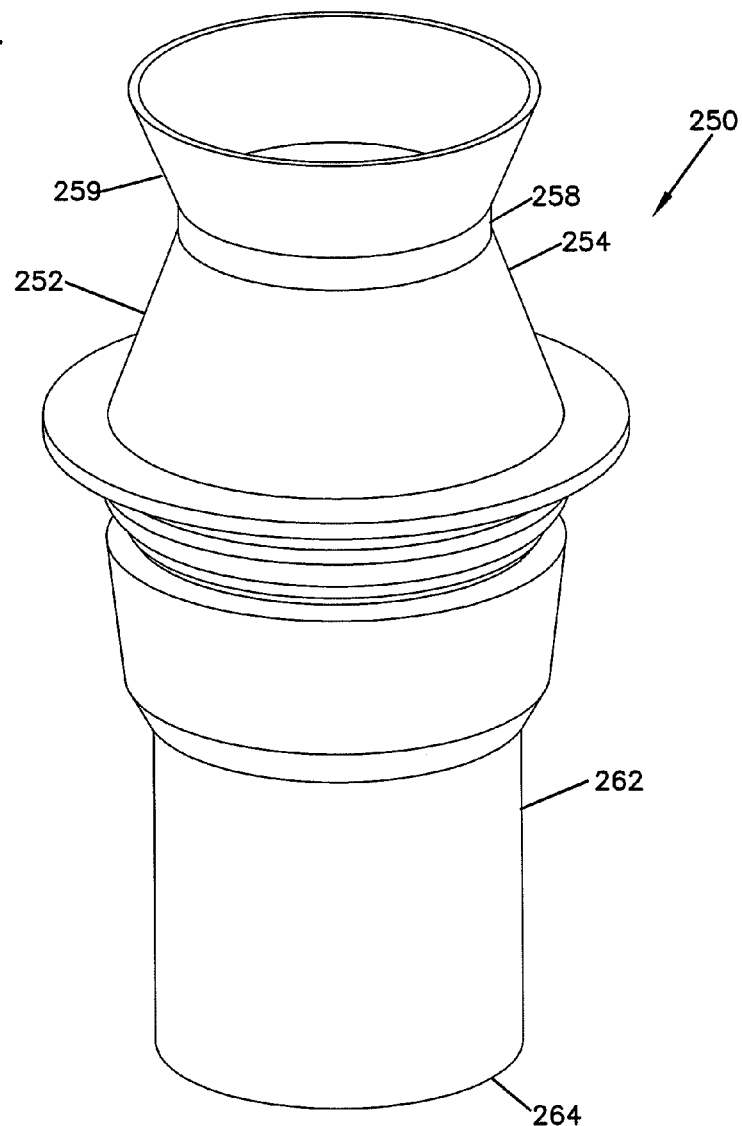
FIG. 14 is perspective view of another embodiment of a filter element constructed according to principles of this disclosure.
Figure 15:
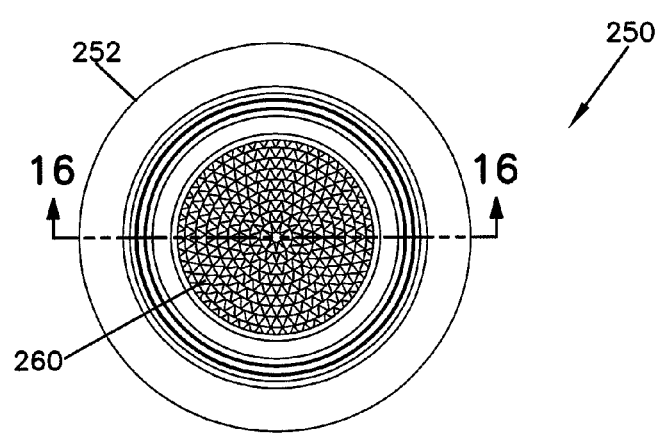
FIG. 15 is a top plan view of the filter element of FIG. 14.
Figure 16:
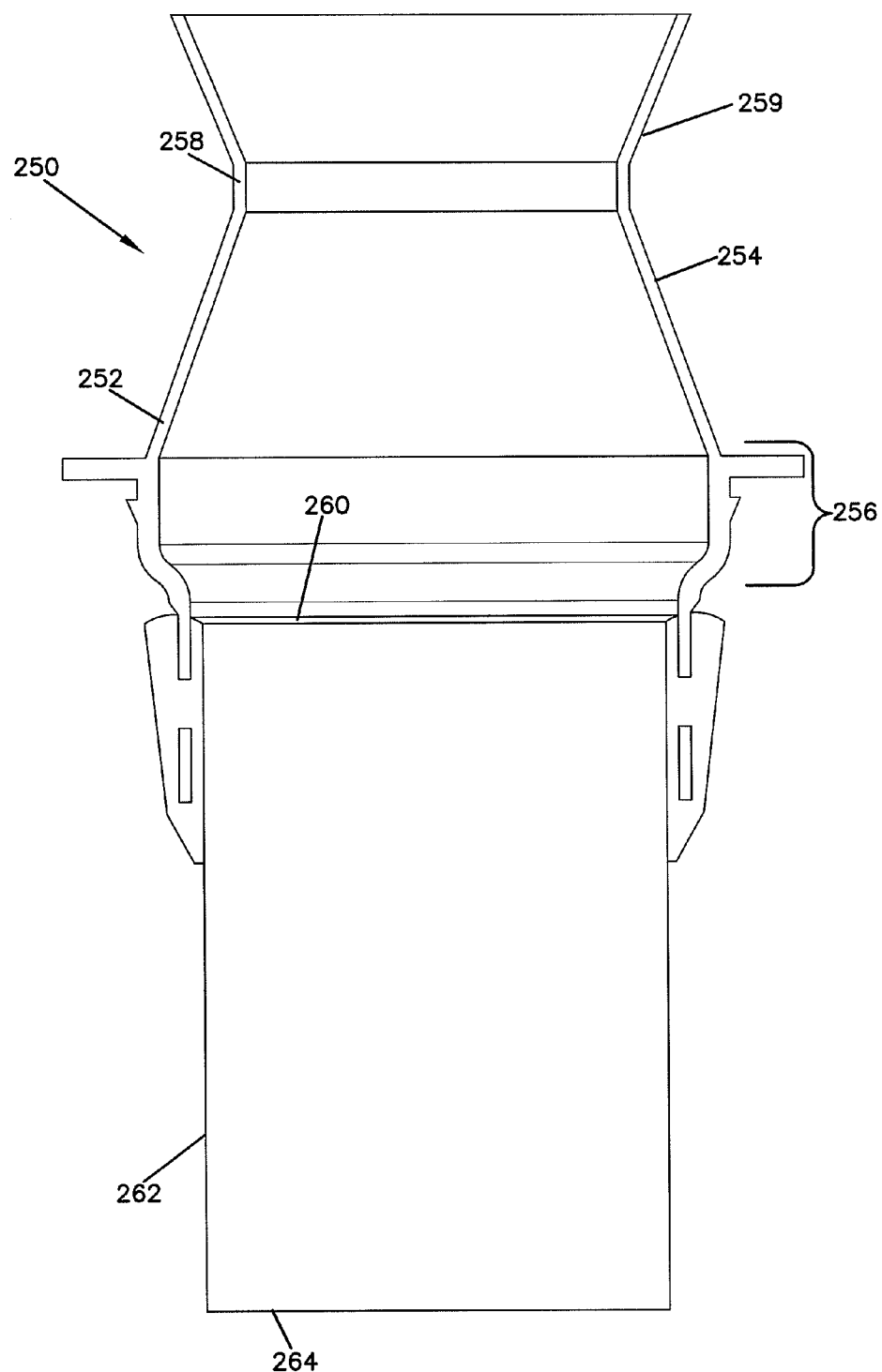
FIG. 16 is a cross-sectional view of the element of FIG. 14, the cross-section being taken along the line 16-16 of FIG. 15.
Figure 17:
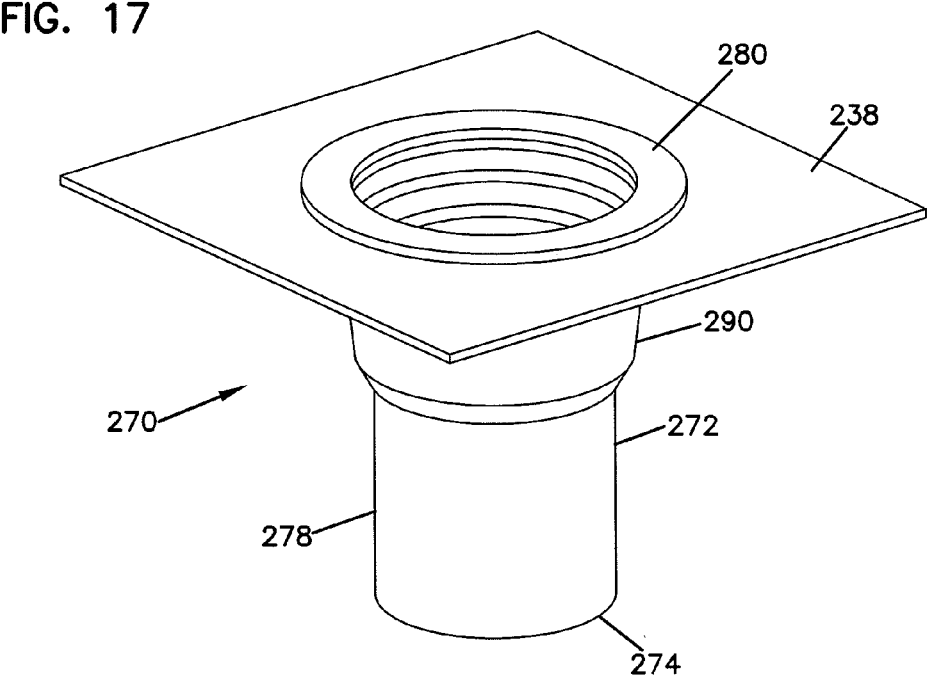
FIG. 17 is a perspective view of another embodiment of a filter element constructed according to principles of this disclosure.
Figure 18:
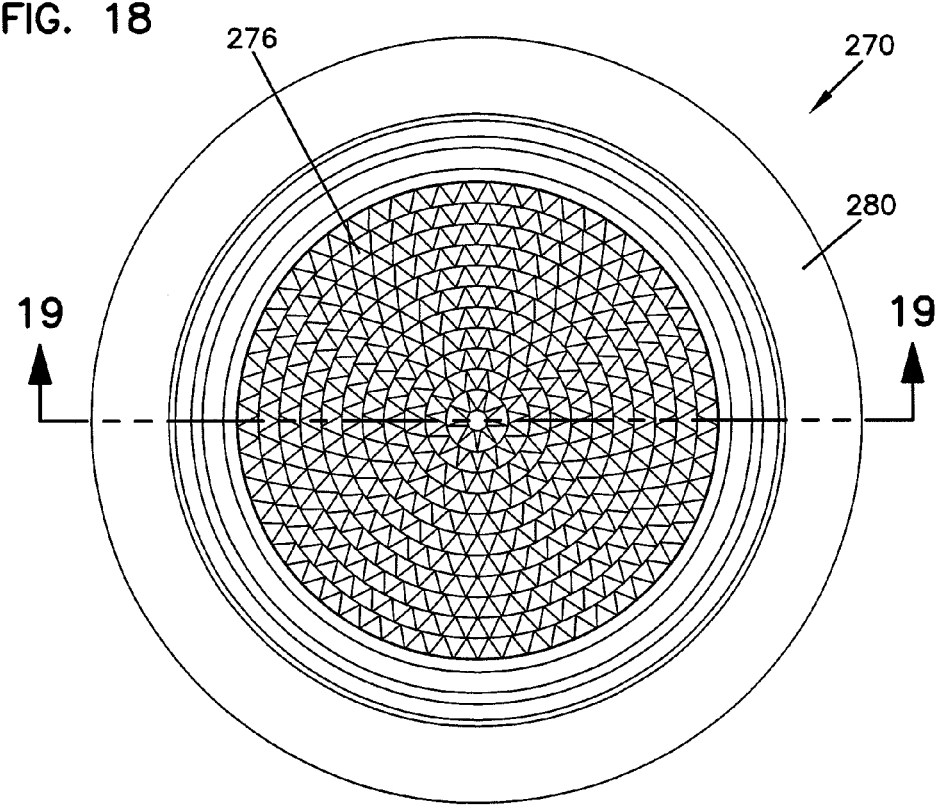
FIG. 18 is a top plan view of the filter element of FIG. 17.

FIGS. 14-16 illustrate a modified filter element 250. The filter element 250 is analogous to the element 200, but the ring 252 includes an air flow tube 254 extending from the tube sheet engaging portion 256 of the ring 252. The air flow tube 254 has a throat 258, which corresponds to a section of reduced cross-section. In preferred embodiments, the air flow tube 254 functions as a venture 259. A venturi is an air flow tube that results in a venturi effect, which is the fluid pressure that results when an incompressible fluid flows through a restricted section of pipe. In the embodiments shown in FIGS. 14-16, the air flow tube 254 is made from the integral piece of material as the remaining portion of the ring 254.

The air flow tube 254 can be utilized to direct jets of compressed air from the clean air side 244 of the tube sheet 238 into the downstream flow face 260 of the media pack 262. The top plan view of FIG. 15 omits showing the full flow face of the fluted media of the flow face 260, for purposes of clarity. The upstream flow face is shown at 264. As such, in operation, air to be filtered flows through the upstream flow face 264 and is filtered by the media pack 262. Filtered air flows from the downstream flow face 260 and into the clean air side 244. Periodically, the element 250 will be cleaned by back flushing the media pack 262 with pulses of compressed air. The venturi 259 helps to improve the flow distribution of the pulse to help better clean the media pack 262. An example of reverse-pulsing a media pack of Z-media is described in U.S. Pat. No. 7,338,544, which patent is incorporated herein by reference.

FIGS. 17-19 and 23-25 illustrate another embodiment of a filter element 270. The element 270 is analogous to the element 200 in that it has a media pack 272, a first flow face 274, a second flow face 276, an outer peripheral surface 278, and a ring 280. The ring 280 includes a ramp 282, a recess 284, an element securing portion 286, and a tube sheet engaging portion 288. A urethane band 290 secures the ring 280 and the media pack 272.

Figure 19:
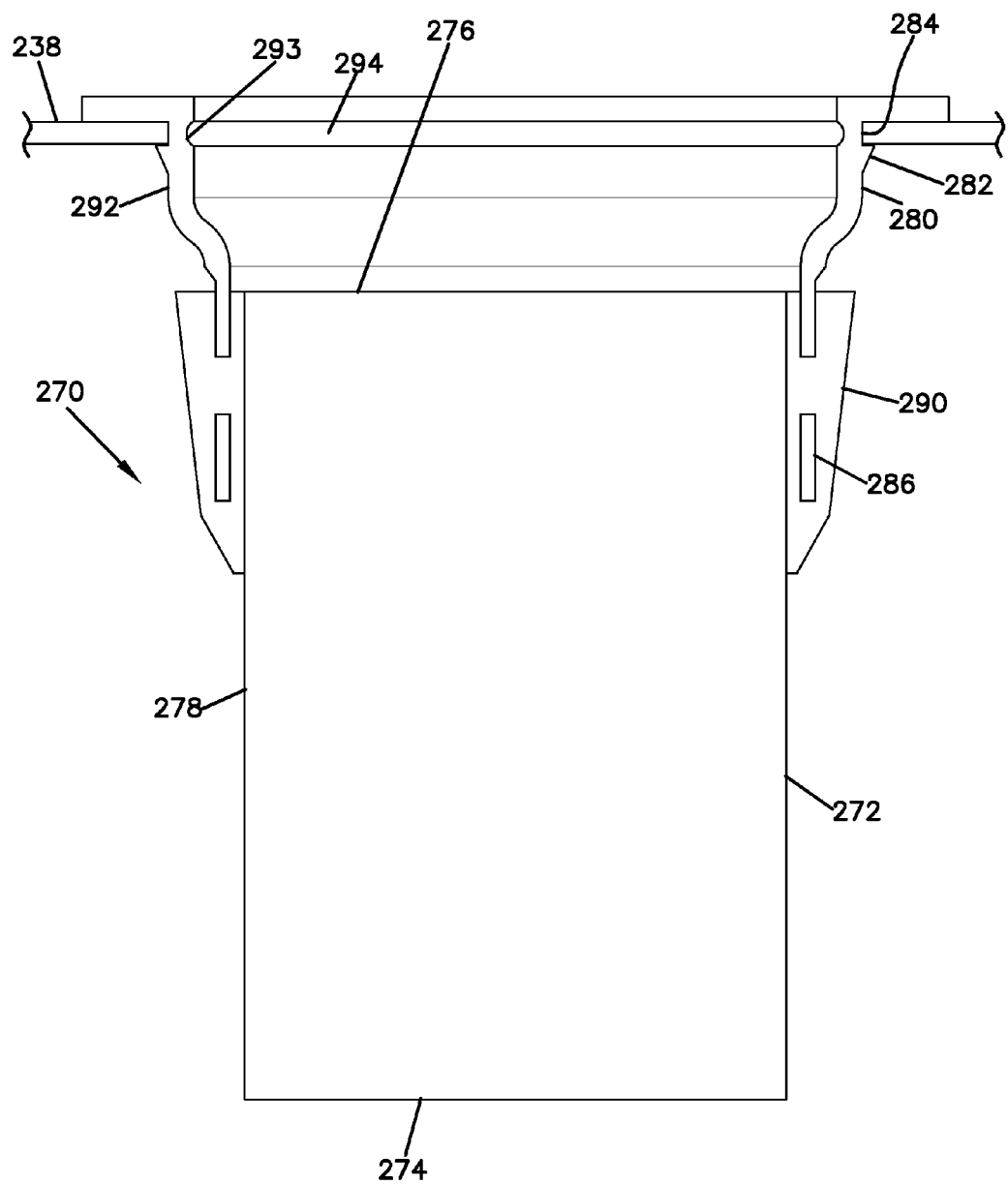
FIG. 19 is a cross-sectional view of the element of FIG. 17, the cross-section being taken along the line 19-19 of FIG. 18.

The ring 280 differs from the ring 210 in that along the wall 292 there is defined a receiver 293 (FIG. 19). In the embodiment shown, the receiver 293 is shown as a receiving groove 294, and it is along the inner radial surface of the wall 292 of the ring 280. In this particular embodiment, the receiving groove 294 is located along the wall 292 directly opposite of the location of the recess 284.

Figure 20:
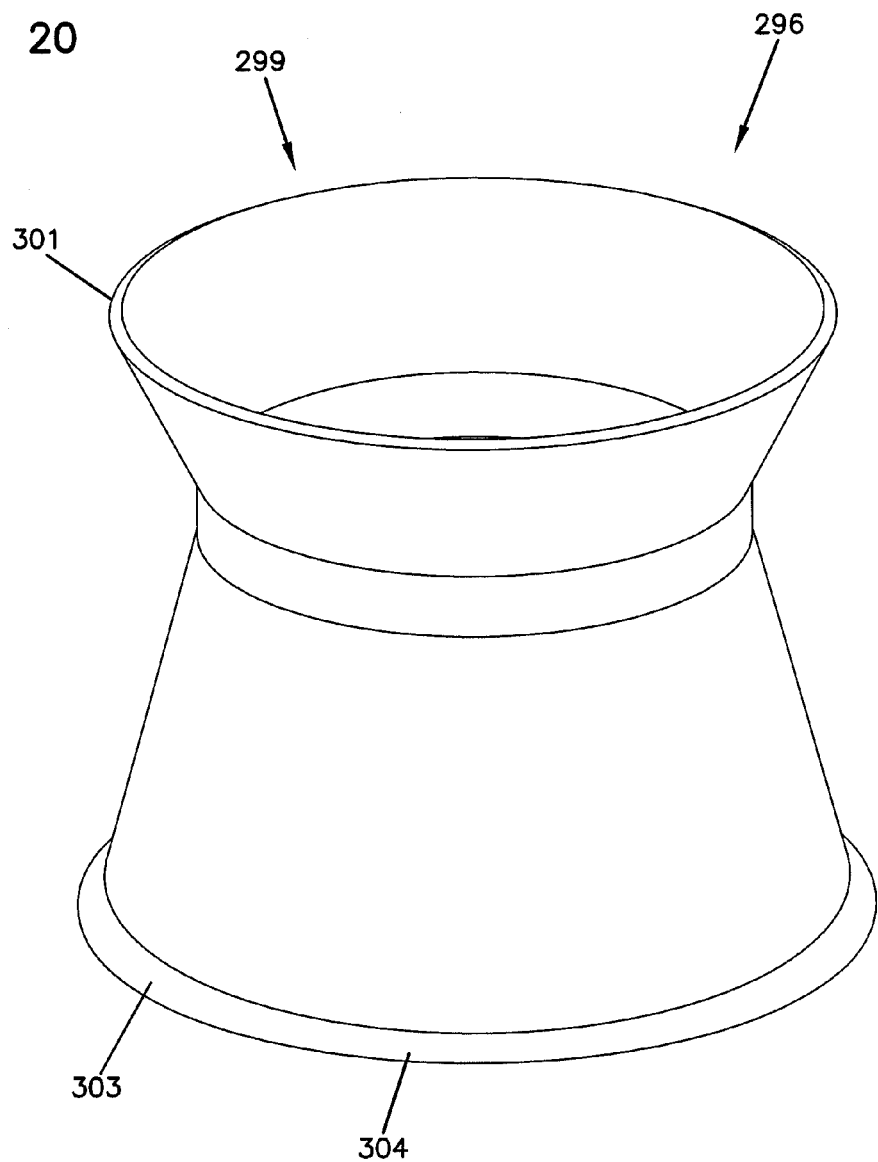
FIG. 20 is a perspective view of an air flow tube used in the arrangement of FIG. 17.
Figure 23:
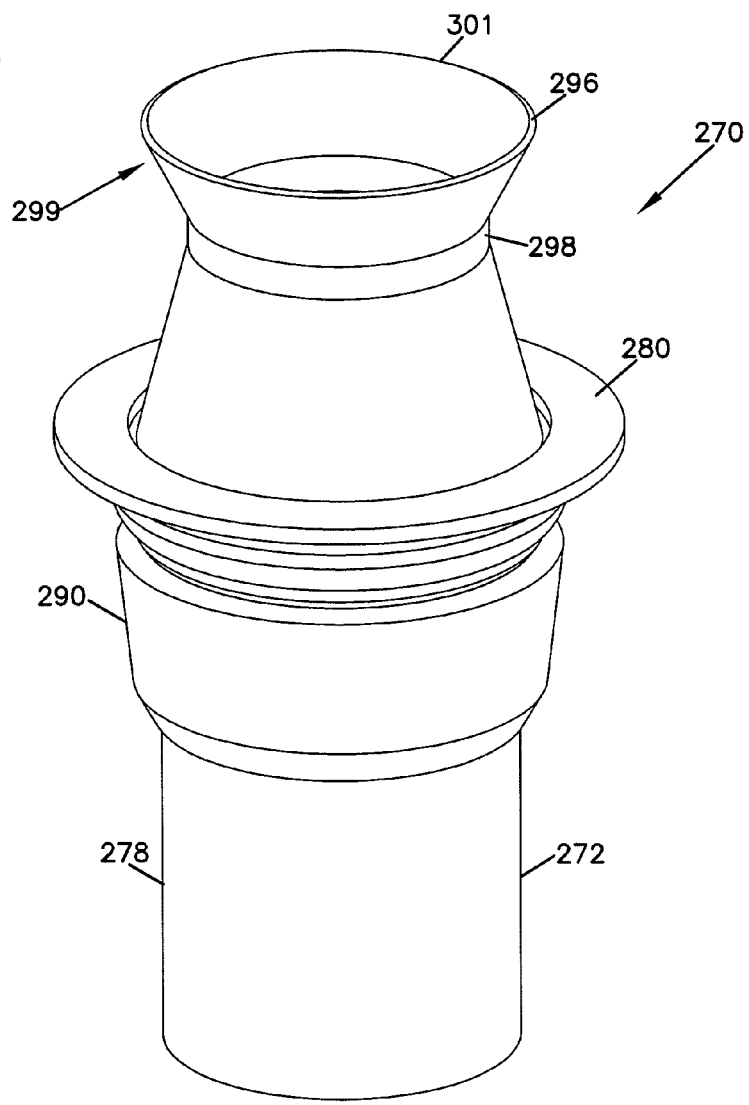
FIG. 23 is a perspective view of another embodiment of a filter element constructed according to principles of this disclosure.
Figure 24:
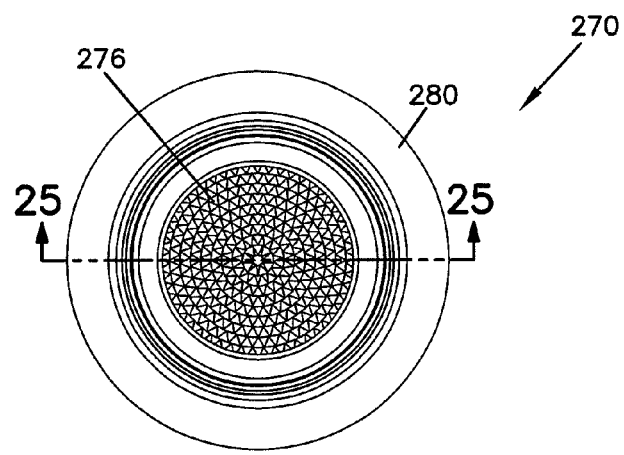
FIG. 24 is a top plan view of the filter element of FIG. 23.
Figure 25:
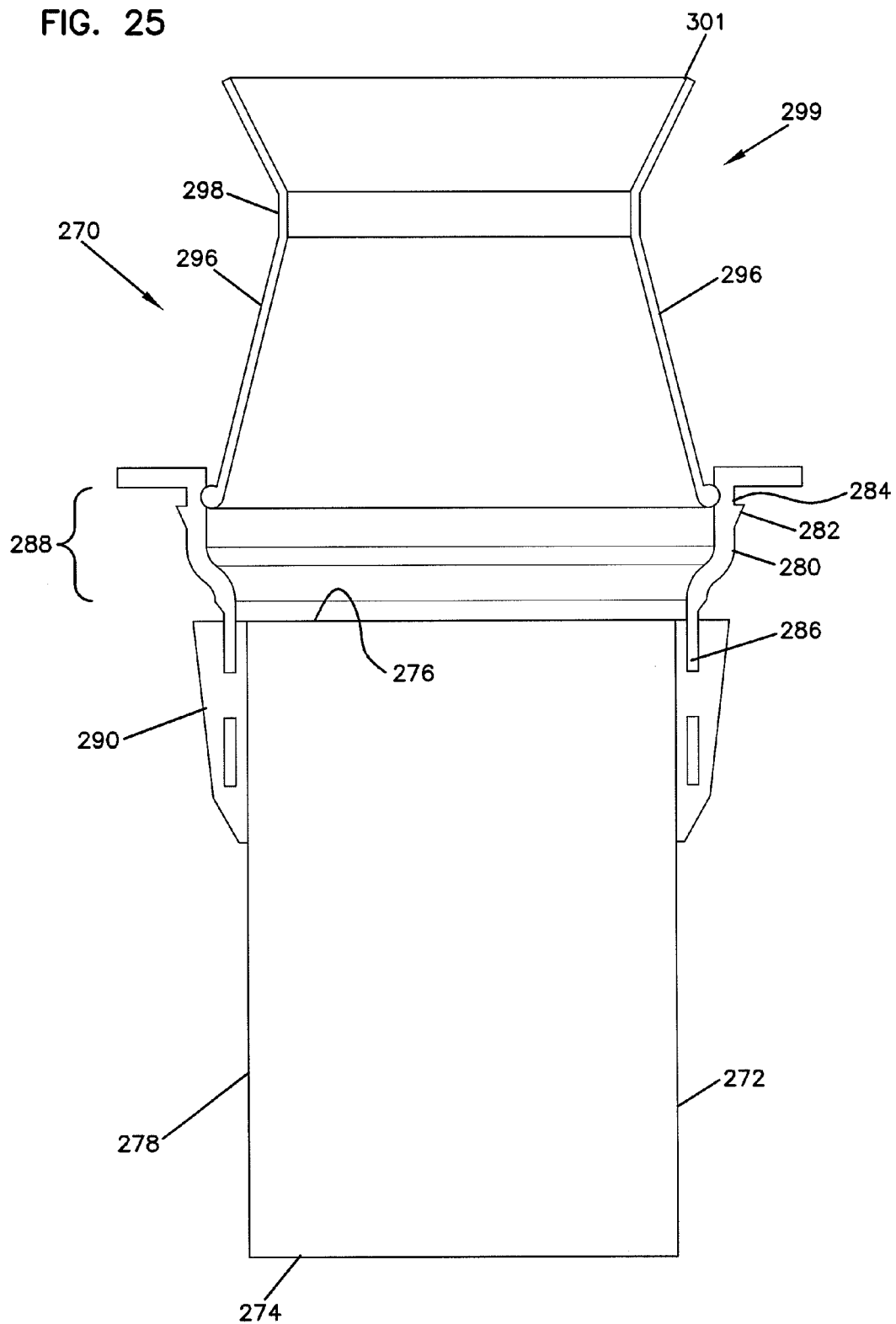
FIG. 25 is a cross-sectional view of the element of FIG. 23, the cross-section being taken along the line 25-25 of FIG. 24.

FIGS. 23-25 illustrate one purpose for the receiver 293. The receiver 293 can be used to receive and hold a snap-in air flow tube 296. The air flow tube 296 is illustrated in FIGS. 20-22. The air flow tube has a section of reduced cross suction at a throat 298. Preferably, the air flow tube 296 is constructed as a venturi 299.

In FIGS. 20-22, the venturi 299 can be seen as having a free end 301 and an element engaging 303. The element engaging end 303 includes a projection 304 bulging radially outwardly. In preferred embodiments, the projection 304 is sized to fit in and be received by the receiving groove 294 (FIG. 25). As such, the element 270 can be easily converted to or from an element selectively having a venturi 299 by mechanically snapping the venturi 299 onto the ring 280 or by snapping the venturi 299 out of the ring 280.

Figure 26:
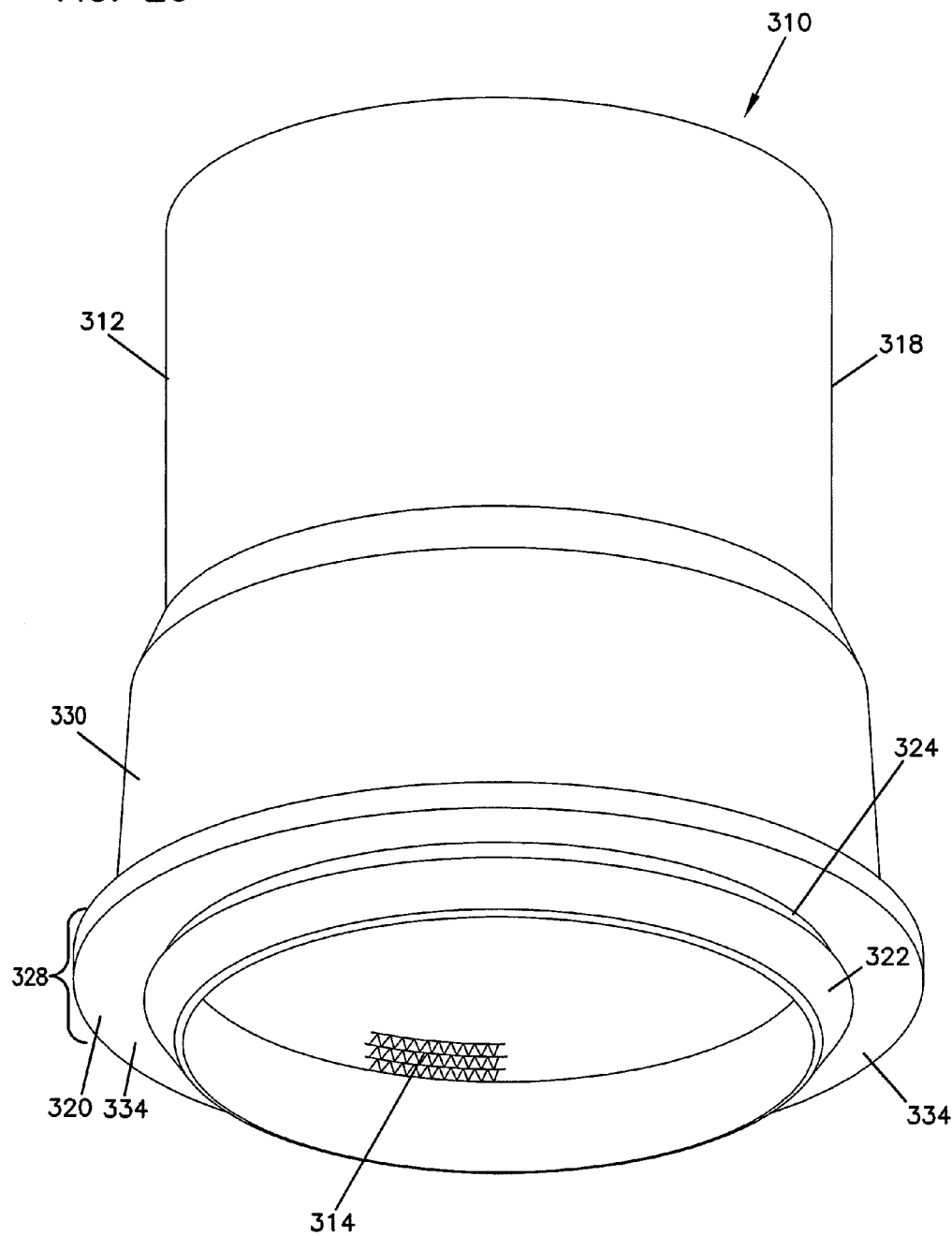
FIG. 26 is a perspective view of another embodiment of a filter element constructed according to principles of this disclosure.
Figure 27:
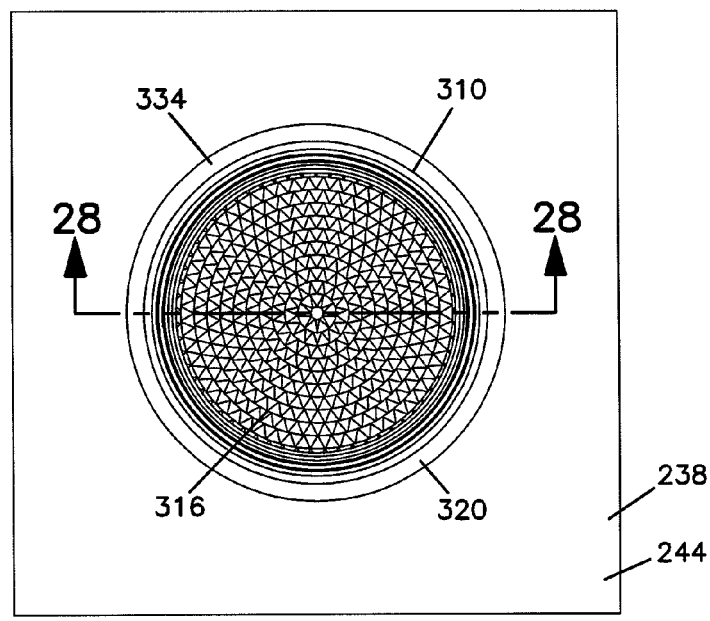
FIG. 27 is a top plan view of the filter element of FIG. 26.
Figure 28:
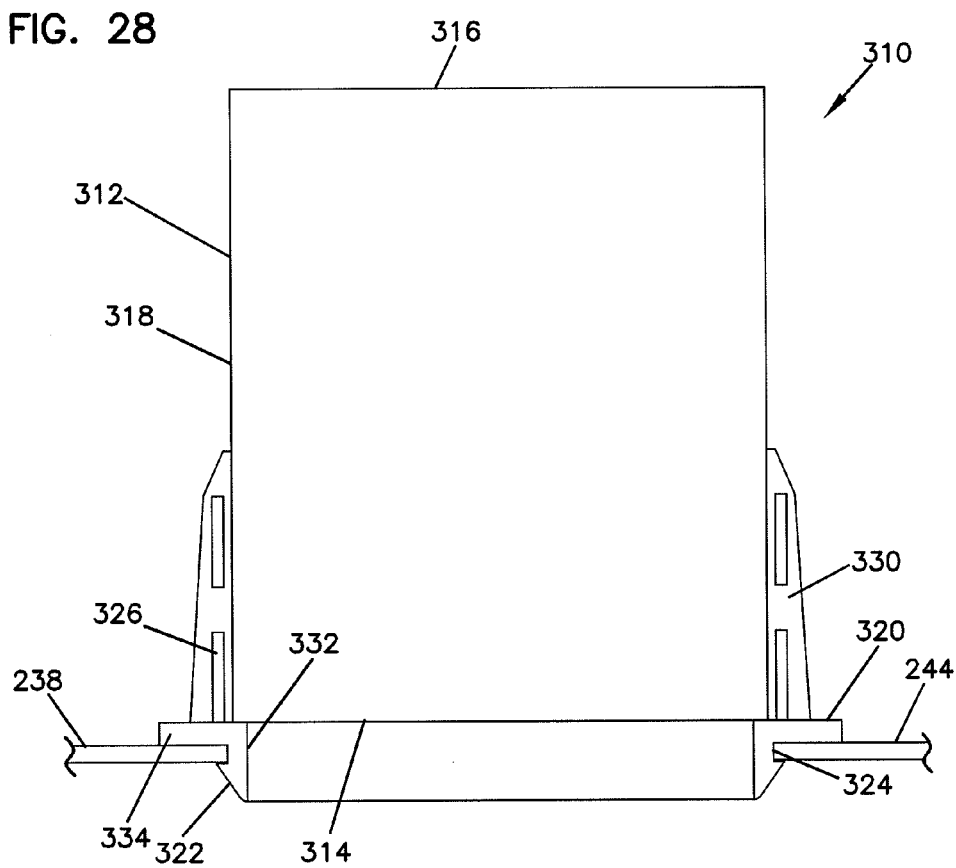
FIG. 28 is a cross-sectional view of the element of FIG. 26, the cross-section being taken along the line 28-28 of FIG. 27.

FIGS. 26-28 illustrate another embodiment of a filter element 310. The element 310 has features analogous to the above-described filter elements 200, 250 and 270. The element 310 includes media pack 312, first flow face 314, second flow face 316, outer peripheral surface 318, ring 320, ramp 322, recess 324, element securing portion 326, tube sheet engaging portion 328, and urethane band 330.

As with the preceding embodiments, the ring 320 includes a wall 332. In this embodiment, however, the wall 332 defines an inner dimension that is less than an outside dimension of the media pack 312 and that is less than an inside dimension of the element securing portion 326. This can be seen by reviewing FIG. 28. When the media pack 312 is circular, the ring 320 is circular, and the inner dimension 332 corresponds to a diameter.

Still in reference to FIGS. 26-28, the ring 320 further includes a flange 334. The flange 334 is perpendicular to the element securing portion 326 of the ring 320. The recess 324 is located between the ramp 322 and the flange 334. The flange 334 is between the element securing portion 326 and the recess 324.

In the embodiment of FIGS. 26-28, the element 310 is installed to engage the tube sheet 238 in a different manner from the preceding elements 200, 250, 270. In this embodiment, the media pack 312 is not passed through the aperture of the tube sheet 238. Rather, the ramp 322 is pressed against the tube sheet 238 and deflects radially inwardly until it snaps over the rim of the tube sheet 238. The tube sheet 238 is then received by the recess 324 such that the tube sheet 238 is trapped between the ramp 322 and the flange 334 creating a seal. Typically, this installation can be done from the clean side 244 of the tube sheet 238, such that the media pack 312 is located only within the clean air side 244 of the tube sheet 238.

Figure 29:
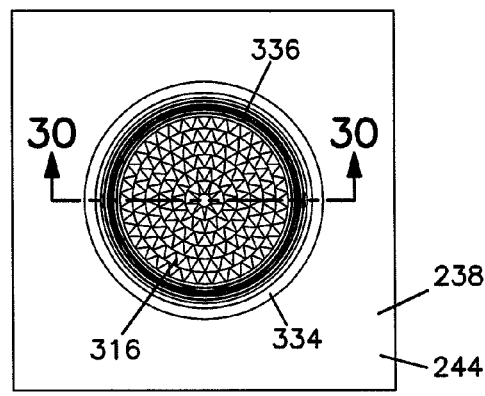
FIG. 29 is a top plan view of a modified version of the element of FIG. 26.
Figure 30:
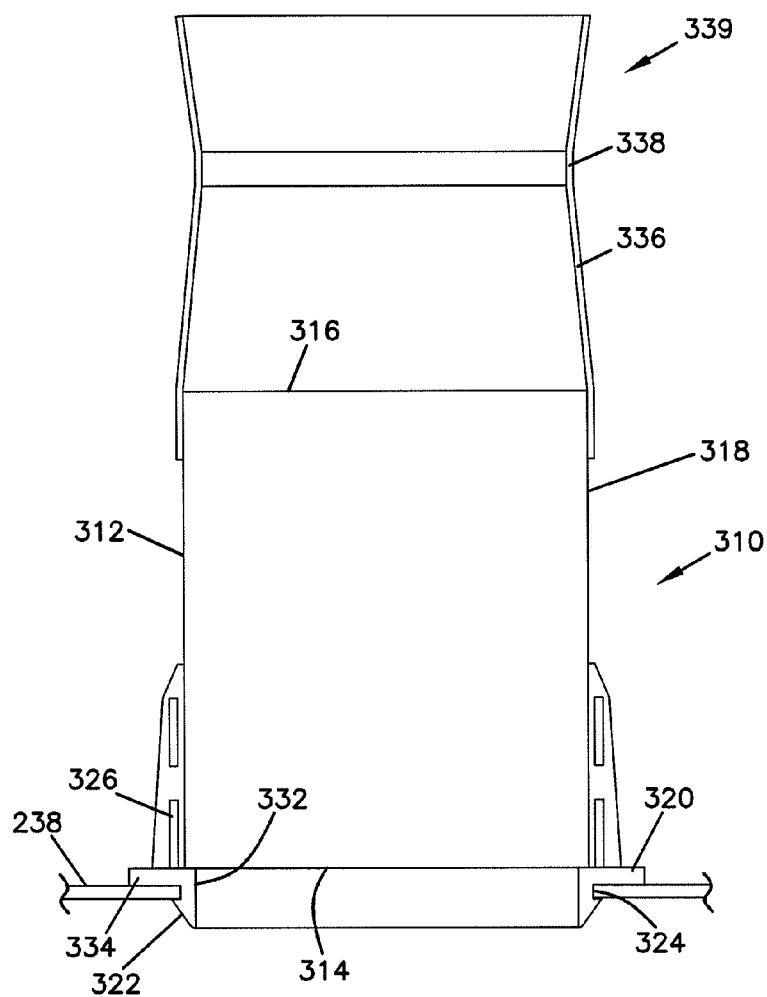
FIG. 30 is a cross-sectional view of the element of FIG. 26 and modified to have an air flow tube, the cross-section being taken along the line 30-30 of FIG. 29.
Figure 31:
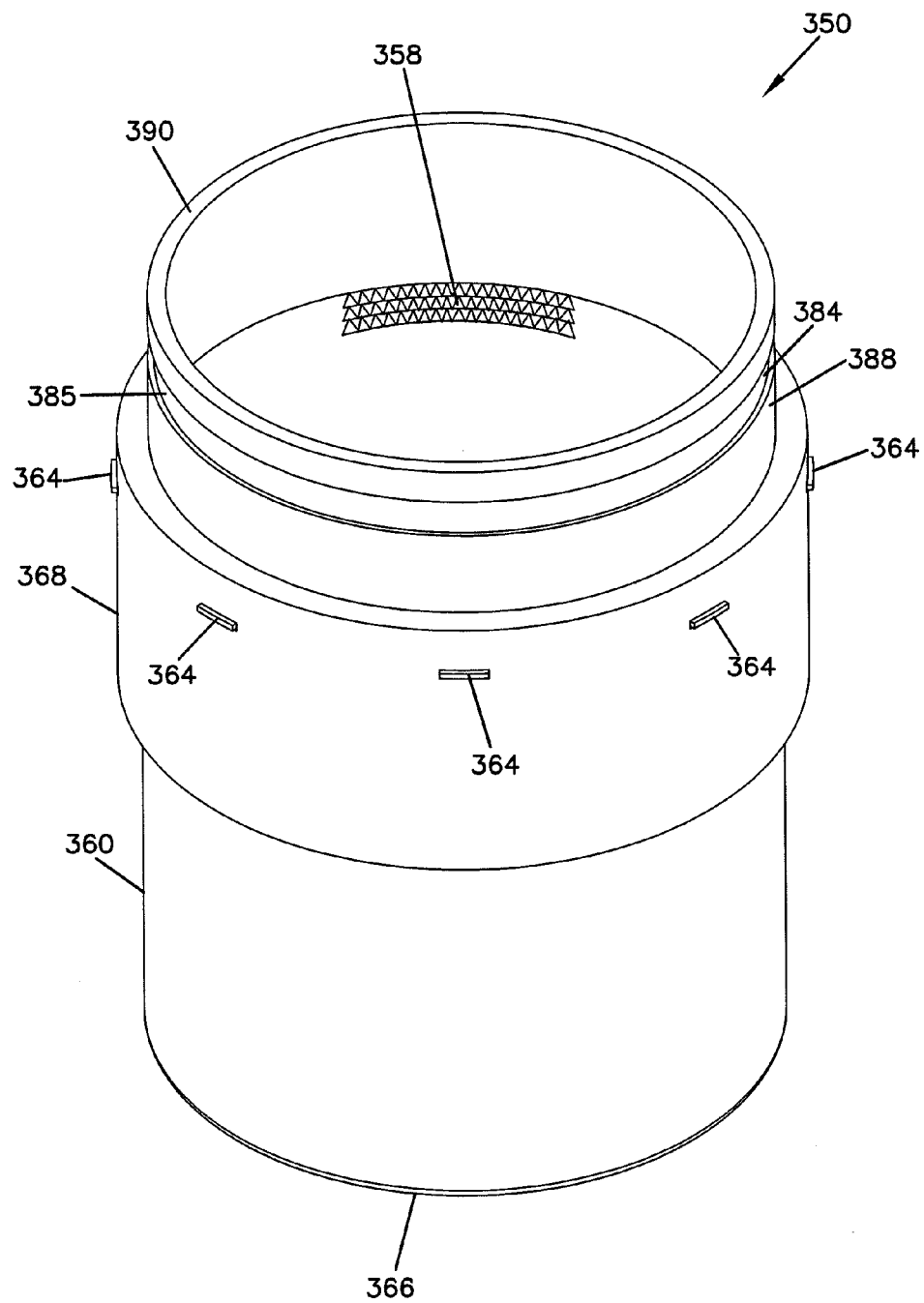
FIG. 31 is a perspective view of another embodiment of a filter element constructed in accordance with principles of this disclosure.

FIGS. 29 and 30 show the element 310 modified to have an air flow tube 336 with a section of reduced cross-section at throat 338. Preferably, the air flow tube 336 forms a venturi 339.

In the embodiment of FIG. 30, the air flow tube 336 is extending from the media pack 312 at an opposite end of where the ring 320 is secured to the media pack 312. In the previous embodiments, the air flow tube 326 was secured to or integral with the ring. This embodiment, however, has the air flow tube 326 secured to the media pack 312 around the outer peripheral surface 318 and adjacent to the second flow face 316.

Figure 34:
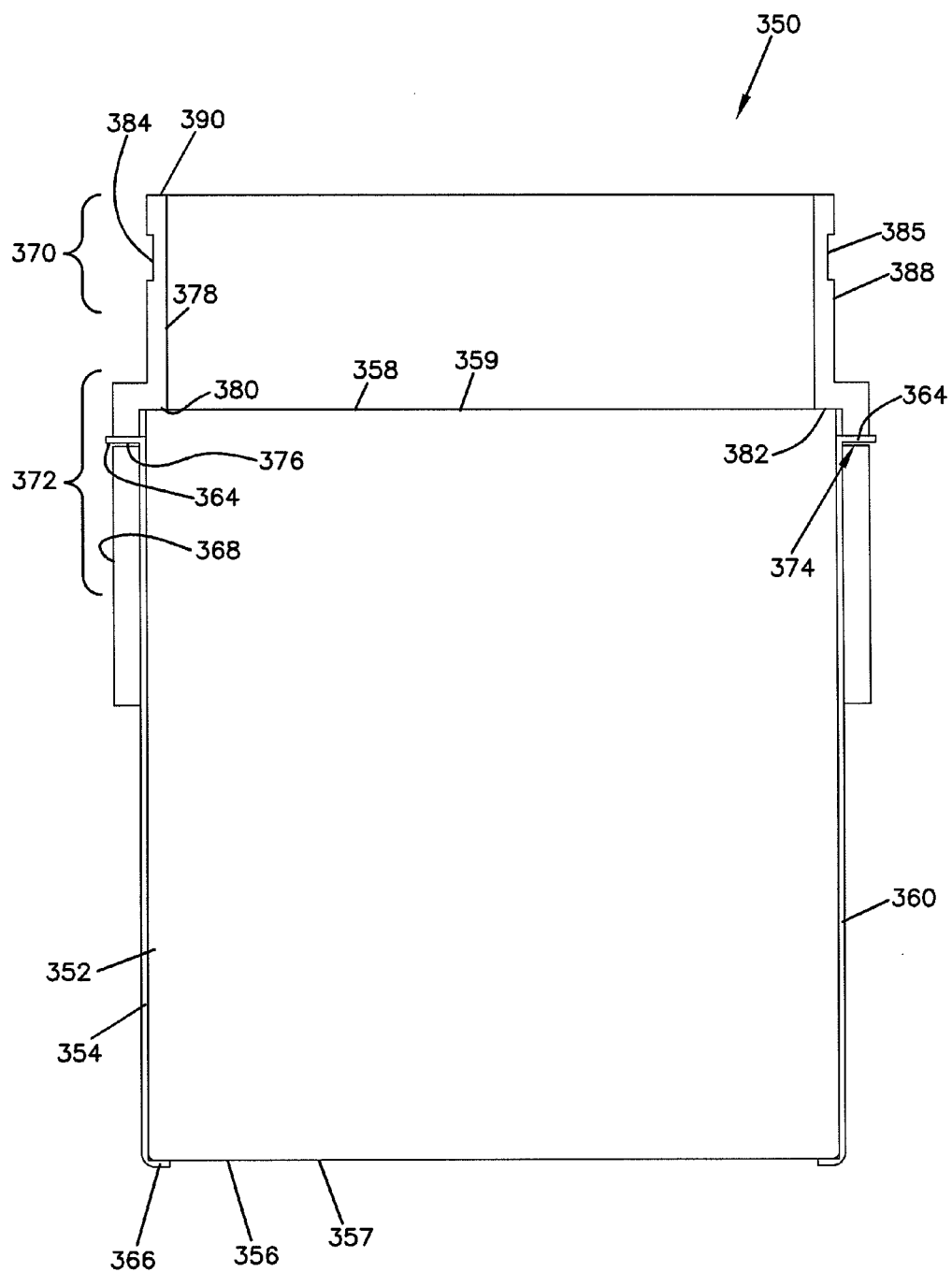
FIG. 34 is a cross-sectional view of the element of FIG. 31, the cross-section being taken along the line 34-34 of FIG. 32.

Another embodiment of a filter element is illustrated in FIGS. 31-34A at 350. The filter element 350 includes a media pack 352 (FIG. 34) as characterized above. The media pack 352 defines an outer peripheral surface 354 (FIG. 34). Media pack 352 also defines a first flow face 356 at a first end 357 and an opposite second flow face 358 at a second end 359.

Figure 34A:
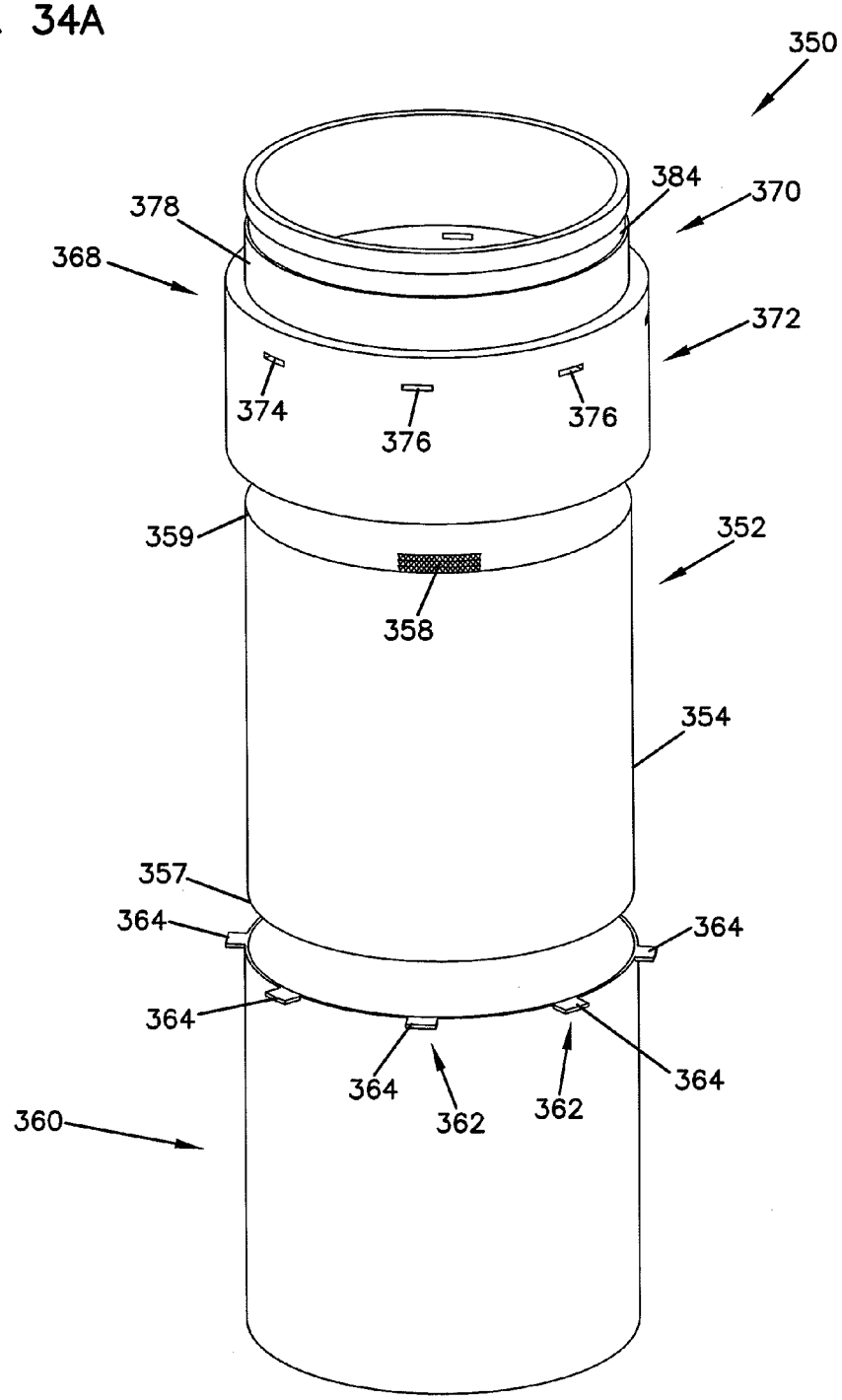
FIG. 34A is an exploded perspective view of the filter element of FIGS. 31-34.
Figure 35:
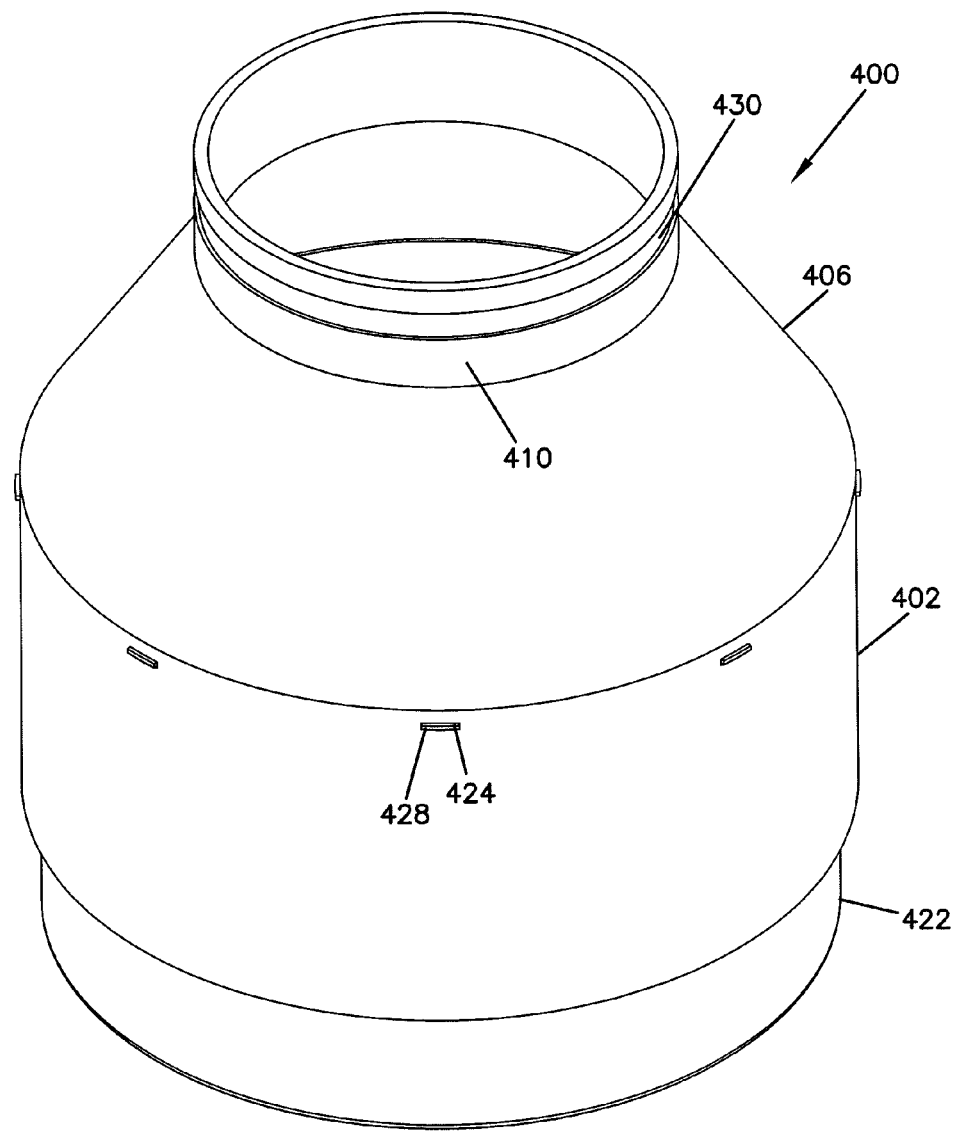
FIG. 35 is a perspective view of another embodiment of a filter element constructed in accordance with principles of this disclosure.

In this embodiment, the filter element 350 further includes a shell 360. The shell 360, in the embodiment shown, is against and surrounding the outer peripheral surface 354 of the media pack 352. In preferred embodiments, the shell 360 is made from a rigid, impermeable material, such as a hard plastic. An exploded, perspective view of the filter element 350 is depicted in FIG. 34A.

In preferred embodiments, the shell 360 defines an end flange arrangement 362. In the embodiment shown, the end flange arrangement 362 includes a plurality of tabs 364 that extend radially from the shell 360 and from the outer peripheral surface 354.

In the particular embodiment shown, the shell 360 further includes an end rim 366. The end rim 366 is located at an end of the shell 360 opposite of the tabs 364. The rim 366 engages against and helps to hold the media pack 352 by engaging the first flow face 356.

The filter element 350 further includes a ring 368 secured to the shell 360. The ring 368 has a tube sheet engaging portion 370 and a element securing portion 372. The element securing portion 372 is secured to the shell 360. In the embodiment shown, the element securing portion 372 of the shell 360 defines a recess arrangement 374 to receive the tabs 364 of the end flange arrangement 362. As can be seen in FIG. 34, the recess arrangement 374 is shown in this embodiment as open through slots 376. The tabs 364 extend through the slots 376 to lock the ring 368 to the shell 360, which is secured to the media pack 352.

In this embodiment, the tube sheet engaging portion 370 includes a wall 378 that is generally parallel to a central longitudinal axis extending through the media pack 352. The wall 378 has an inner dimension that is less than an outer dimension of the media pack 352.

The ring 368 defines a step 380 (FIG. 34) that extends radially inwardly. As such, the ring 368 has an element engaging portion 382 (FIG. 34) that is against the second flow face 358. As can be seen in FIG. 34, the media pack 352 is held by and trapped between the rim 366 of the shell 360 and the element engaging portion 382 of the ring 368.

The tube sheet engaging portion 370 defines a band-receiving recess 384. In the embodiment shown, the band-receiving recess 384 is depicted as a groove 385 in the outer radial surface of the tube sheet engaging portion 370.

In the embodiment shown, the tube sheet engaging portion 370 includes a neck 388 which defines the band-receiving recess 384. The neck 388 has a first inner dimension less than an inner dimension of the element securing portion 372. In the embodiment shown, the neck 388 has a free end 390 spaced at least 50 percent of an overall length of a media pack 352 from a closest flow face (in the embodiment shown, the second flow face 358) of the media pack 352.

In operation, the element 350 can be secured to circular axially extending collars of a tube sheet. A band clamp can then engage the band-receiving recess 384 to tighten the ring 368 onto the collar of the tube sheet.

FIGS. 35-39 depict an alternate embodiment of the filter element 350. In this embodiment, the element 400 includes a ring 402 with a tube sheet engaging portion 404 that has a sloped wall 406 extending between the element securing portion 408 and the neck 410. In this embodiment, the sloped wall 406 has a length that is greater than the length of the neck 410. In this manner, the ring 402 can function as an air flow tube 412 with a throat 414.

The element 400 includes features analogous to the element 350 in that it includes a media pack 416, first flow face 418, second flow face 420, shell 422, tabs 424, rim 426, and slots 428. The tube sheet engaging portion 404 includes a band-receiving recess 430 for receiving a band clamp 431 (FIG. 38A) to releasably secure the element to a collar 433 on the tube sheet 401.

Figure 38A:
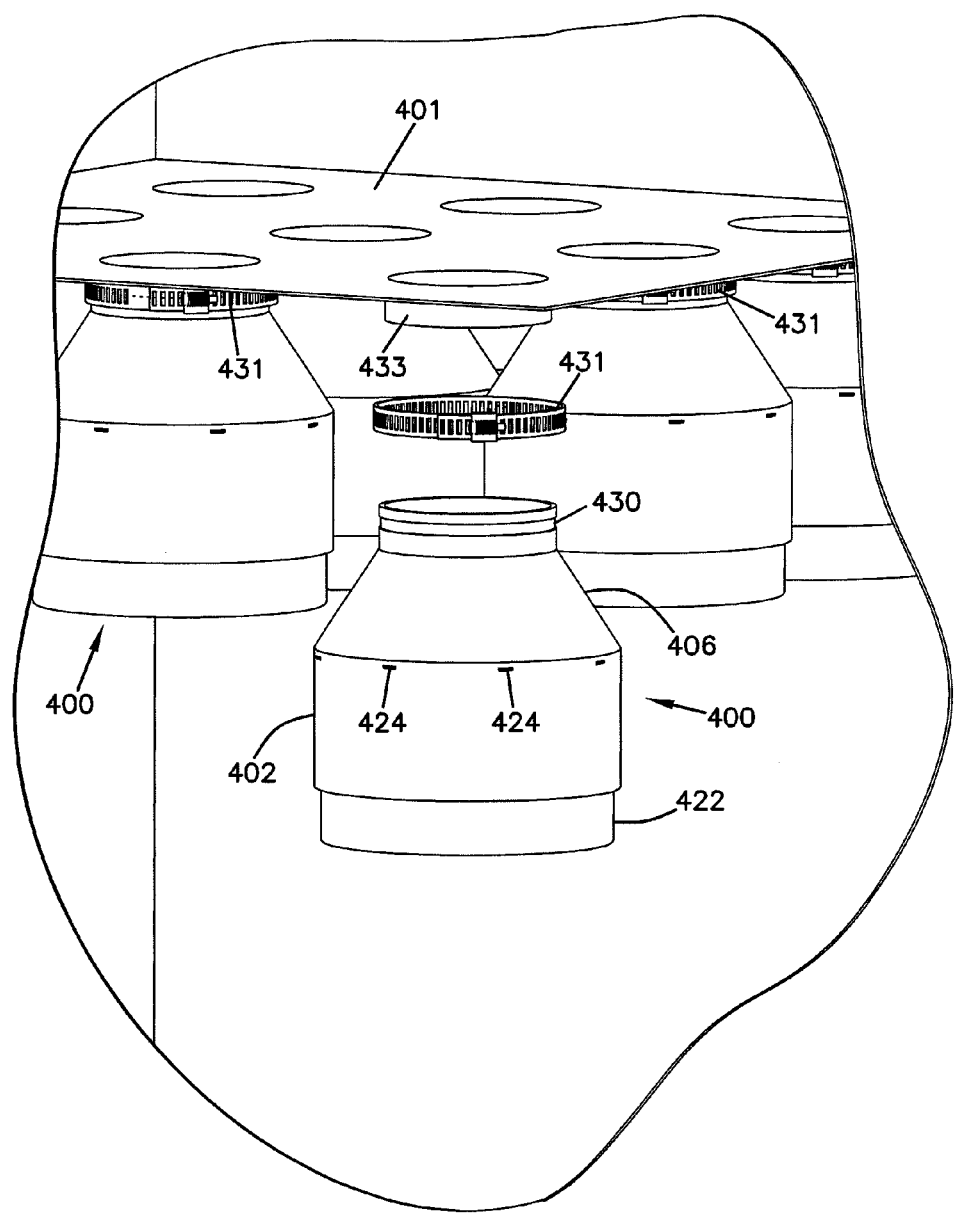
FIG. 38A is a first perspective view of the filter element of FIGS. 35-38 installed and being installed in a dust collector.
Figure 39:
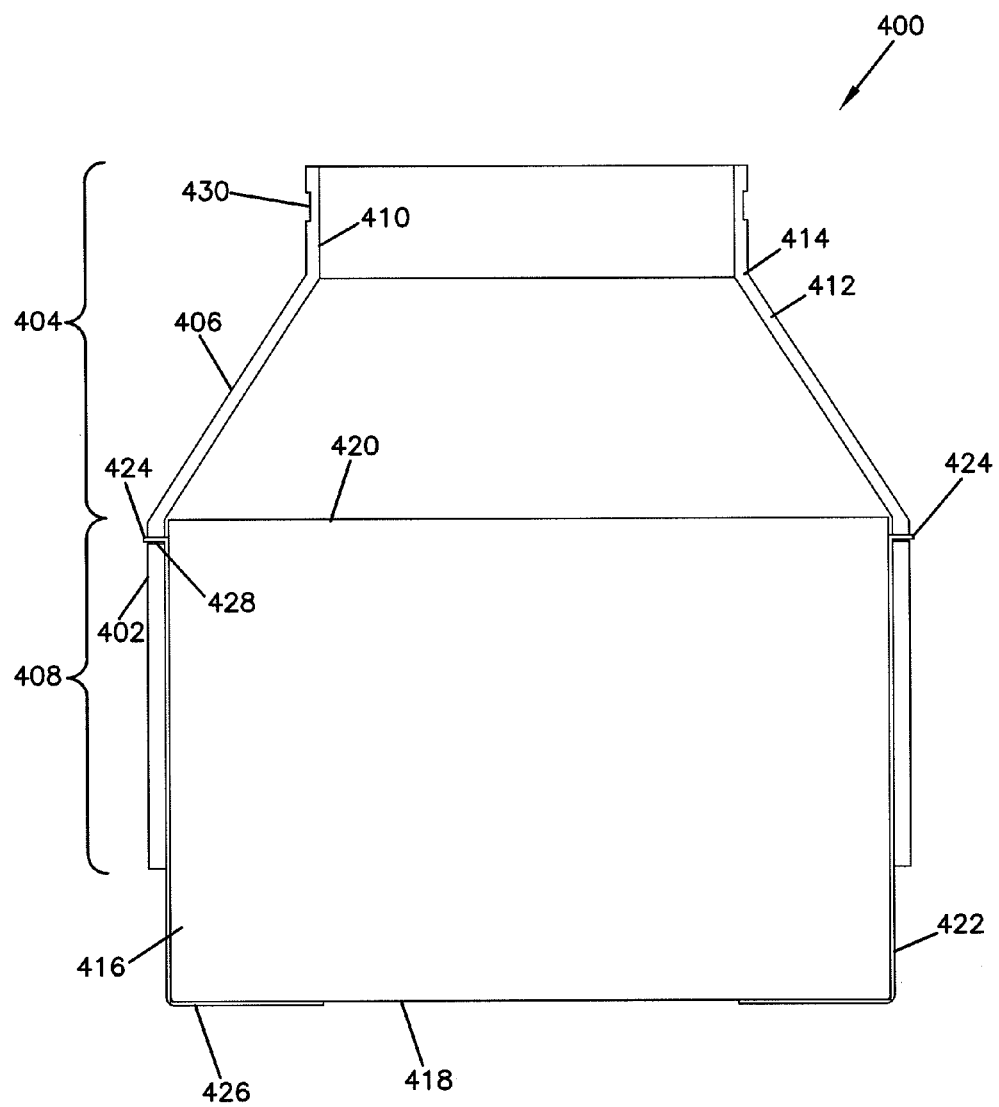
FIG. 39 is a cross-sectional view of the element of FIG. 35, the cross-section being taken along the line 39-39 of FIG. 36.
Figure 40:
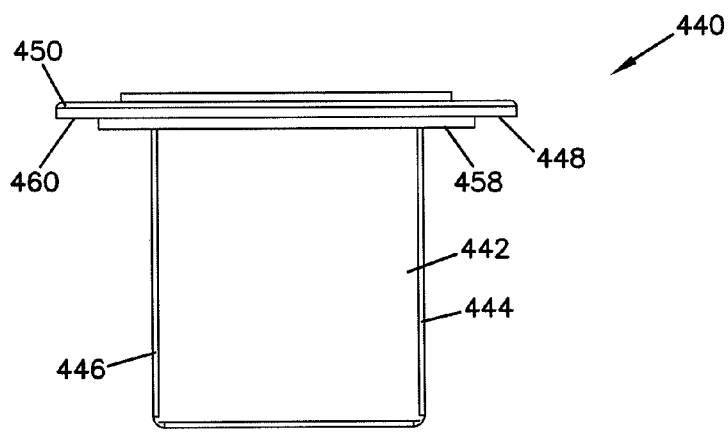
FIG. 40 is a front elevational view of another embodiment of a filter element, constructed according to principles of this disclosure.
Figure 41:
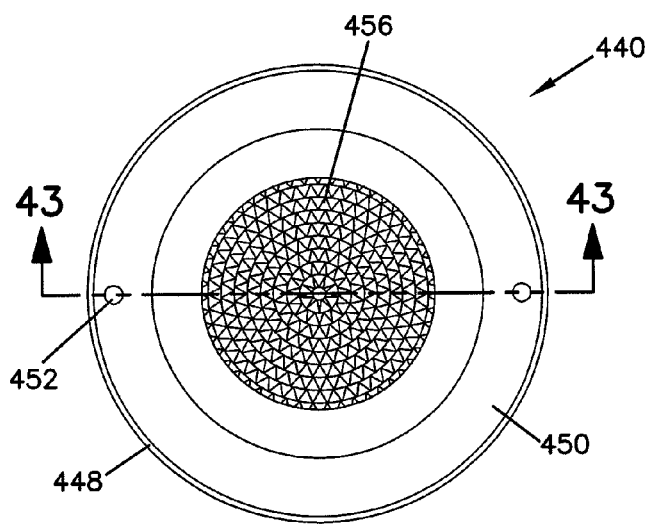
FIG. 41 is a top plan view of the filter element of FIG. 40.
Figure 42:
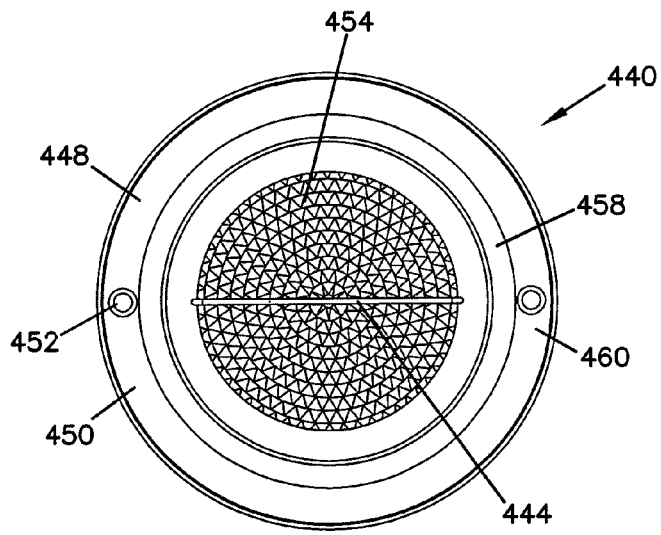
FIG. 42 is a bottom plan view of the filter element of FIG. 40.
Figure 43:
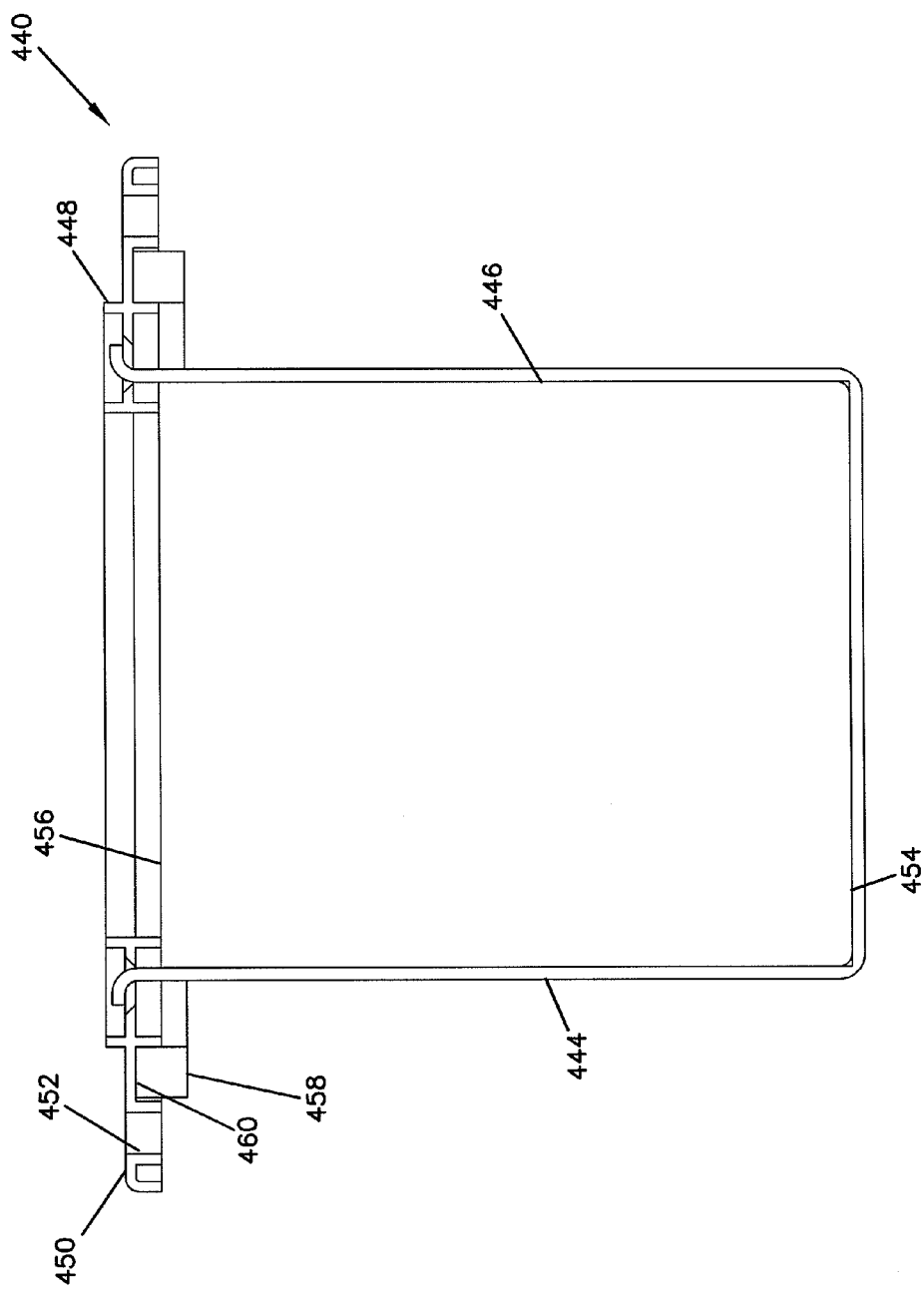
FIG. 43 is cross-sectional view of the filter element of FIG. 40, the cross-section being taken along the line 43-43 of FIG. 41.
Figure 44:
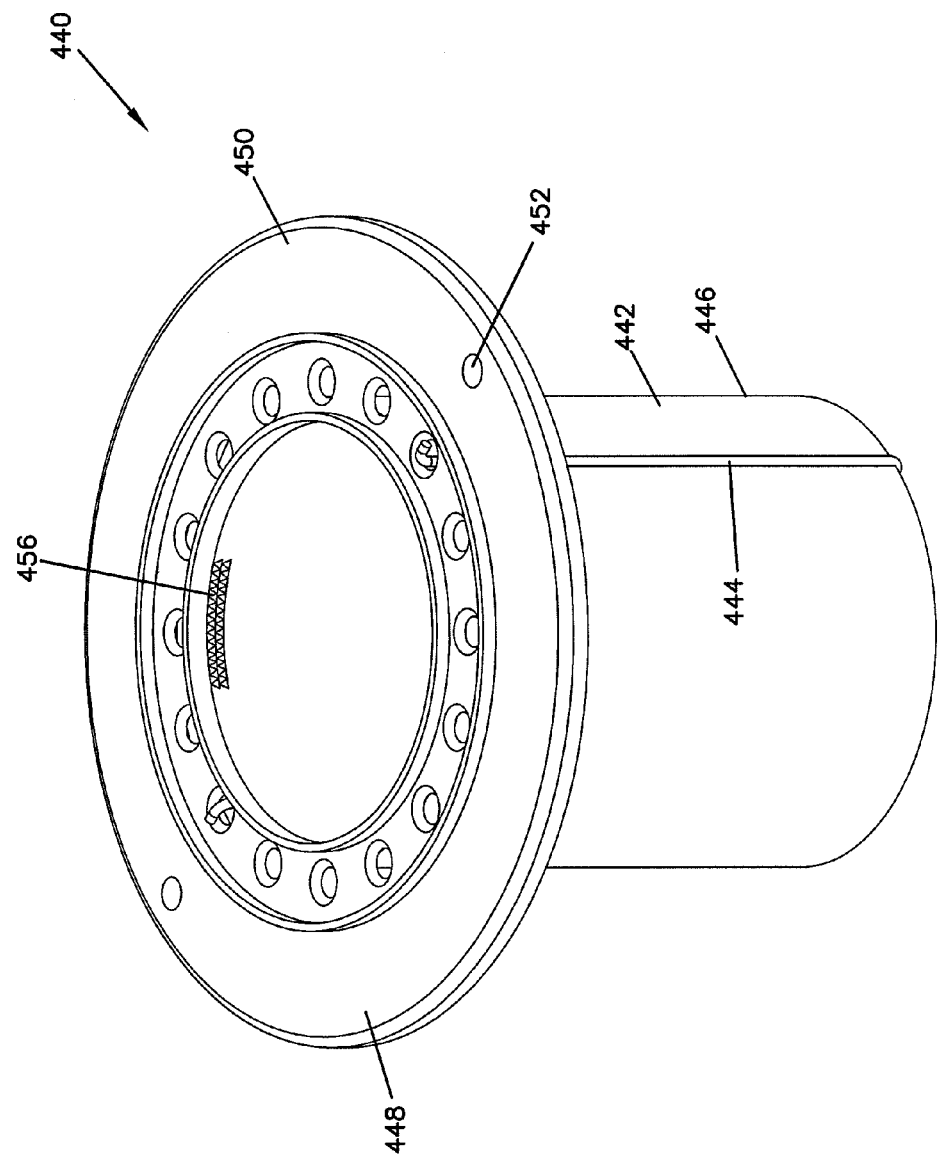
FIG. 44 is a top perspective view another embodiment of a filter element constructed according to principles of this disclosure.
Figure 45:
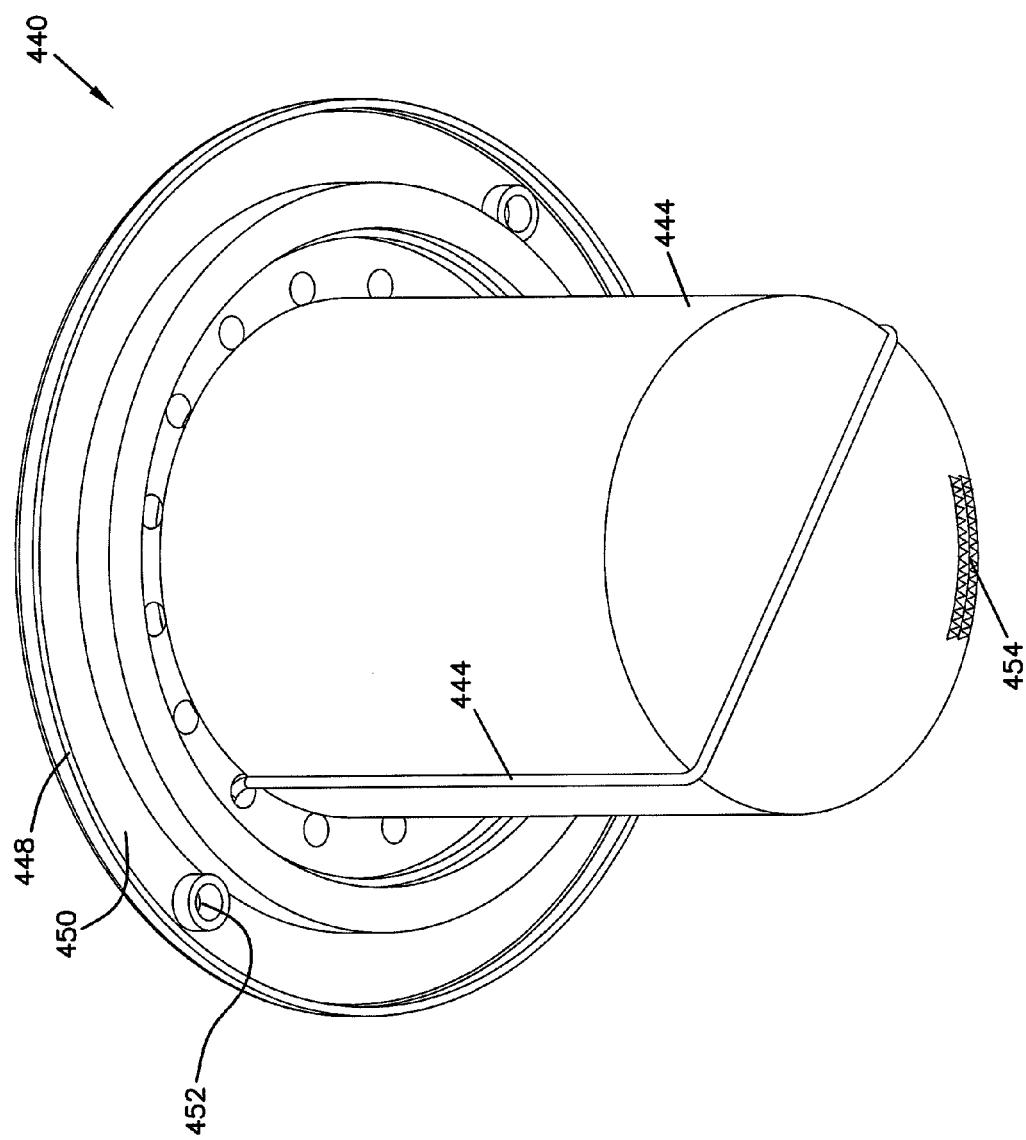
FIG. 45 is a bottom perspective view of the filter element of FIG. 44.

The element 400 secures to a tube sheet 401 in the same manner that the element 350 does. That is, band clamp 431 is usable to secure the element 400 to the collar 433, as shown in FIG. 38A.

Another embodiment of a filter element is illustrated in FIGS. 40-45 at 440. In this embodiment, the filter element 440 includes a media pack 442 analogous to the media packs discussed above. The filter element 440 further includes a retention frame 444 holding the media pack 442 along the outer peripheral surface 446 of the media pack 442. The filter element 440 further includes a ring 448 secured to the media pack 442 and to the retention frame 444.

In the embodiment shown, the ring 448 has a radial flange 450 that extends radially from the media pack 442. The radial flange 450 includes a bolt-receiving aperture arrangement 452 extending axially therethrough.

In the embodiment shown, the ring 448 is mounted immediately adjacent to one of the flow faces of the media pack 442. As with the previous embodiments, the media pack 442 includes a first flow face 454 and a second flow face 456. The embodiment shown has the ring 448 mounted immediately adjacent to the second flow face 456.

The retention frame 444, in the embodiment shown, extends from the ring 448 and runs along the outer peripheral surface 446 and across the first flow face 454. The frame 444 helps to retain the media pack 442 in place.

In the embodiment shown, the filter element 440 further includes a gasket member 458 to provide a seal against a tube sheet. In the embodiment shown, the gasket member 458 is secured to the radial flange 450 on an axial side 460 of the flange 450 directed toward the media pack 442. In use, the sheet will have holes for receiving bolts, and the bolts will pass through the bolt-receiving aperture arrangement 452 to secure the filter element 440 against the tube sheet, with the gasket 458 being compressed to form a seal therebetween.

In preferred arrangements, the ring 448 is secured to the media pack 442 and the retention frame 444 with urethane. That is, gasket member 458 can be molded and the ring 448 can be secured directly to the media pack 442 and the frame 444 by pouring urethane during the molding process in a mold. When the urethane cures, the ring 448 will be directly molded and secured to the media pack 442, as well as the frame 444 directly secured and locked in by way of urethane to the ring 448 and to the media pack 442.

Figure 46:
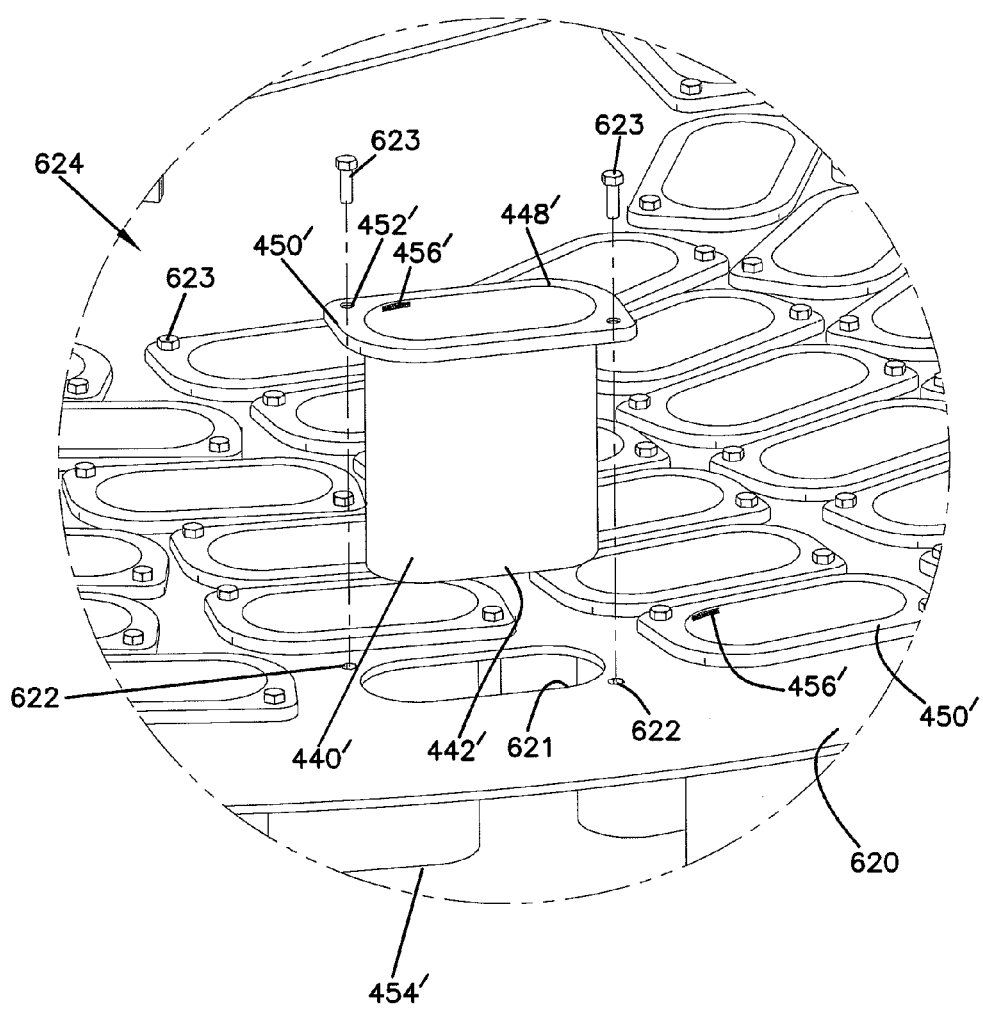
FIG. 46 is a perspective view of an alternate embodiment of the filter element of FIGS. 40-45 installed and being installed in a dust collector housing.
Figure 46A:
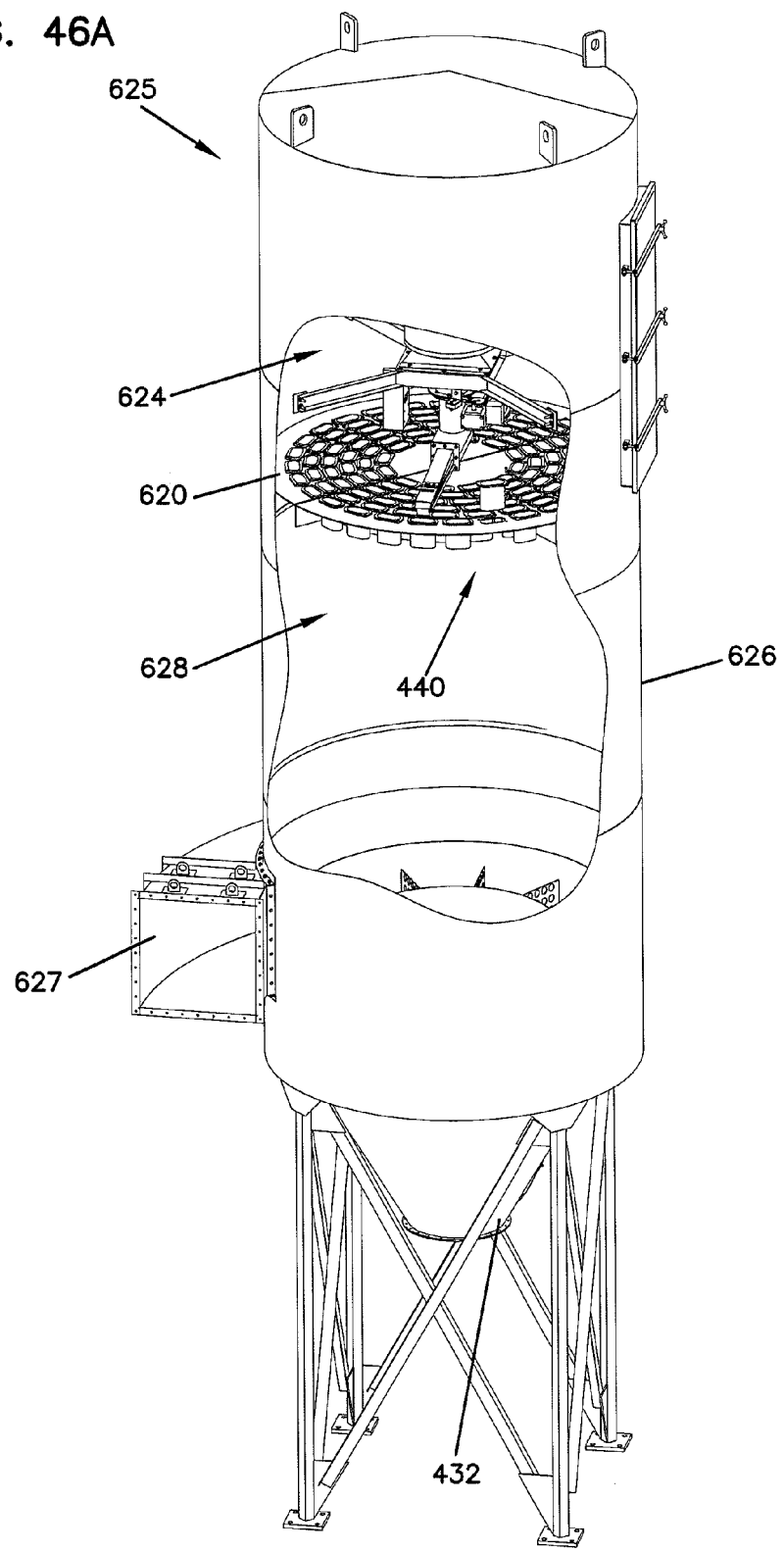
FIG. 46A is a perspective view of the dust collector depicted in FIG. 46.
Figure 46B:
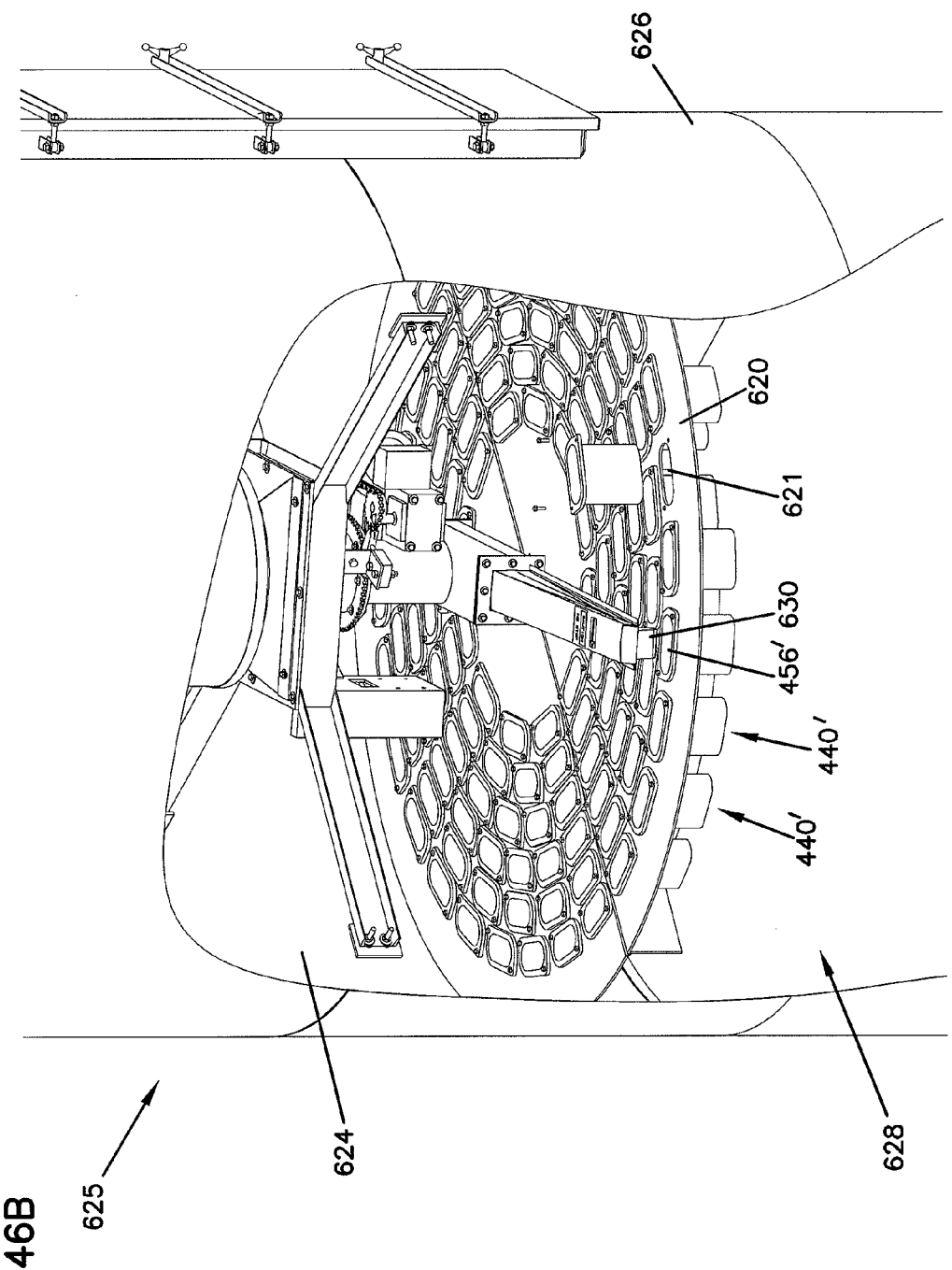
FIG. 46B is an enlarged, perspective view of a portion of the dust collector of FIG. 46A.

FIGS. 46, 46A, and 46B show another embodiment of a filter element 440'. The element 440' is constructed analogously to the element 440, except that the cross-section is racetrack-shaped rather than round-shaped. The element 440' has a media pack 442', a first flow face 454', a second flow face 456', a ring 448' having a flange 450', and a bolt-receiving aperture arrangement 452'. Although not depicted in FIGS. 46, 46A, and 46B, this embodiment also includes a frame analogous to retention frame 444 and a gasket member analogous to gasket member 458.

In FIG. 46, a tube sheet is shown at 620 having apertures 621. Each of the apertures 621 receive one of the filter elements 440'. The tube sheet 620 also includes bolt holes 622 for receiving bolts 623. In use, each of the elements 440' is mounted from the clean air volume side 624 through one of the apertures 621. The aperture arrangement 452' is aligned with the apertures 622 in the tube sheet 620. The bolts 623 are operably oriented through the apertures 452', 622 and tightened. This squeezes the gasket, analogous to gasket 458, to compress the gasket between and against the flange 450' and the tube sheet 620.

FIGS. 46A and 46B show a dust collector 625. The perspective in FIG. 46 is a close-up view of a portion of the internal components of the dust collector 625 in FIGS. 46A and 46B. The dust collector 625 includes dust collector housing 626 having a dirty air inlet 627. Dirty air flows into the dirty air inlet and enters the internal volume of the housing 626 in the dirty air volume 628. From there the air flows through the filter elements 440', which remove dirt and other particulate matter from the air. The cleaned air then flows into the clean air volume 624. From there the air exits the housing 626 through a clean air outlet which is not depicted.

Also viewable in FIGS. 46A and 46B is an arm 630 for firing a pulse of compressed gas at the second flow face 456' of each of the elements 440'. The arm 630 moves among the various filter elements 440', firing a pulse of compressed gas at the second or downstream flow face 456'. The pulse of compressed gas will operate to backflush or knock the dust and debris from the upstream side of the filter media helping to clean the media in the element 440'. The dust and debris that is knocked loose by pulsing falls by gravity into the hopper 432 (FIG. 46A). The pulsing mechanism at arm 630 can move in a random pattern in order to pulse or hit all of the filter elements 440' in a given amount of time. Pulsing the filter elements 440' helps to prolong the service life for the filter elements 440' before they need to be removed from the dust collector 625 and replaced with new ones.

Figure 47:
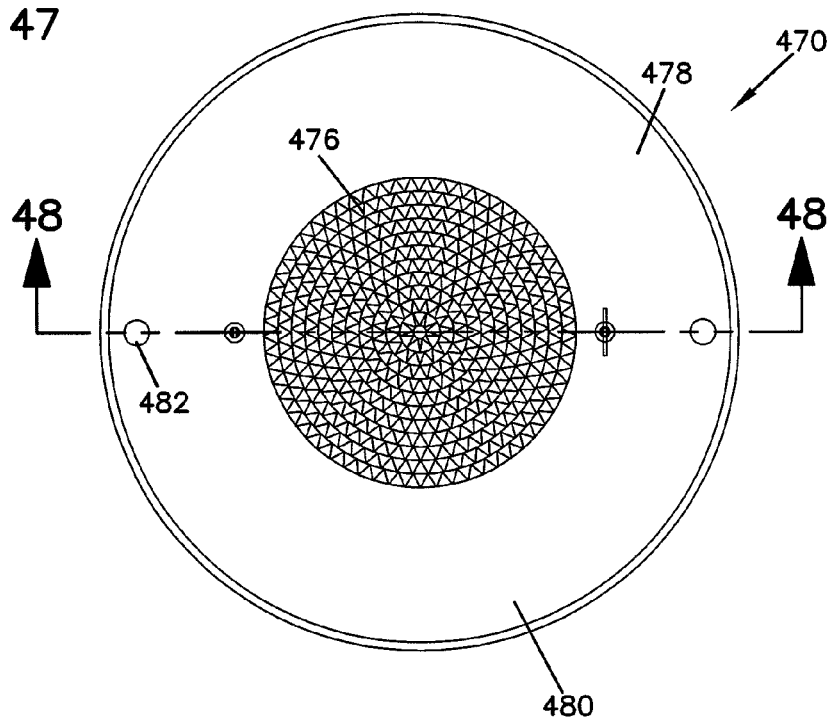
FIG. 47 is a top plan view of another embodiment.
Figure 49:
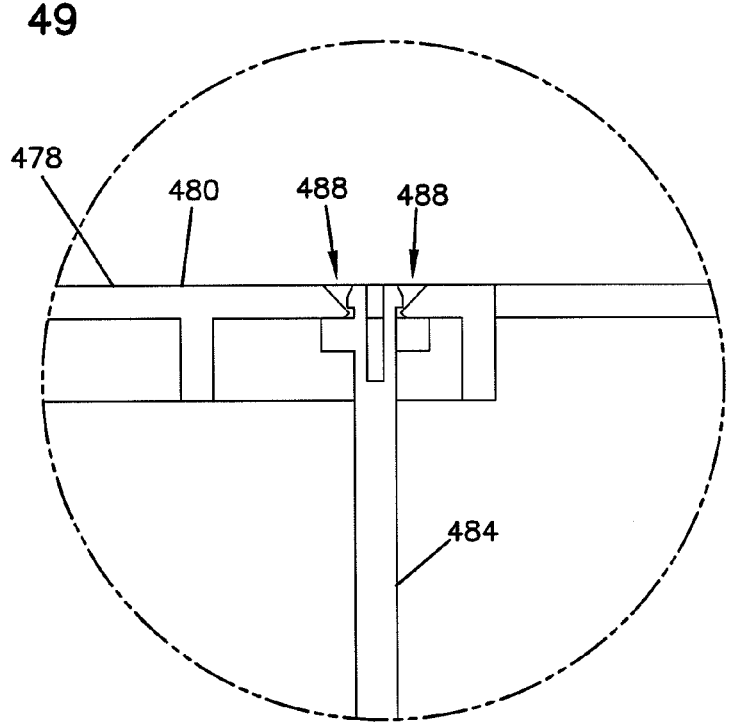
FIG. 49 is an enlarged view of the section shown in FIG. 48.
Figure 48:
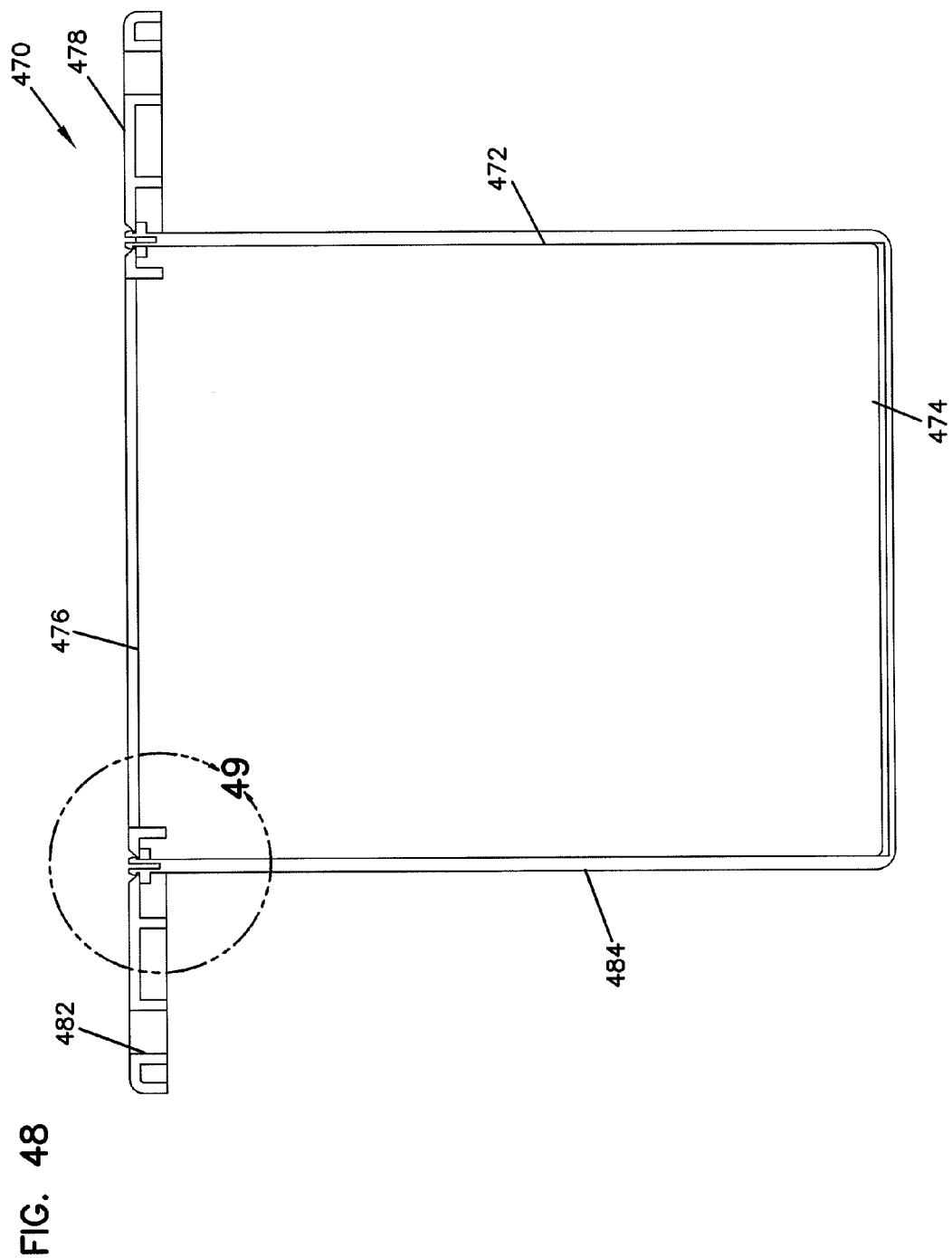
FIG. 48 is a cross-sectional view of the filter element of FIG. 47, the cross-section being taken along the line 48-48 of FIG. 47.
Figure 50:
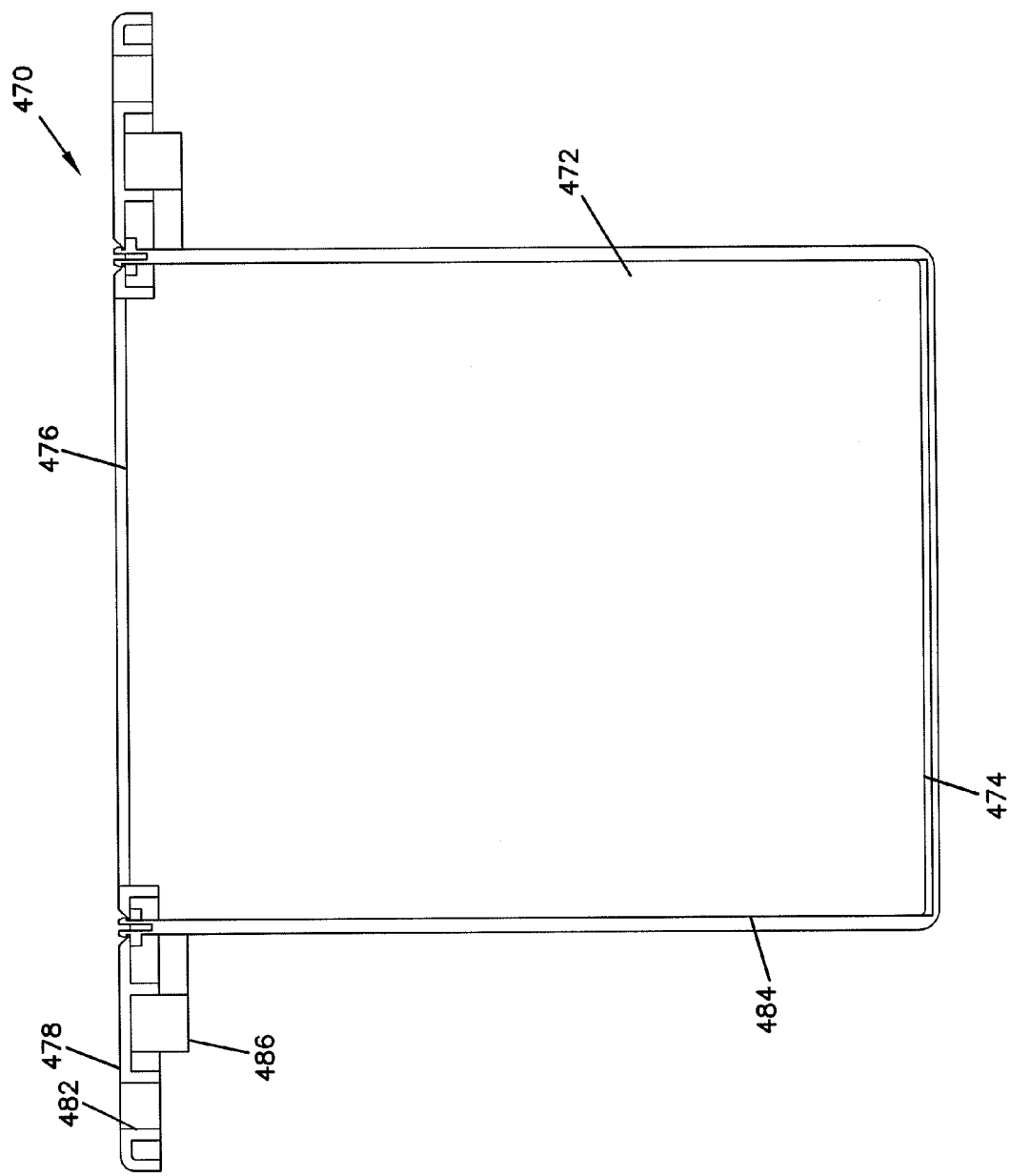
FIG. 50 is a cross-sectional view of the filter element of FIG. 47 and including a gasket member.

Another embodiment of a filter element is illustrated in FIGS. 47-49 at 470. The element 470 is similar to the element 440 in that it has a media pack 472, a first flow face 474, a second flow face 476, a ring 478 having a flange 480, a bolt receiving aperture arrangement 482, a frame 484, and a gasket member 486 (FIG. 50). FIG. 48 shows the element 470 before the gasket member 486 has been molded in place.

In this embodiment, the frame 484 is mechanically connected to the ring by snap engagement structure 488 (FIG. 49).

As with the embodiment of the filter element 440, the filter element 470 can have the ring 478 and frame 480 secured to the media pack 472 by way of over molding urethane. That is, urethane is poured into a mold and when it cures, it will secure the ring 478 directly to the media pack 472, as well as secure the frame 484 to the ring 478 and the frame 484 to the media pack 472.

Figure 51:
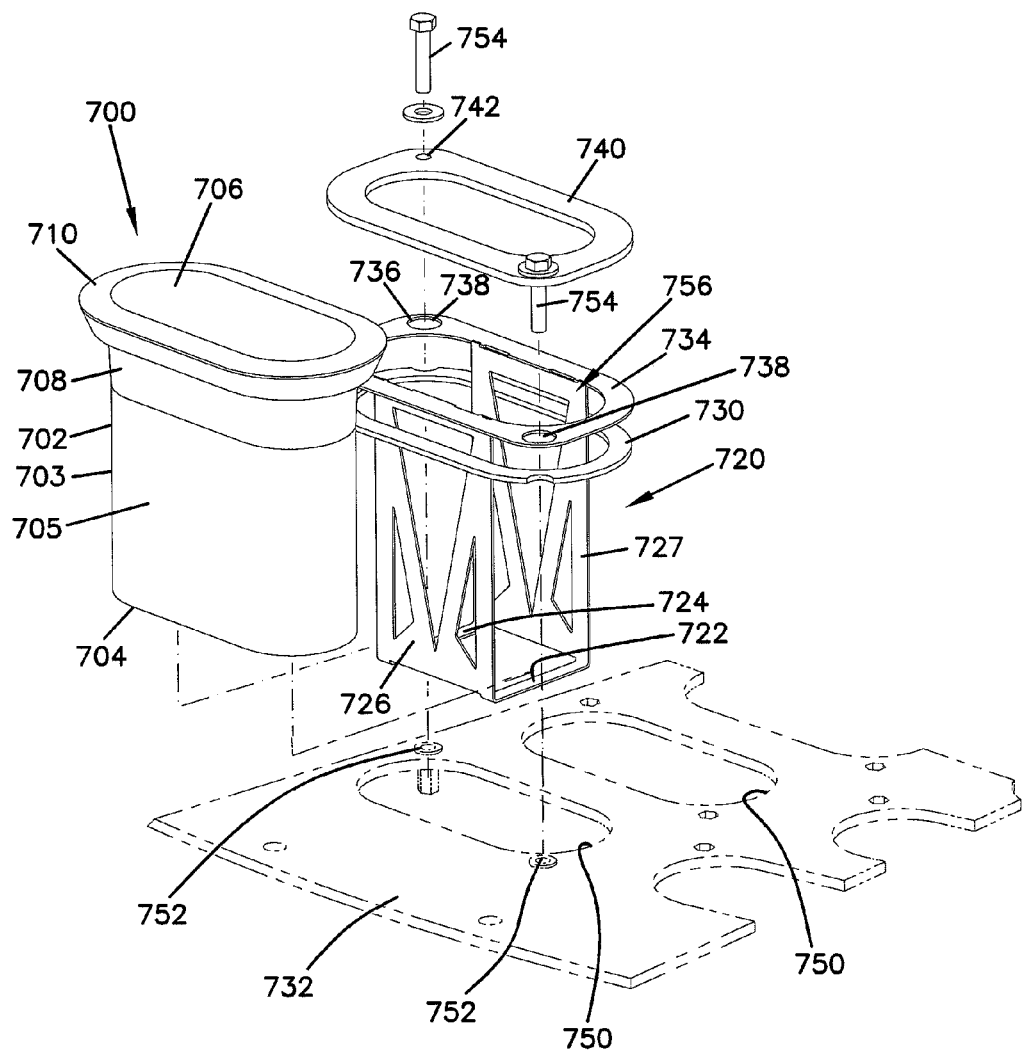
FIG. 51 is an exploded, perspective view of another embodiment of a filter element being installed in a tube sheet of a dust collector.

FIG. 51 illustrates another embodiment of a filter element 700. Filter element 700 includes a media pack 702 of Z-media, as characterized above. The media pack 702 has a first flow face 704 and an opposite second flow face 706. Again, the filter media 702 is not shown in detail but is only shown schematically. It should be understood that the entire flow face 706 includes media, with only a portion of the media actually depicted.

A ring 708 is secured to the outer peripheral surface 703 of the media pack 702. The ring includes a gasket 710 circumscribing the media pack 702 and adjacent to the second flow face 706.

In the embodiment shown, the media pack 702 has a cross-section that is racetrack-shaped. In other embodiments, it can be other shapes, including round, oval, or obround, for example. Also in this embodiment, the ring 708 is depicted as having the same cross-sectional shape as the media pack 702. In addition, in the embodiment shown, the gasket 710 has the same cross-sectional shape as the media pack 702. In other embodiments, it could have other shapes.

A bracket for holding the filter element 700 is shown at 720. The bracket 720 includes a pair of bars 722, 724, shown as generally parallel to each other. Between the bars 722, 724 is an open volume which allows for the flow of dirty air to reach the upstream flow face 704. Extending from the bars 722, 724 and perpendicular to the bars 722, 724 is a pair of side panels 726, 727. The side panels 726, 727 are shown as spaced from and parallel to each other and will hold and support the long sides 705 of the media pack 702. That is, in the embodiment shown, the media pack 702 is racetrack-shaped, having a shape with two parallel sides 705 joined by curved ends. The side panels 726, 727 extend along and against the sides 705 of the media pack 702. The curved ends of the media pack 702 are bracket-free. The space between the side panels 726, 727 defines a receiving volume 756 for receiving the filter element 700.

A seal member 730 helps to seal the bracket 720 with the tube sheet 732, depicted in phantom lines. This is explained further below. The seal member 730 can be many different types of material including caulk, silicone, urethane, or rubber, for example.

Terminating at an end of the side panels 726, 727 opposite from the bars 722, 724 is a seal flange 734. The seal flange 734 is generally perpendicular to the side panels 726, 727. In use, the seal flange 734 will be generally parallel to the tube sheet 732 and the seal member 710 of the filter element 700. Flange 734 defines an aperture arrangement 736. The aperture arrangement 736 includes a pair of throughholes 738, which extend through the flange 734.

A retention plate 740 is used for releasably securing and sealing the filter element 700 into the tube sheet 732. In the one shown, the retention plate 740 has generally the same shape as the seal flange 734 and defines the bolt-receiving apertures 742, which align with the apertures 738.

The tube sheet 732, depicted in phantom lines, includes apertures 750 for receiving a respective bracket 720 and filter element 700. Tube sheet 732 also includes apertures 752 for receiving bolts 754.

In use, the brackets 720 are mounted into the tube sheet 732 by placing the portion of the bracket 720 including the bars 722, 724 and side panels 726, 727 through the tube sheet aperture 750. The seal member 730 secures the bracket 720 to the tube sheet 732 by sealing it between the seal flange 734 and the tube sheet 732. This sealing can be a permanent seal, in the case of using caulk or silicone. In some instances, it can be desirable to have it be a removable seal, as well.

Next, the filter element 700 is oriented into the receiving volume 756 of the bracket 720, until the seal flange 710 is against the flange 734 of the bracket 720. The filter element 700 is then secured to the bracket 720 and tube sheet 734 by mounting the bolts 754 through the respective holes 742, 738, and 752. The bolts 754 are tightened in order to compress the seal member 710 between and against the retention plate 740 and the flange 734 of the bracket 720.

After a period of use, it will become time to replace the filter element 700. The filter element 700 is serviced by moving the retention plate 740 by removing the bolts 754. The old filter element 700 is then removed from the bracket 720 and the tube sheet 732. The bracket 720 will remain with the tube sheet 732. Next, a new filter element 700 is provided and placed in the receiving volume 756 of the same old bracket 720. The same old retention plate 740 is then placed over the element 700, and the bolts 754 are tightened in order to compress the gasket 710 between and against the retention plate 740 and the flange 734 of the bracket 720.

IV. The Embodiments of FIGS. 56-68

Figure 56:
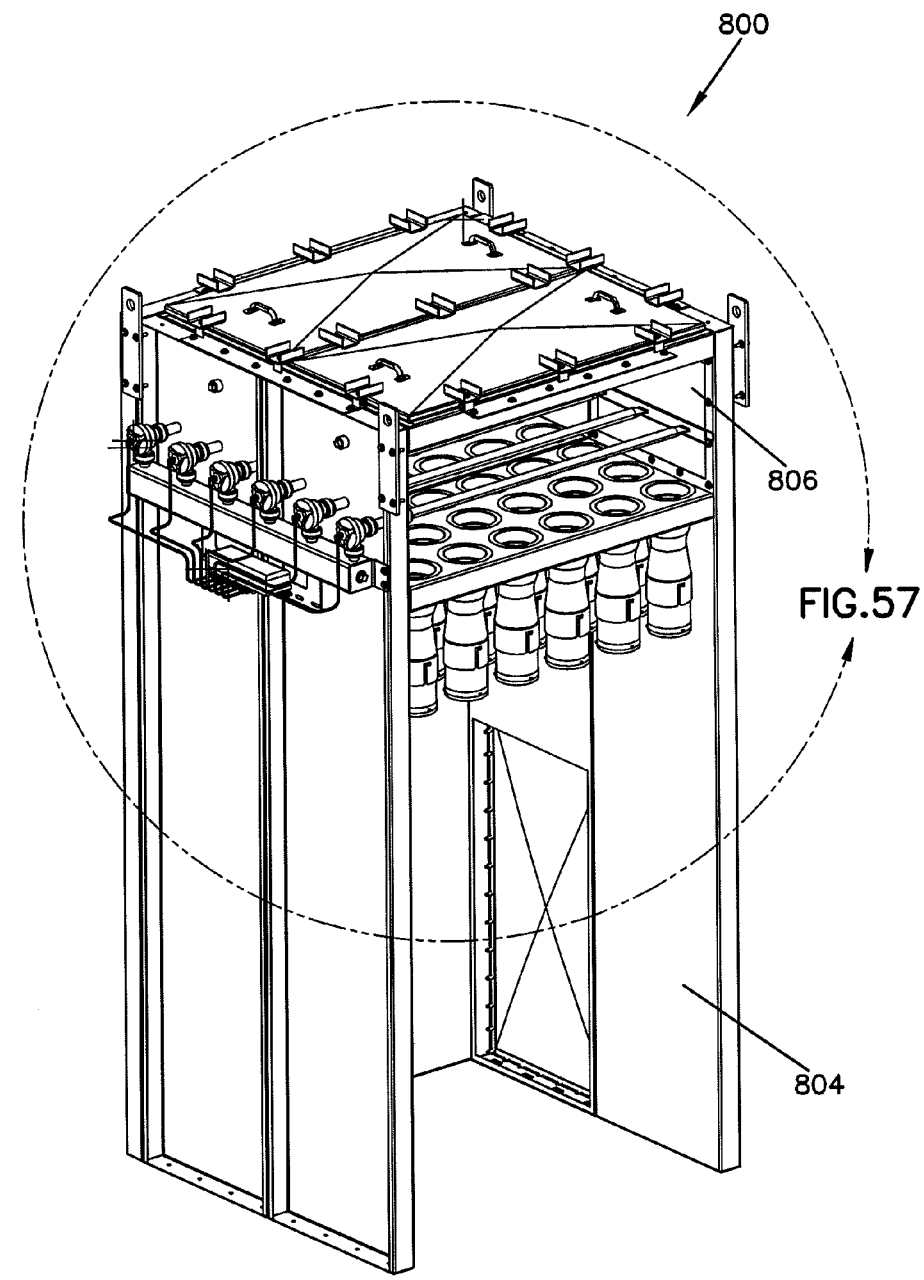
FIG. 56 is a perspective view another embodiment of a dust collector, constructed in accordance with principles of this disclosure.
Figure 57:
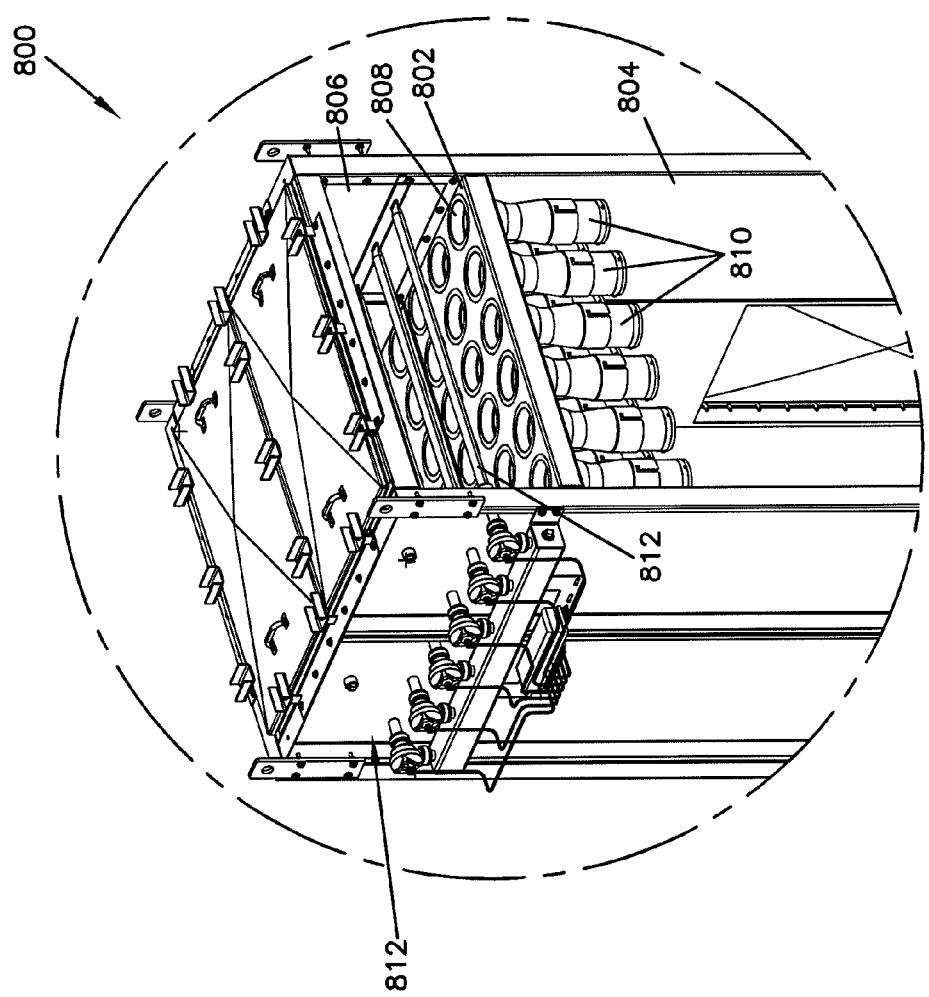
FIG. 57 is an enlarged, perspective view of a portion of the dust collector of FIG. 56.

In FIGS. 56 and 57, another embodiment of a dust collector is shown at 800. The dust collector 800 is illustrated with portions removed such that the internal components can be viewed. In the dust collector 800, there is a tube sheet 802. The tube sheet 802 separates a dirty air chamber 804 from a clean air chamber 806. The tube sheet 802 includes a plurality of tube sheet apertures 808, which, in this embodiment, accommodate a plurality of filter elements 810.

The dust collector 800 can include pulsing equipment 812, which can be used to reverse pulse clean filter elements 810.

In use, dirty air is drawn into the dirty air chamber 804, frequently by use a blower (not shown). The dirty air is prevented from flowing into the clean air chamber 806 without first flowing through a filter element 810. The filter elements 810 remove dust or other debris from the air, such that clean, filtered air is allowed to flow into the clean air chamber 806. Periodically, the pulsing equipment 812 will send a pulse of compressed air through the filter elements 810 from the clean air chamber 806, such that the air flows through the filter elements 810 from the clean side to the dirty side. This helps to clean the filter elements 810 from a build up of dust or dirt on the filter elements 810.

Figure 58:
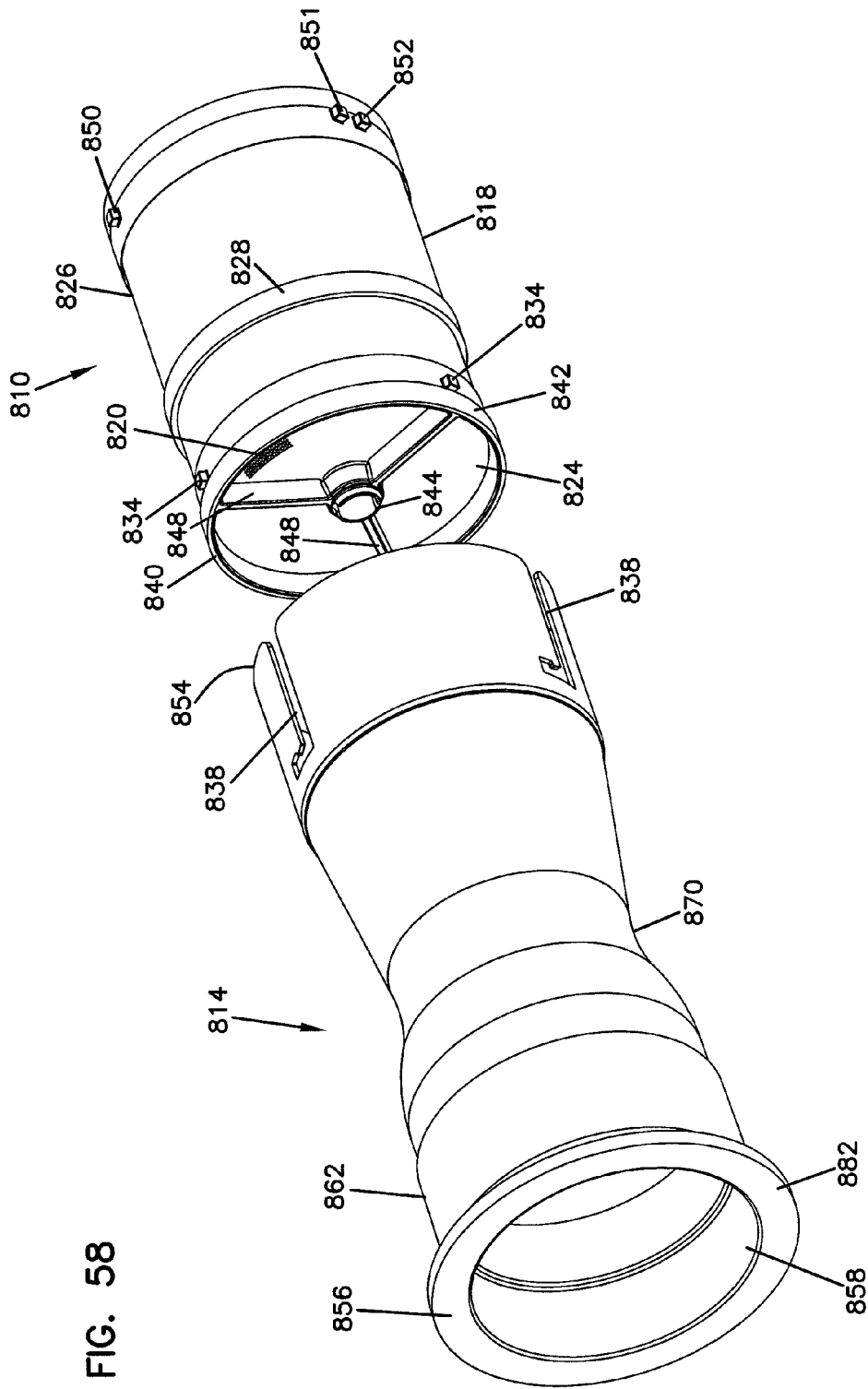
FIG. 58 is an exploded, perspective view of an embodiment of a filter element and a filter retainer tube utilized in the dust collector of FIGS. 56 and 57.
Figure 59:
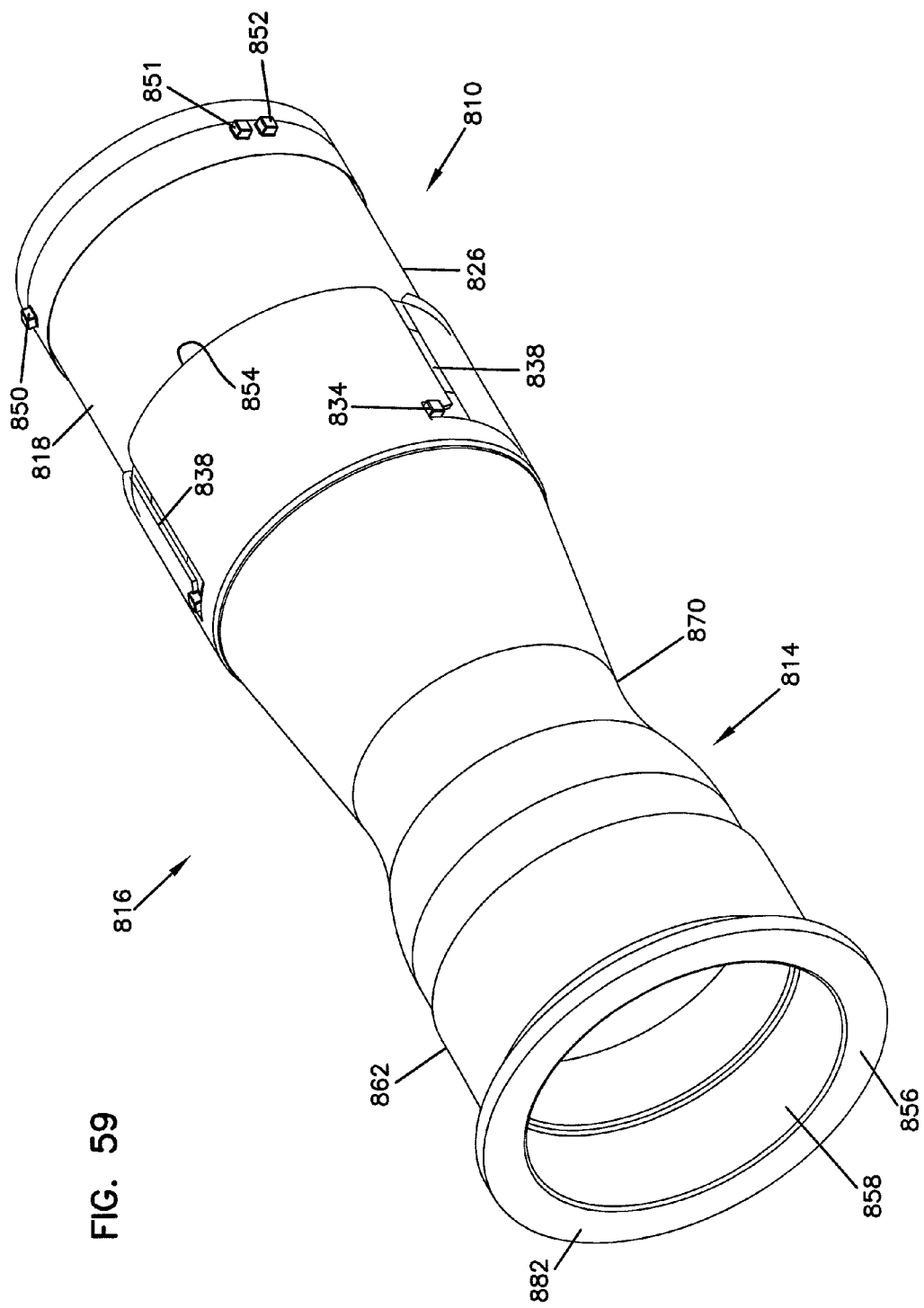
FIG. 59 is a perspective view of the combination of the filter element and filter retainer tube of FIG. 58 when assembled for use.
Figure 60:
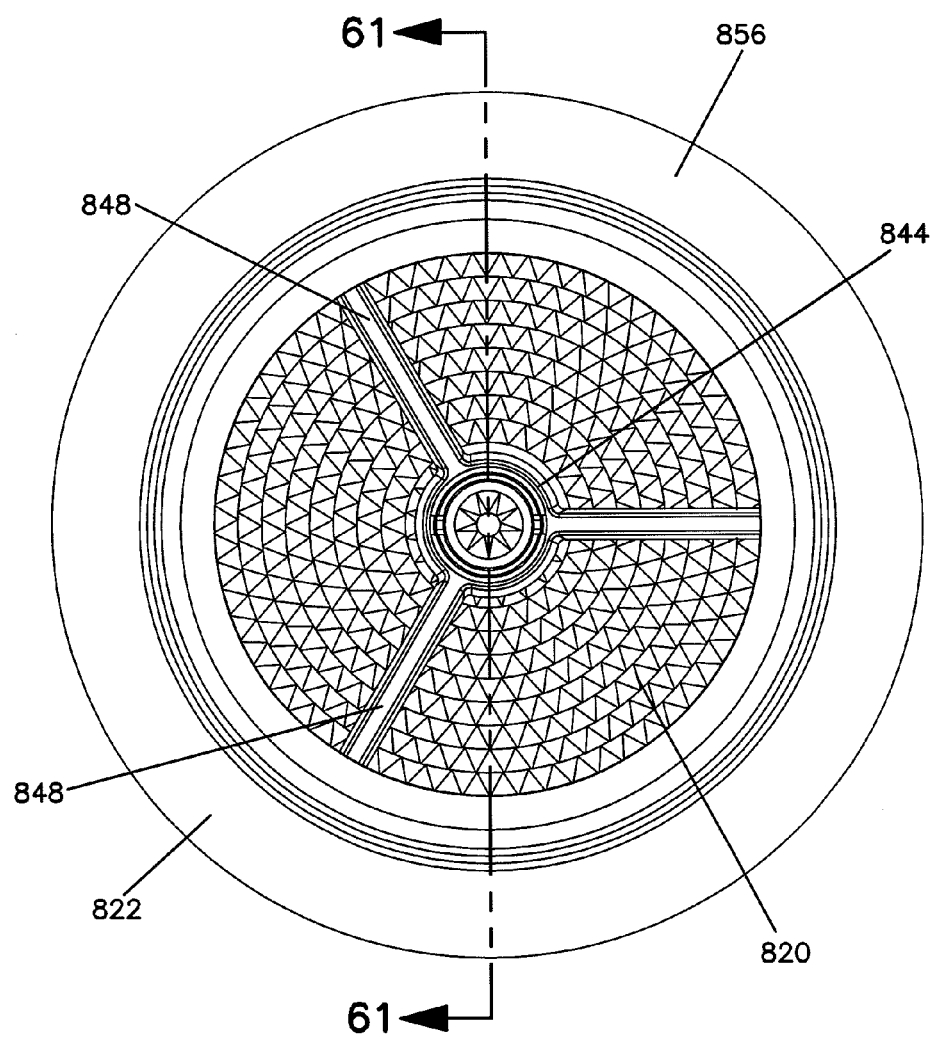
FIG. 60 is an end view of the assembled combination of FIG. 59.

FIG. 58 is an exploded, perspective view of filter element 810 and a filter retainer tube 814. The filter retainer tube 814 and filter element 810 can be releasably assembled together to form a combination 816 filter retainer tube and filter element (FIG. 59).

The filter element 810 includes a media pack 818 of z-media 820 as described previously. The media pack 818 has a first flow face 822 (FIG. 61) and an opposite second flow face 824. In FIG. 58, only a portion of the z-media 820 is shown, but it should be understood that media would cover the entire second flow face 824. The media pack 818 has an outer peripheral surface 826. In this embodiment, the media pack 818 is shown as having a circular cross section, but in other embodiments, it could have other shapes including oval, obround, or race track.

The filter element 810 includes a first gasket member 828. In this embodiment, the first gasket member 828 circumscribes the media pack 818. In particular, in the embodiment illustrated, the first gasket member 828 is secured to and is against the outer peripheral surface 826 and is oriented to form a radially directed seal 830 (FIG. 61) between and against an internal sealing surface 832 of the filter retainer tube 814, when the filter element 810 is installed within the filter retainer tube 814.

In this embodiment, the first gasket member 828 is spaced from both the first flow face 822 and the second flow face 824. In the particular embodiment illustrated, the first gasket member 828 is spaced closer to the second flow face 824 than the first flow face 822. In this embodiment, the first flow face 822 corresponds to an inlet flow face, while the second flow face 824 corresponds to an outlet flow face. In this embodiment, the first gasket member 828 can be in the form of a band of urethane, or rubber, or other types of deformable material, and it may be, in one example, adhered directly to the media pack 818 through adhesive, for example. The first gasket member 828 may have a width of at least 0.5 inches.

The filter element 818 includes a bayonet pin arrangement. The bayonet pin arrangement engages a corresponding bayonet slot arrangement in the filter retainer tube 814 to releasably secure the filter element 818 within the tube 814. In this embodiment, the bayonet pin arrangement includes a first plurality of circumferentially spaced bayonet pins 834. In this embodiment, the first plurality of bayonet pins 834 project radially outwardly from the filter element 810. In the specific example shown, the pins 834 project outwardly from a position adjacent to the second flow face 824. The pins 834 are sized and arranged to operably engage bayonet slots 838 in the filter retainer tube 814, when the filter element 810 is installed within the filter retainer tube 814.

In this embodiment, the first plurality of bayonet pins 834 is circumferentially spaced apart by at least 30 degrees. In the perspective view shown, two of the pins 834 are visible. There can be three pins 834, four pins 834, and more than four pins 834. Each of the pins 834 projects a distance of no greater than 2 inches from the filter element 810, and often no greater than 1 inch therefrom. The pins 834 will typically project at least 0.25 inches from the filter element 810.

In the embodiment shown, the filter element 810 further includes an end piece 840. In the embodiment shown, the end piece 840 covers the second flow face 824. Many embodiments can be used. In the one shown, the end piece 840 has an outer ring 842 circumscribing the media pack 818. In particular, the outer ring 824 circumscribes the media pack 818 at or adjacent to the second flow face 824.

The end piece 840, in this embodiment, further includes a central hub 844. The central hub 844 is illustrated as being centered over the second flow face 824. The hub 844 can connect to a central core 846 extending the length of the filter element 810 from the second flow face 824 to the first flow face 822 and beyond. Such a construction can be made in accordance with U.S. Pat. No. 6,852,141, incorporated by reference herein.

In the embodiment shown, the end piece 840 further includes a plurality of spokes 848 over the second flow face 824. The spokes 848, in the embodiment shown, extend between the hub 844 and the outer ring 842.

In this embodiment, the first plurality of pins 834 are shown projecting radially from the outer ring 842 of the end piece 840.

Still in reference to FIG. 58, the filter element 810 can include a second plurality of circumferentially spaced bayonet pins 850. In this embodiment, the second plurality of bayonet pins 850 is illustrated as projecting radially outwardly from the media pack 818 and adjacent to the first flow face 822. The pins 850 are sized and arranged to interfere with the bayonet slots 838 in the filter retainer tube 814. That is, in order to prevent assembly of the filter element 810 backwards into the filter retainer tube 814, the bayonet pins 850 are sized and arranged such that they will not fit within the slots 838. In the embodiment shown, the pins 850 include at least one extra pin 851 that is positioned so that it will interfere with the filter retainer tube 814 if the pin 852 adjacent to it is trying to fit within the slot 838. In another embodiment, instead of having an extra pin 851, one of the pins 850 may be made to be wider overall than the slot 838 such that it will not fit within the slot 838.

When the filter element 810 is assembled within the filter retainer tube 814, the filter element 810 will extend beyond the end of the filter retainer tube 814. In the embodiment shown, at least half of the filter element 810 will project from a filter element engaging end 854 of the filter retainer tube 814.

Figure 61:
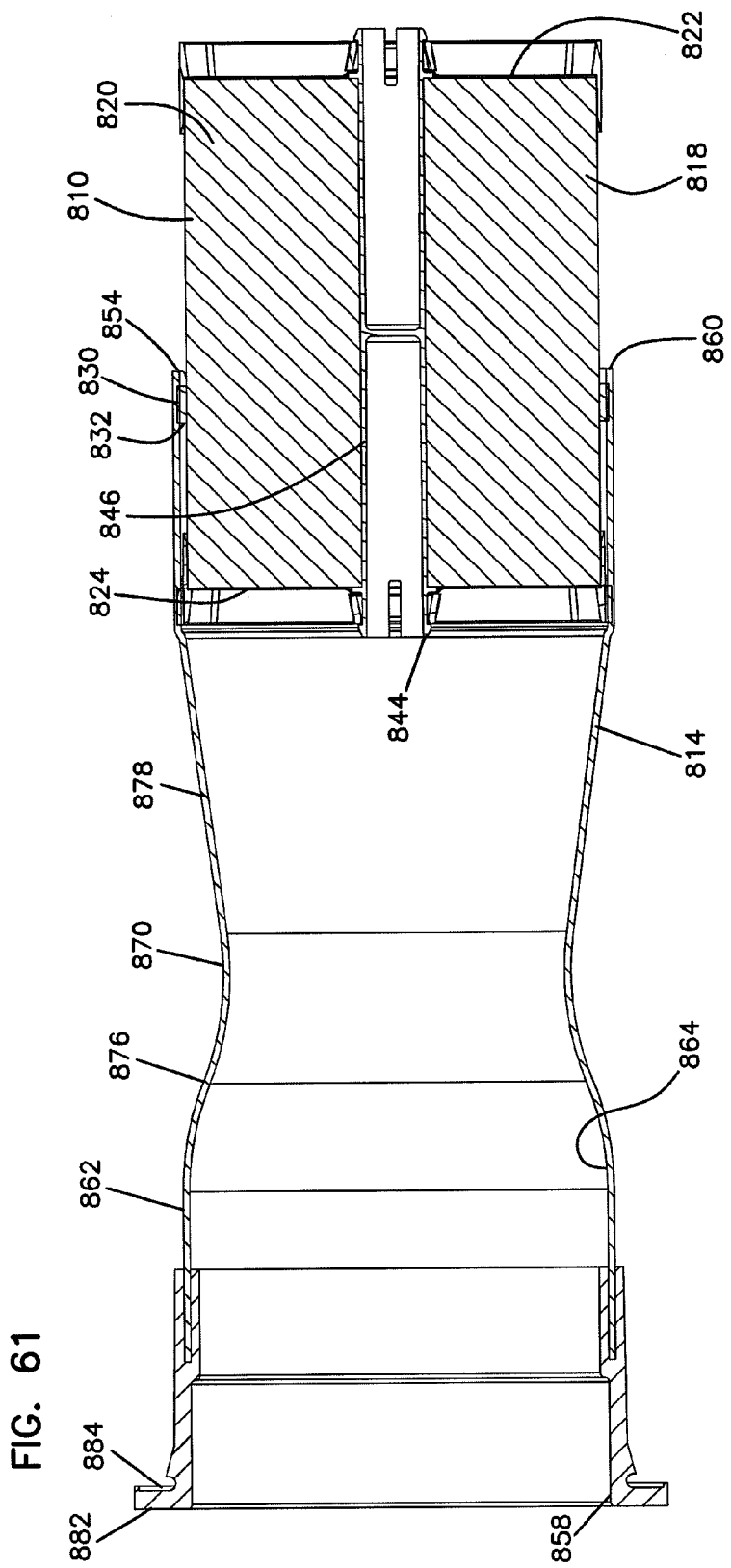
FIG. 61 is a cross-sectional view of the filter element and filter retainer tube combination of FIG. 60, the cross section being taken along the line A-A of FIG. 60.
Figure 62:
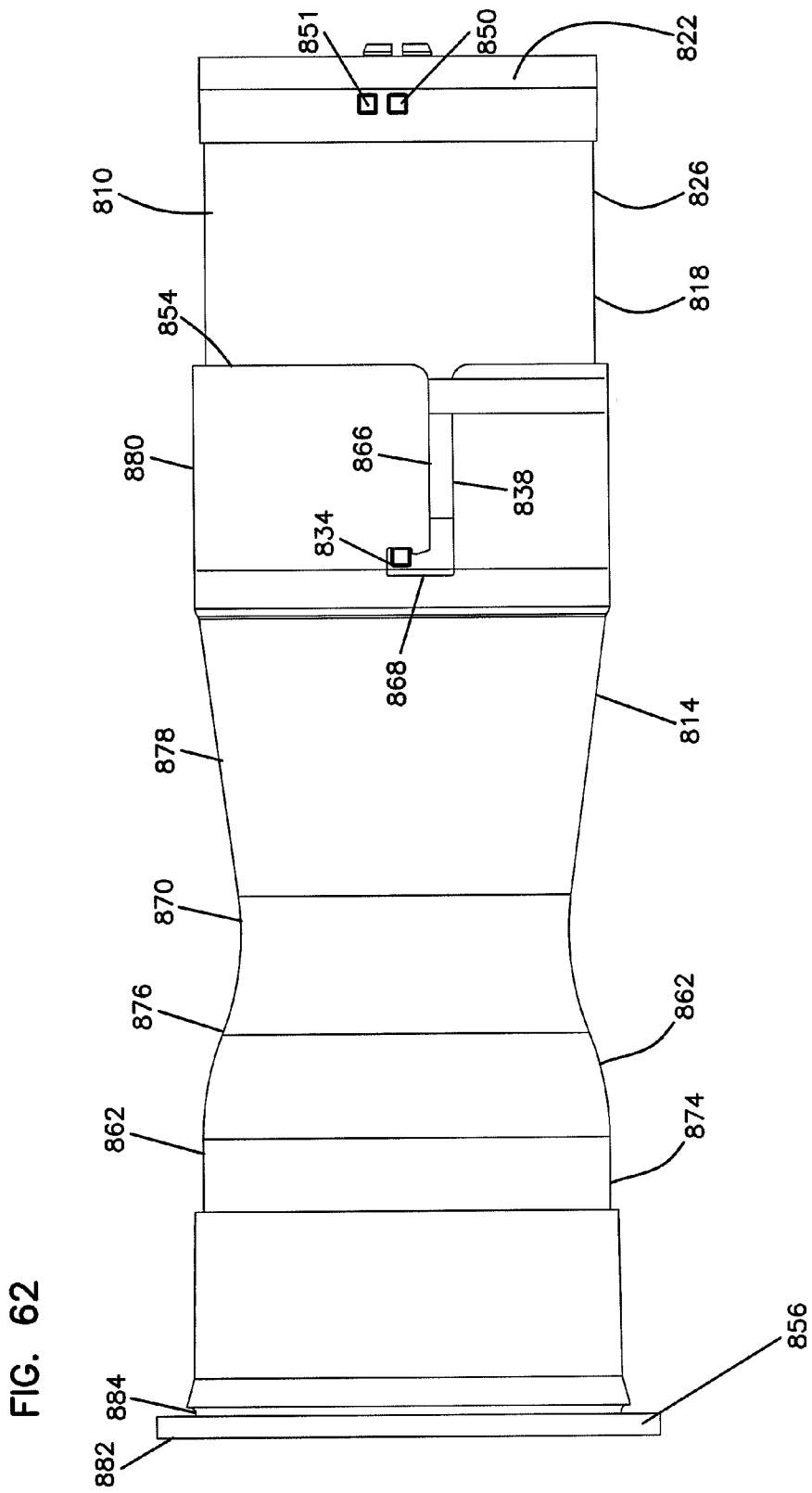
FIG. 62 is a side elevational view of the filter element and filter retainer tube combination of FIG. 59.

The filter retainer tube 814 includes a tube sheet engaging end 856, which is located at an opposite end from the element engaging end 854. The tube sheet engaging end 856 defines an opening 858, and the element engaging end 854 also defines an opening 860 (FIG. 61). Between the filter element engaging end 854 and the tube sheet engaging end 856 is a side wall 862, defining an interior volume 864. The side wall 862, in this embodiment, includes the plurality of bayonet slots 838, as mentioned above. Many embodiments can be made, but in the particular embodiment illustrated, each of the bayonet slots 838 includes a vertical slot portion 866 (FIG. 62) and a horizontal slot portion 868 (FIG. 62). As can be seen in FIG. 62, the vertical slot portion 866 extends from the filter element engaging end 854 along the side wall 862. The horizontal slot portion 868 is generally perpendicular to the vertical slot portion 866, and the horizontal slot portion 868 is spaced from the filter element engaging end 854.

In general, there will be at least the same number of slots 838 as there are pins 834, and there can be more slots 838 than pins 834. The slots 838 have a width that is wide enough to accommodate sliding of the pins 834 along both the vertical slot portion 866 and horizontal slot portion 868.

In this embodiment, the side wall 862 further includes a throat 870. The throat 870 is spaced between the tube sheet engaging end 856 and the filter element engaging end 854. The throat 870 has an inner diameter that is smaller than a diameter of the tube sheet engaging end 856 and the filter element engaging end 854. In addition, the inner diameter of the throat 870 is smaller than an outer diameter of the filter element 810.

As can be seen from FIGS. 61 and 62, the side wall 862 has a first, largest diameter region 872 adjacent to the tube sheet engaging end 856. This first diameter region 872 can be about 15-30% of the overall length of the filter retainer tube 814.

Moving from the first diameter region 872 in a direction toward the element engaging end 854 and adjacent to the first diameter region 872 is a second diameter region 874. The length of the second diameter region 874 can be about the same or less than the length of the first diameter region 872. The second diameter region 874 has a diameter less than the first diameter region 872, and the differences in diameter are less than 5%.

Extending between the second diameter region 874 and the throat 870 is a transition region 876. The transition region 876 has decreasing diameters from the second diameter region 874 until reaching the narrowest diameter of the throat 870. In the example shown, the throat 870 is located between 45-55% of the overall length of the filter retainer tube 814. The throat 870 is sized and located based on the inside diameter and position of the existing dust collector system blow pipe, which is part of the reverse pulse cleaning system 812. One useful distance from the exhaust of this blow pipe is based on the pulse expansion angle of 15 degrees ±5 degrees. One useful angle is 15 degrees with a tolerance of +0 degrees, −2 degrees. The pulse should expand to cover the entire second face 824 of the filter 810. The diameter of throat 870 is sized utilizing this same expansion angle. More specifically, the diameter of the throat 870 should be set to a minimum dimension that prevents system airflow velocities exceeding 6000 fpm. Ideally, the velocities would be less than 4000 fpm. The velocity of the concept shown is less than 1000 fpm.

Extending from the throat 870 in a direction toward the element engaging end 854 is a second transition region 878 with increasing diameters as they are spaced farther from the throat 870 until reaching a third diameter region 880. The third diameter region 880 extends between the second transition region 878 and the filter element engaging end 854. The third diameter region 880 can have a length approximately equal to the first diameter region 872.

The side wall 862, when constructed as described above with these various diameter regions and throat 870 is able to function well as a nozzle in order to help with reverse pulse cleaning. That is, when a pulse of air enters the filter retainer tube 814 through the opening 858, the shape of the side wall 862 helps to direct the pulse of air evenly and with reduced turbulence in order to help to clean the filter element 810. In some arrangements, the side wall 862 with the throat 870 functions as a venturi device.

The tube sheet engaging end 856 includes a ring 882 circumscribing the opening 858. Adjacent to the ring 882 is a notch 884 that receives the edge of the tube sheet apertures 808. In many designs, the relative outer diameter of the notch 884 and the inner diameter of the apertures 808 of the tube sheet 802 creates an interference fit therebetween, so that air cannot pass through that space.

To assemble the filter element 810 and the filter retainer tube 814, the filter element 810 is connected to the filter retainer tube 814 by sliding the bayonet pins 834 along the vertical slot portion 866 of the bayonet slots 838. Then, the filter element 810 is rotated within the filter retainer tube 814 so that the bayonet pins 834 slide within the horizontal slot portion 868 of the bayonet slots 838. Radial seal 830 is formed between the first gasket member 838 and the internal sealing surface 832 of the filter retainer tube 814. In the embodiment shown, the internal sealing surface 832 is adjacent to the element engaging end 854. The combination 816 of the filter element 810 and filter retainer tube 814 is then installed into the dust collector 800 through the aperture 808 in the tube sheet 802. This is done by placing the first flow face 822 first through the aperture 808, followed by the rest of the combination 816, until the ring 882 is against the tube sheet 802, with the notch 884 engaged within the aperture 808 of the tube sheet 802. Of course, other ways of securing the filter retainer tube 814 to the tube sheet 802 could be used.

In use, dirty air flows from the dirty air chamber 804 and into the first flow face 822 of the filter element 810. The z-media 820 removes dirt and debris from the dirty air. Filtered air then emerges from the second flow face 824 and flows through the interior volume 864 of the filter retainer tube 814. The filtered air then flows into the clean air chamber 806 of the dust collector 800. Periodically, the filter element 810 is cleaned by emitting a pulse of compressed air, which flows into the filter retainer tube 814 through the opening 858. The shape of the side wall 862 can be such that it helps to deliver the energy of the pulse to the filter element 810. The pulse then back flushes the filter element 810 and helps to remove dirt and debris from the upstream side of the z-media 820.

Periodically, the filter element 810 will need to be changed. When change is needed, the combination 816 is removed from the dust collector 800 by pulling the filter retainer tube 814 upwardly from the tube sheet 802. This removes the entire combination 816 of the filter element 810 and the filter retainer tube 814. The filter element 810 is then removed from the filter retainer tube 814 by rotating the element 814 so that the bayonet pins 834 move along the horizontal slot portion 868 until reaching the vertical slot portion 866. Then, the filter element 810 is slid out of the filter retainer tube 814 by sliding the bayonet pins 834 along the vertical slot portion 866, until the element 810 is removed from the filter retainer tube 814. A new filter element 810 may then be provided and assembled to the filter retainer tube 814, as described previously.

When the filter element 810 is assembled within the filter retainer tube 814, less than half, and typically less than ⅓ of the overall length of the filter retainer tube 814 is occupied by the filter element 810. That is, at least half and typically at least ⅔ of the filter retainer tube 814 functions as a flow tube without being occupied by a filter element.

Another embodiment of a filter element and filter retainer tube is shown in FIGS. 63-67. The filter element 900 and filter retainer tube 902 can be assembled together to form a combination 904 (FIG. 66), which may be installed in dust collector 800.

Figure 63:
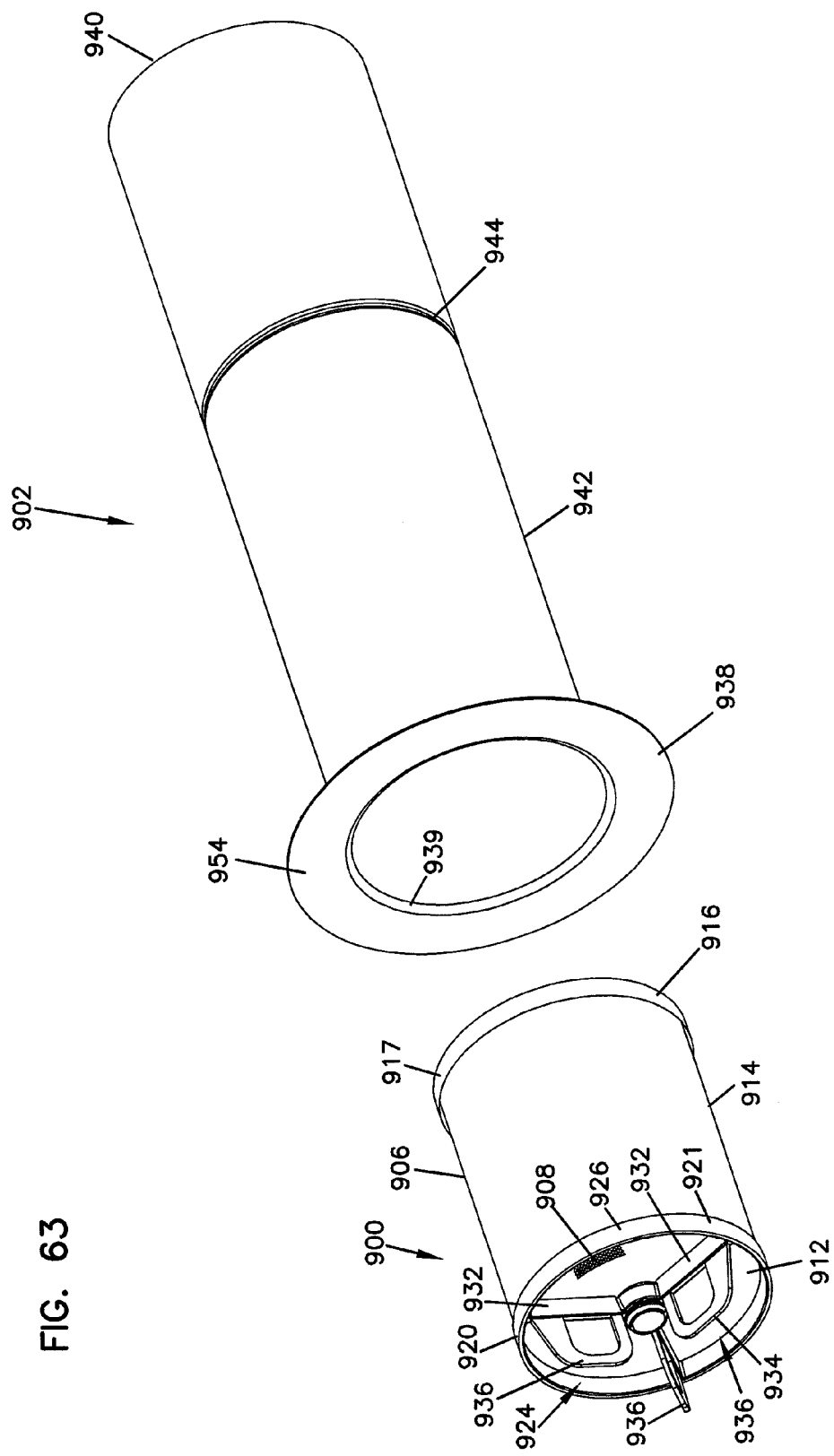
FIG. 63 is an exploded, perspective view of another embodiment of a filter element and filter retainer tube, which can be used in the dust collector of FIGS. 56 and 57.
Figure 64:
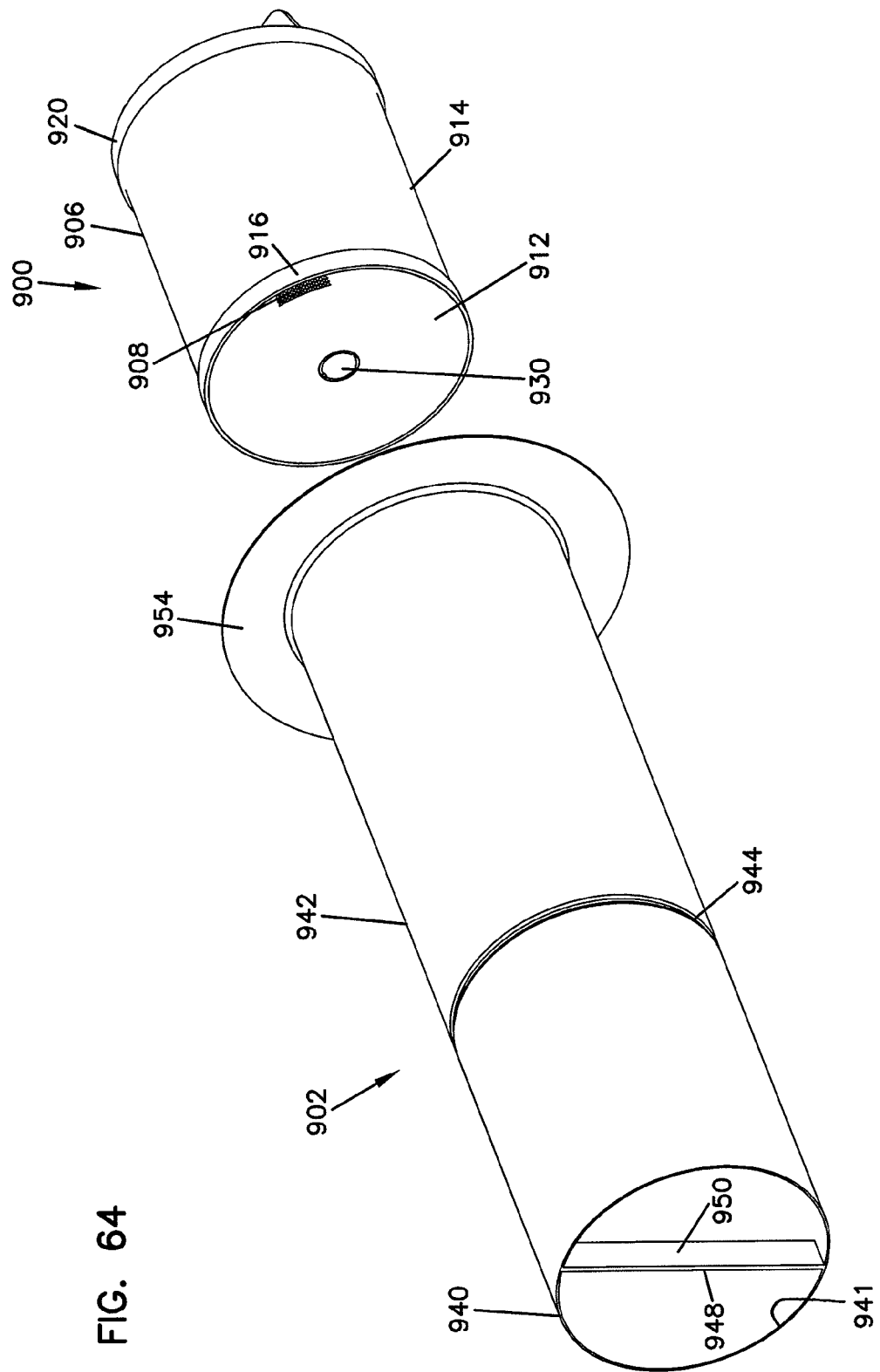
FIG. 64 is another exploded, perspective view of the filter element and filter retainer tube of FIG. 63.
Figure 65:
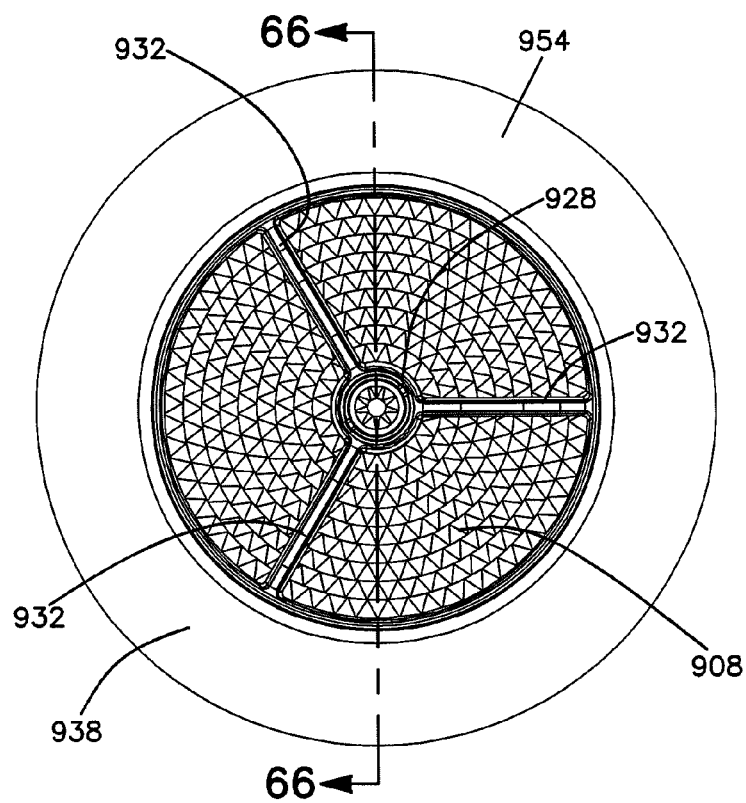
FIG. 65 is an end view of the assembled filter element and filter retainer tube of FIGS. 63 and 64.

The filter element 900 includes a media pack 906 of z-media 908, as described previously. In this embodiment, the media pack 906 has a circular cross section, but could have other shapes such as oval, obround, or race track. In FIGS. 63 and 63, only a portion of the z-media 908 is illustrated, but it should be understood, that the z-media 908 would cover the entire flow face.

The media pack 906 includes a first flow face 910 (FIG. 66) and a second flow face 912. In the embodiment shown, the first flow face 910 corresponds to an inlet flow face, while the second flow face 912 corresponds to an outlet flow face. The z-media 908 functions as described previously herein. The media pack 906 has an outer peripheral surface 914.

The filter element 900 includes a first gasket member 916. In this embodiment, the first gasket member 916 is adjacent to the first flow face 910 and is against the outer peripheral surface 914. The first gasket member 916 has an outer radially directed sealing surface 917 that is oriented to form a radially directed seal 918 (FIG. 66) against the filter retainer tube 902, when the filter element 900 is installed within the filter retainer tube 902. The first gasket member 916 can be a band of urethane, rubber, or other yieldable material that can be compressed to form a seal. The first gasket member 916 need not be located adjacent to the first flow face 910, but can be located anywhere along the filter element 900.

Although only one gasket member is needed to form a seal, in this embodiment, there is an optional second gasket member 920 circumscribing the media pack 906. The second gasket member 920 has an outer radially directed sealing surface 921 that is oriented to form a radially directed seal 922 (FIG. 66) against an internal sealing surface of the filter retainer tube 902, when the filter element 900 is installed within the filter retainer tube 902.

In this embodiment, the filter element 900 further includes an end piece 924. The end piece 924, in this embodiment, covers the second flow face 912. In this embodiment, the end piece 924 has an outer ring 926 circumscribing the media pack 906. In this embodiment, the outer ring 926 circumscribes the second flow face 912 of the media pack 906.

In this embodiment, the end piece 924 further includes a hub 928, which is centered over the second flow face 912. The hub 928 may interact or engage with a central core 930 that extends through the media pack 906 between the first flow face 910 and second flow face 912. Such construction may be done in accordance with U.S. Pat. No. 6,852,141, which is incorporated herein by reference.

In this embodiment, the end piece 924 also includes a plurality of spokes 932 extending between the hub 928 and the outer ring 926. At least some of the spokes 932 can have handle members 934 projecting therefrom.

Figure 66:
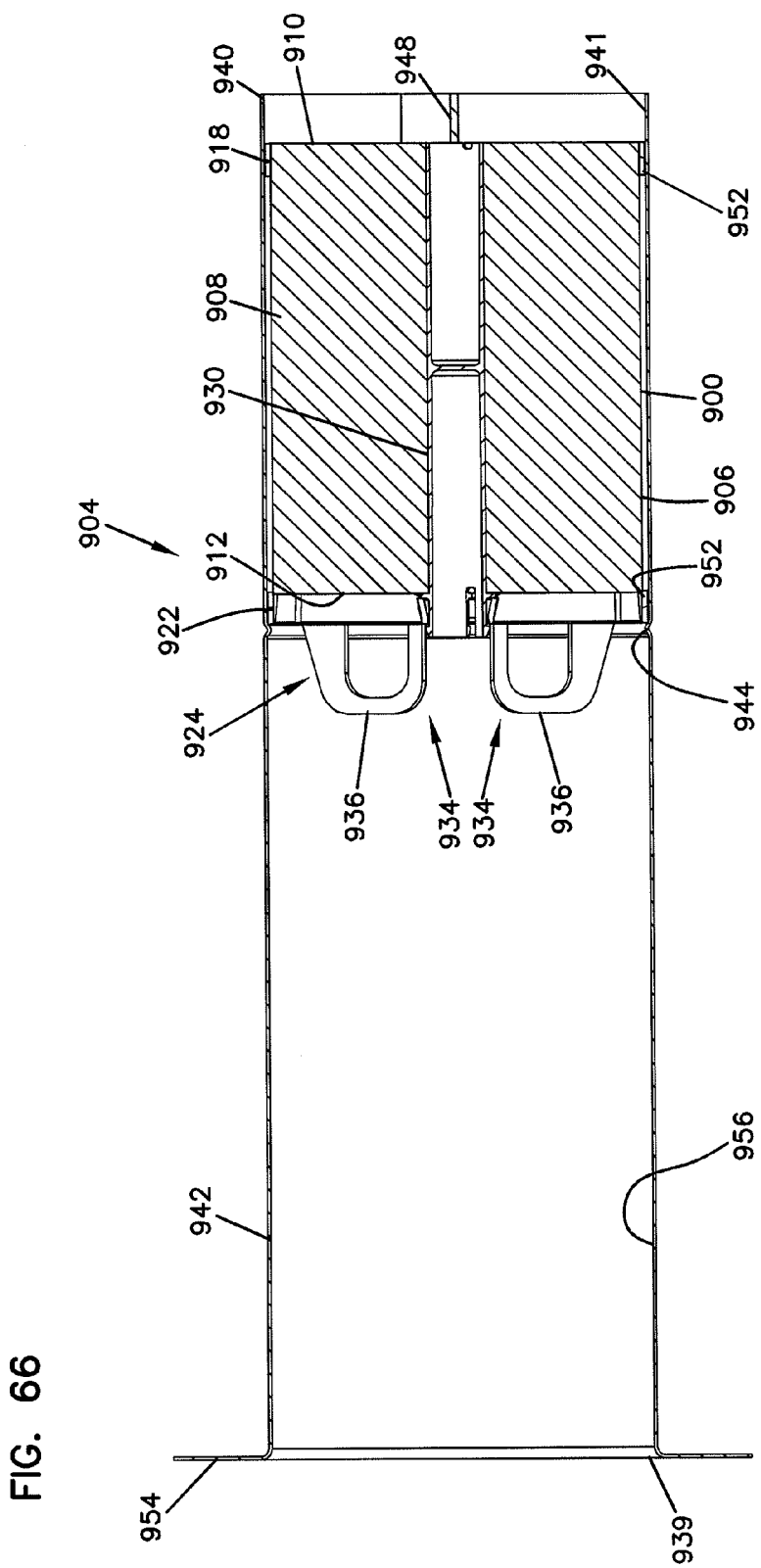
FIG. 66 is a cross-sectional view of the combination filter element and filter retainer tube, the cross-section being taken along the line A-A of FIG. 65.
Figure 67:
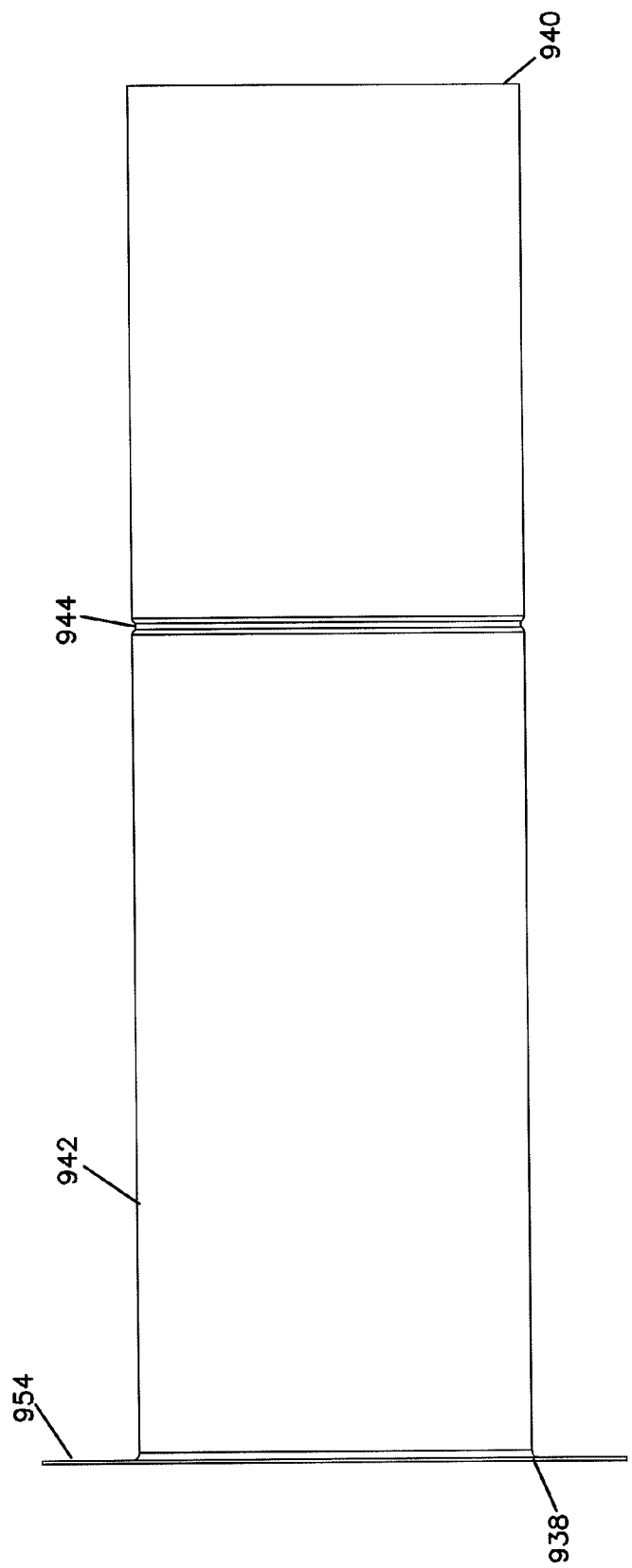
FIG. 67 is a side elevational view of the filter element and filter retainer tube of FIG. 66.

In this embodiment, the handle members 934 comprise a grasping portion 936 spaced a sufficient distance from the spokes 932 to accommodate at least a portion of a human hand. As can be seen in FIG. 66, the grasping portion 936 can have a C-shape, as they extend from the spokes 932. This grasping portion 936 will define a through hole between the grasping portion 936 and the spokes 932.

In this embodiment, each of the spokes 932 includes handle member 934 projecting therefrom. In other embodiments, there can be fewer handle members 934 than there are spokes 932. In the particular embodiment shown, there are three spokes 932, each of the spokes having a handle member 934.

In the embodiment shown, the second gasket member 920 is attached to an outer radial surface of the outer ring 926 of the end piece 924.

The filter retainer tube 902 includes a tube sheet engaging end 938 with an opening 939 sized to receive the filter element 900 therethrough. At an end opposite of the tube sheet engaging end 938 is a filter element engaging end 940 with an opening 941 (FIG. 66). Between the tube sheet engaging end 938 and the filter element engaging end 940 is a side wall 942.

The side wall 942, in this embodiment, is generally straight with a uniform diameter, with the exception of a projection 944 extending radially inwardly and about the circumference (circumferentially) of the size wall 942. The inner diameter of the projection 944 is smaller than a diameter of the tube sheet engaging end 938 and the filter element engaging end 940. In addition, the inner diameter of the projection 944 is smaller than an outermost diameter of the filter element 900. The projection 944 has a length that is less than 1 inch. In use, the projection 944 helps to hold the filter element 900 in place within the filter retainer tube 902.

The filter element engaging end 940, in this embodiment, includes a stop member 948 extending at least partially over the opening 941 in the filter element engaging end 940. In this embodiment, the stop member 948 is illustrated as a bar 950 extending across the middle of the opening 941. There can be many embodiments of a stop member 948 including any type of flange or grid, or other type of arrangement over the opening 941, provided that it is strong enough to hold the filter element 900 in place within the filter retainer tube 902. The bar 950 is just one example.

The side wall 942 has an internal radially directed sealing surface 952 spaced between the filter element engaging end 940 and the side wall projection 944.

The tube sheet engaging end 938, in this embodiment, includes a ring or flange 954. The flange 954 extends radially and circumscribes the opening 939. In use, the flange 954 will be oriented to be against the tube sheet 802, and can be permanently sealed in place against the tube sheet 802.

Attention is directed to FIG. 66. In this embodiment, it can be appreciated that the filter retainer tube 902 has an overall length between the filter element engaging end 940 and the tube sheet engaging end 938 that is at least 1.5 times the overall length of the filter element 900. In some embodiments, the filter retainer tube 902 is at least twice the length of the filter element 900.

When the filter element 900 is installed within the filter retainer tube 900, the filter element 900 will be located adjacent to the filter element engaging end 940 and will be located between the stop member 948 and the projection 944. This leaves a flow volume 956 within the side wall 942. This flow volume 956 helps to direct pulses of compressed air, as the pulses travel from the pulsing equipment 812 in the dust collector 800 to the filter element 900. That is, the volume 956 in the filter retainer tube 900 between the tube sheet engaging end 938 and the projection 944 defines the volume 956 that helps to contain the pulse of air and have it directed into the second flow face 912.

To install the filter element 900 into the dust collector 800, first, if retrofitting is needed, any old existing bag house filters are removed. The filter retainer tube 900 is inserted into the apertures 808 of the tube sheet 802 and can be permanently sealed and secured thereto. Alternatively, they may be temporarily secured thereto.

Next, the filter element 900 is placed into the filter retainer tube 902 by passing it through the opening 939 of the tube sheet engaging end 938. This is done by placing the first flow face 910 through the opening 939 first, followed by the rest of the filter element 900. The filter element 900 is then slid within the filter retainer tube 902 until the filter element 900 engages the stop member 948 and snaps over the projection 944 to orient the filter element 900 between the stop member 948 and the projection 944. Next, a seal is formed between the first gasket member 916 and the internal sealing surface 952 of the filter retainer tube 902. If there is a second gasket member, this also forms a seal with the filter retainer tube 902.

Periodically, the filter element 900 will need to be removed and replaced. To remove the filter element 900, the dust collector 800 is accessed through the clean air chamber 806. A person can reach through the opening 939 of the tube sheet engaging end 938 and grasp the filter element 900. The filter element 900 can be grasped by grasping the grasping portion 936 of the handle members 934. The filter element 900 is then pulled through the filter retainer tube 902 by snapping it over and past the projection 944 and sliding the filter element 900 along the side wall 942, until the filter element 900 is removed from the filter retainer tube 902. The old filter element 900 is then discarded, and a new filter element 900 is provided. The new filter element 900 is installed as described previously.

In FIG. 68, an alternate embodiment is illustrated. In this alternate embodiment, parts corresponding to the embodiment of FIGS. 63-67 are indicated by the same reference numeral, followed by a prime (') symbol. The descriptions of those like parts for the embodiment of FIG. 68 are incorporated herein by reference.

The filter element 900' includes a plurality of bayonet pins 960 extending radially therefrom. In the arrangement shown, the pins 960 project radially from a region of the filter adjacent to the second gasket region 920'. Alternatively, because of the first gasket region 916' forms a seal with the wall 942' of the retainer tube 902', the second gasket region 920' can be omitted, and the pins 960 can be located along the filter element 900' where the second gasket region 920' is located.

To accommodate the pins 960, the projection 944' has appropriately positioned and spaced bayonet slots 962, which are non-projection regions 962. The non-projection regions 962 have about the same inner diameter as the inner diameter of the remaining portion of the wall 942', which is larger than the inner diameter of the projection 944'.

In use, the element 900' is positioned in the filter retainer tube 902' by passing it through the opening of the tube sheet engaging end. The filter element 900 is then slid within the filter retainer tube 902'. The element 900' is rotated so that the pins 960 are aligned with the bayonet slots 962, and the element 900' is slid within the tube 902' until the filter element 900' engages the stop member 948'. The element 900' is again rotated so that the pins 960 are located out of alignment with the non-projection regions 962 to orient the filter element 900' between the stop member 948' and the projection 944'. Next, a seal is formed between the first gasket member 916' and the internal sealing surface of the filter retainer tube 902'. If there is a second gasket member 920', this also forms a seal with the filter retainer tube 902'. To remove the element 900' from the retainer tube 902', the above process is reversed.

V. Experimental

Figure 55:
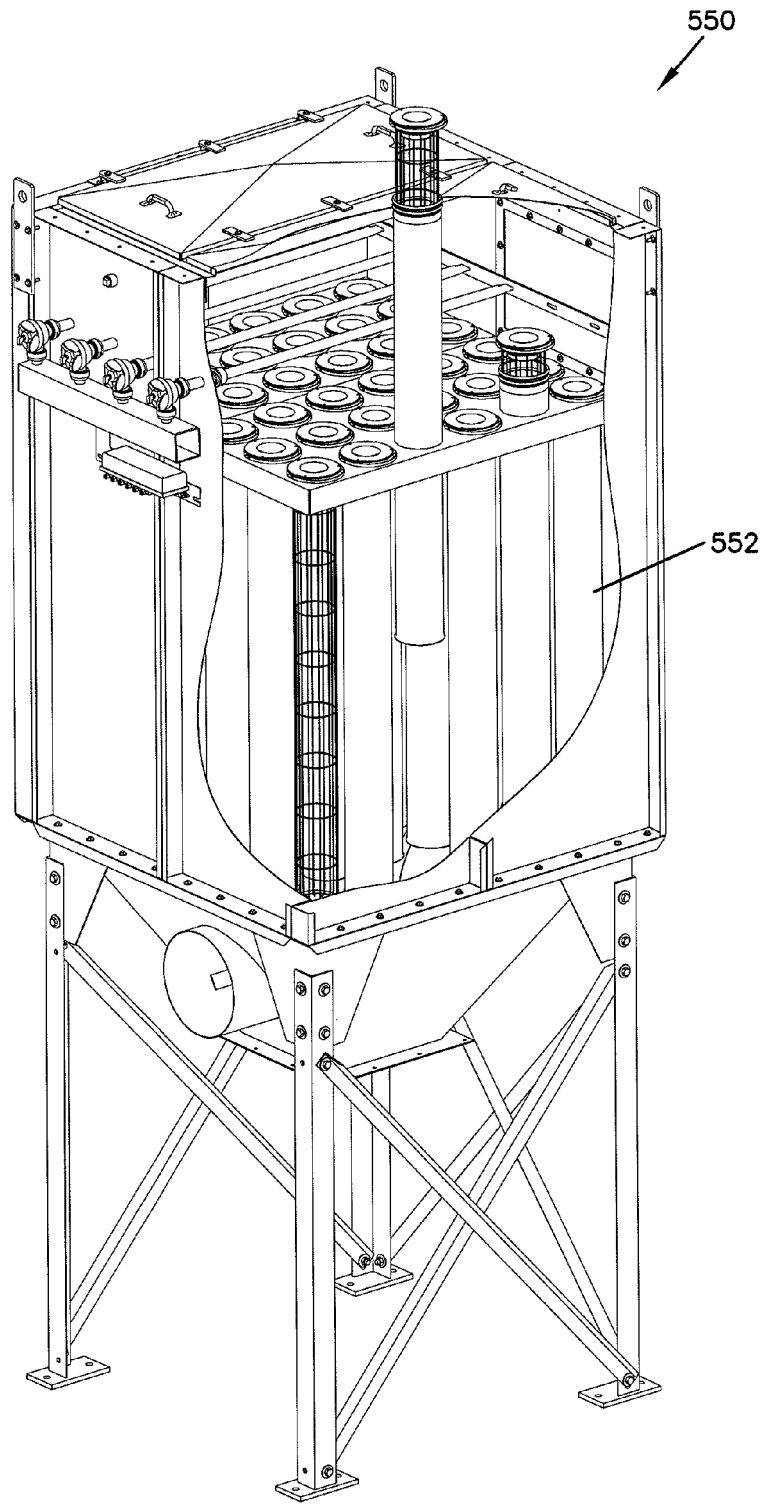

In a dust test in a lab, performance of filter elements 810 and 900 (described above in Section IV) were tested and compared to performance of bags in a bag house, such as shown in FIG. 55.

The bags in the bag house plugged to an unacceptable level (restriction of over 14 inches of water) after 50 hours. The bags were then reverse-pulse cleaned, and after cleaning, the bags plugged again unacceptably (restriction of 10 inches of water) after 4 hours.

The elements 810 and 900 operated within normal restrictions (no more than 4 inches of water) for over 160 hours, and then the test was stopped at about 170 hours. The filter element 810 performed with a restriction of under 2 inches of water for over 100 hours and close to 120 hours; after 120 hours, the airflow was increase and the restriction increased to around 3 inches of water, fluctuating just above and below the 3 inches mark and stayed there for over 160 hours. The filter element 900 performed with a restriction of about 1 inch of water for over 70 hours, and after 80 hours the airflow was increased and restriction increased to over 3 inches of water but under 4 inches and stayed there for over 160 hours.

From these tests, one can conclude that the elements 810 and 900 utilizing the z-media 820, 908 had at least 3 times the life of the bag house bag filters. In addition, the elements 810, 900 had a lower restriction after 10 hours.

VI. Methods

Figure 52:
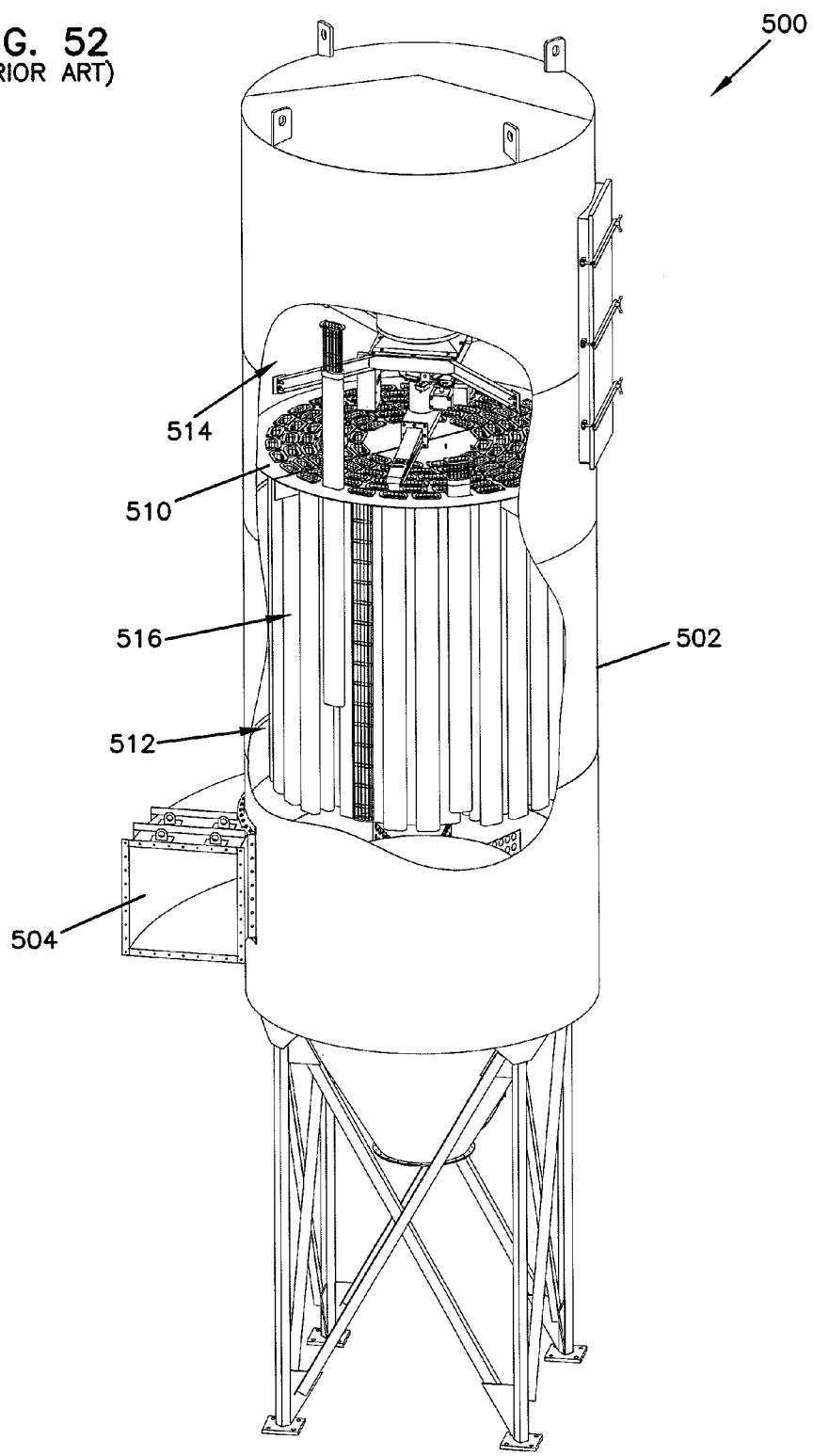
FIGS. 52-55 are perspective views of prior art dust collectors.
Figure 53:
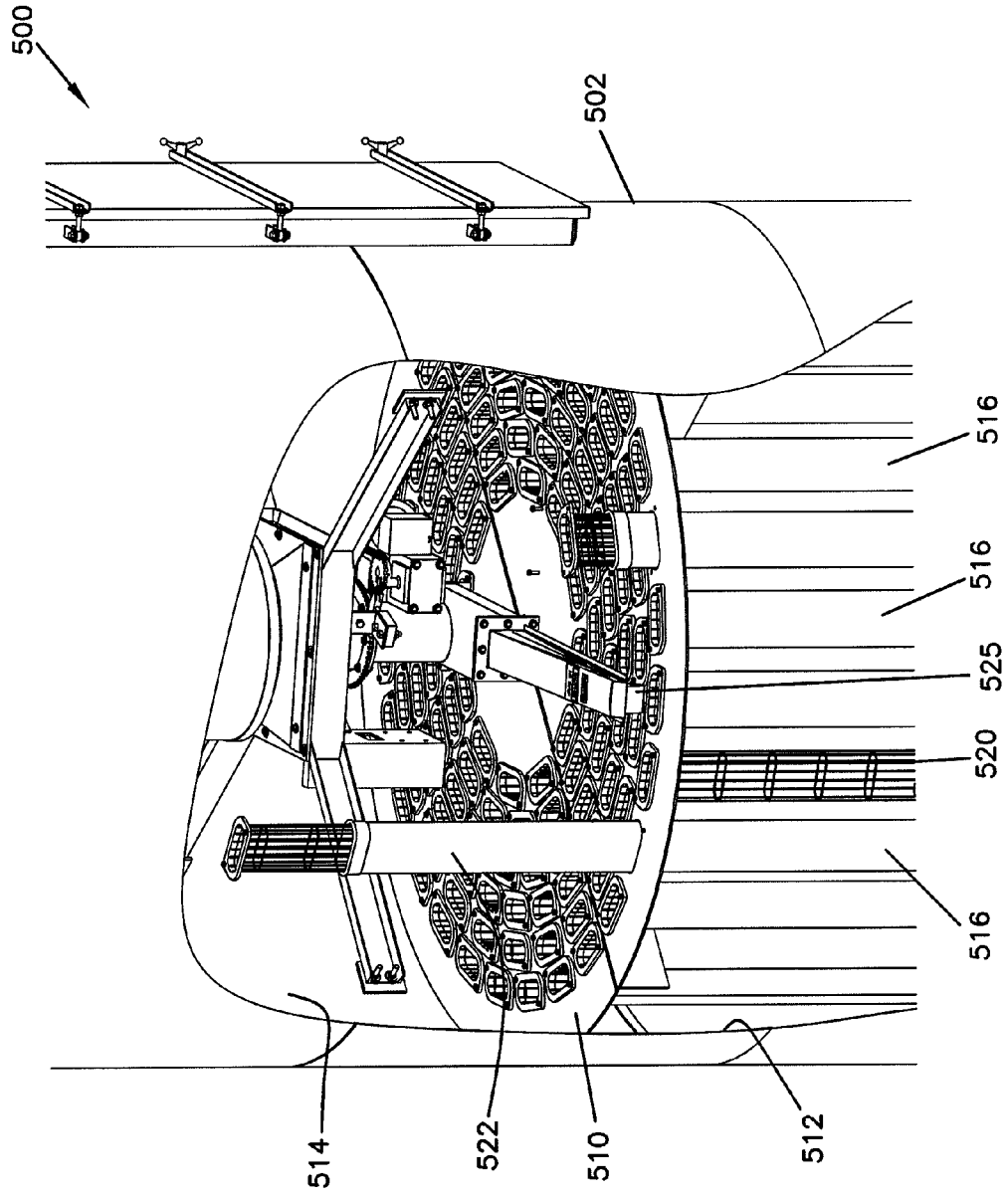
Figure 54:
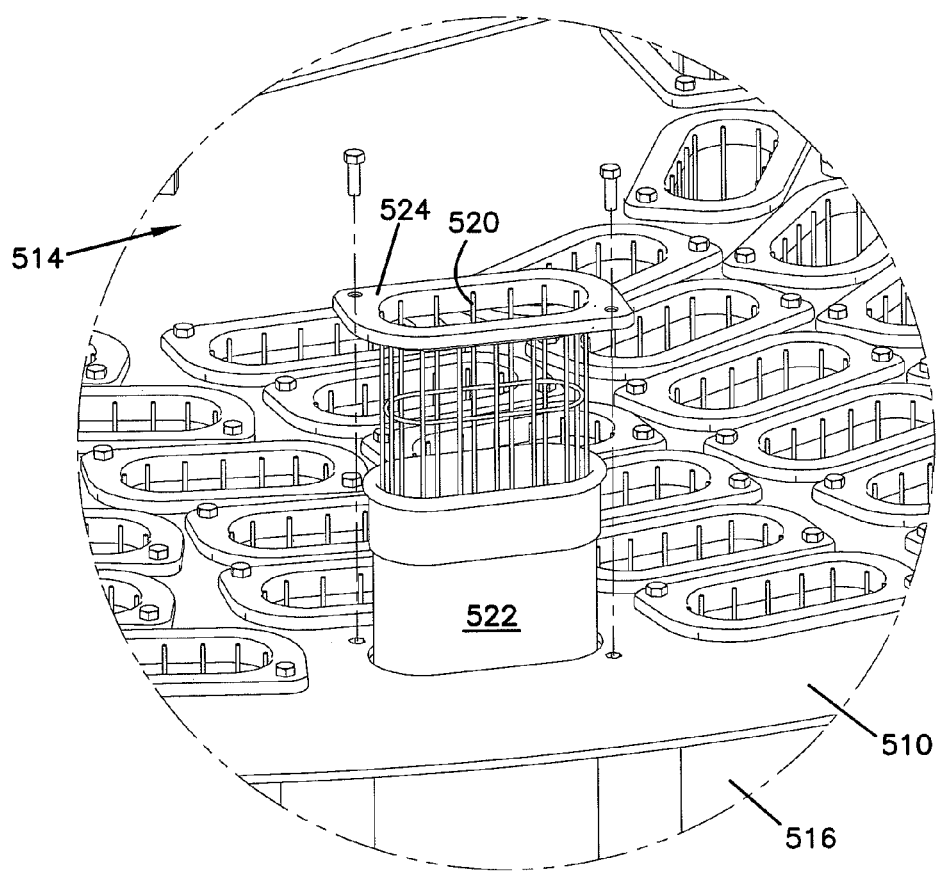

A prior art bag house dust collector is illustrated in FIGS. 52-54 at 500. The dust collector 500 includes a housing 502 with a dirty air inlet 504 and a clean air outlet (not depicted). A blower arrangement directs air from the dirty air inlet 504 to the clean air outlet. The housing 502 includes a tube sheet 510 separating a dirty air side 512 and a clean air side 514. The tube sheet 510 defines a plurality of apertures that are constructed and arranged to hold a plurality of filter bags 516 to clean air as it flows from the dirty air side 512, through the filter bags 516, to the clean air side 514.

The above filter elements can be used in a method of retrofitting the bag house dust collector 500. One such method includes removing at least one of the filter bags 516 from the housing 502.

Next, a Z-filter element is provided. The Z-filter element can include one constructed according to principles described above and embodied in such examples of element 200, element 250, element 270, element 310, element 350, element 400, element 440, and element 470.

Next, the Z-filter element is installed in the housing 502 to prevent unfiltered air flow from going through one of the apertures in the tube sheet 510.

Preferably, the step of installing includes inserting the Z-filter element into the aperture of the tube sheet 510. A seal is formed between the Z-filter element and the tube sheet 510.

In many embodiments, the step of installing includes installing the Z-filter element in the housing 502 by accessing the tube sheet 510 through the clean air side 514. In other embodiments, the step of installing includes installing the Z-filter element in the housing 502 by accessing the tube sheet 510 through the dirty air side 512.

In some arrangements, the step of installing will include installing the Z-filter element to result in the media pack to be oriented on the dirty air side 512 of the tube sheet 510. In other embodiments, the step of installing the Z-filter element will result in the media pack oriented on the clean air side 514 of the tube sheet 510.

In preferred methods, there is a step of removing a plurality of filter bags 516 from the housing 502 and then replacing those removed bags with a plurality of Z-filter elements in the housing 502.

In FIGS. 52-54, it can be seen how in the prior art dust collector 500, the filter bag elements 516 generally include cages 520 that are covered by removable and replaceable bags 522. At the top of each cage 520 is a flange 524 that is attachable on the clean air side 514 of the tube sheet 510. An arm 525 is used for firing a pulse of compressed air at the downstream side of the filter bags 522. The arm 525 moves in a random pattern in order to hit all of the filter elements 516.

By comparing the view in FIG. 54 with the view in FIG. 51, it can be seen how the filter element 700 of FIG. 51 can be used to retrofit the dust collector 500. That is, each of the cages 520 are removed and replaced with brackets 720. Then, filter element 700 can be oriented in a respective one of the brackets 720.

FIG. 55 illustrates another prior art dust collector 550. In this dust collector 550, the filter elements 552 have a round cross-section rather than the racetrack-shaped cross-section depicted in FIGS. 52-54. The dust collector 550 can be retrofitted with appropriately-shaped filter elements, as described in Sections III and IV.

What is claimed is:

1. A filter element for installation in a filter retainer tube; the filter element comprising:
    (a) a media pack having first and second opposite ends; the media pack having a first flow face at the first end and a second flow face at the second end; the media pack including a plurality of flutes extending between the first flow face and the second flow face; selected ones of the flutes being open at the first flow face and closed adjacent to the second flow face; selected ones of the flutes being closed adjacent to the first flow face and open at the second flow face; the media pack having an outer peripheral surface;
    (b) a first gasket member circumscribing the media pack and being against the outer peripheral surface; the first gasket member having an outer radially directed sealing surface oriented to form a radially directed seal against an internal sealing surface of the filter retainer tube, when the filter element is installed within the filter retainer tube; and
    (c) a first plurality of circumferentially spaced bayonet pins projecting radially outwardly from the media pack and adjacent to the second flow face; the pins being sized and arranged to operably engage bayonet slots in the filter retainer tube, when the filter element is installed within the filter retainer tube.

2. A filter element according to claim 1 wherein:
    (a) the first gasket member is spaced from both the first flow face and second flow face.

3. A filter element according to claim 2 wherein:
    (a) the first gasket member is spaced closer to the second flow face than the first flow face.

4. A filter element according to claim 1 further comprising:
    (a) an endpiece covering the second flow face;

(i) the endpiece having an outer ring circumscribing the media pack, a central hub over the second flow face, and a plurality of spokes between the hub and the outer ring.

5. A filter element according to claim 1 wherein:
(a) the first plurality of circumferentially spaced bayonet pins project radially from the outer ring of the endpiece.

6. A filter element according to claim 1 further comprising:
(a) a second plurality of circumferentially spaced bayonet pins projecting radially outwardly from the media pack and adjacent to the first flow face.

7. A filter element according to claim 6 wherein:
(a) the second plurality of circumferentially spaced bayonet pins are sized and arranged to interfere with bayonet slots in the filter retainer tube.

8. A filter element for installation in a filter retainer tube; the filter element comprising:
(a) a media pack having first and second opposite ends; the media pack having a first flow face at the first end and a second flow face at the second end; the media pack including a plurality of flutes extending between the first flow face and the second flow face; selected ones of the flutes being open at the first flow face and closed adjacent to the second flow face; selected ones of the flutes being closed adjacent to the first flow face and open at the second flow face; the media pack having an outer peripheral surface;
(b) a first gasket member circumscribing the media pack adjacent to the first flow face and being against the outer peripheral surface; the first gasket member having an outer radially directed sealing surface oriented to form a radially directed seal against an internal sealing surface of the filter retainer tube, when the filter element is installed within the filter retainer tube;
(c) a second gasket member circumscribing the media pack adjacent to the second flow face; the second gasket member having an outer radially directed sealing surface oriented to form a radially directed seal against an internal sealing surface of the filter retainer tube, when the filter element is installed within the filter retainer tube; and
(d) an endpiece covering the second flow face;
(i) the endpiece having an outer ring circumscribing the media pack, a central hub over the second flow face, and a plurality of spokes between the hub and the outer ring;
(A) at least some of the spokes having handle members projecting therefrom.

9. A filter element according to claim 8 wherein:
(a) the handle members comprise a grasping portion spaced a sufficient distance from the spokes to accommodate at least a portion of a human hand.

10. A filter element according to claim 9 wherein:
(a) each of the spokes includes a handle member projecting therefrom.

11. A filter element according to claim 8 wherein:
(a) the second gasket member is attached to an outer radial surface of the outer ring of the endpiece.

12. A filter element comprising:
(a) a media pack having first and second opposite ends; the media pack having a first flow face at the first end and a second flow face at the second end; the media pack including a plurality of flutes extending between the first flow face and the second flow face; selected ones of the flutes being open at the first flow face and closed adjacent to the second flow face; selected ones of the flutes being closed adjacent to the first flow face and open at the second flow face; the media pack having an outer peripheral surface; and
(b) a ring secured to the outer peripheral surface; the ring axially extending from the media pack; the ring defining a ramp and a recess constructed and arranged to engage a tube sheet.

13. A filter element according to claim 12 wherein:
(a) the ring has an element securing portion and a tube sheet engaging portion;
(i) the tube sheet engaging portion defining the ramp and recess;
(ii) the element securing portion defining an aperture arrangement therethrough.

14. A filter element according to claim 12 further including:
(a) an airflow tube having a section of reduced cross-section; the airflow tube extending from the tube sheet engaging portion of the ring.

15. A filter element according to claim 14 wherein:
(a) the airflow tube is a Venturi.

\* \* \* \* \*